(12) United States Patent
Zhang et al.

(10) Patent No.: US 9,398,563 B2
(45) Date of Patent: Jul. 19, 2016

(54) LTE BASED MULTICAST IN UNLICENSED SPECTRUM

(71) Applicant: QUALCOMM Incorporated, San Diego, CA (US)

(72) Inventors: Xiaoxia Zhang, San Diego, CA (US); Durga Prasad Malladi, San Diego, CA (US); Jun Wang, Poway, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 54 days.

(21) Appl. No.: 14/454,530

(22) Filed: Aug. 7, 2014

(65) Prior Publication Data

US 2015/0055541 A1    Feb. 26, 2015

Related U.S. Application Data

(60) Provisional application No. 61/869,298, filed on Aug. 23, 2013, provisional application No. 61/887,312, filed on Oct. 4, 2013.

(51) Int. Cl.
*H04B 7/208* (2006.01)
*H04W 72/00* (2009.01)
*H04W 4/06* (2009.01)

(52) U.S. Cl.
CPC ............. *H04W 72/005* (2013.01); *H04W 4/06* (2013.01)

(58) Field of Classification Search
CPC ..... H04W 84/18; H04W 84/12; H04W 88/08; H04W 4/06; H04W 80/04; H04W 8/26; H04W 88/06; H04L 2012/5608; H04B 7/2125; H04B 7/2126
USPC ............... 370/310.2, 310, 324, 312, 349, 328
See application file for complete search history.

(56) References Cited

U.S. PATENT DOCUMENTS

| 2008/0192748 | A1* | 8/2008 | Kim | H04L 45/00 370/394 |
| 2012/0077466 | A1* | 3/2012 | O'Mahony | H04N 21/234327 455/414.1 |
| 2012/0257562 | A1* | 10/2012 | Kim | H04W 4/06 370/312 |

FOREIGN PATENT DOCUMENTS

EP        2234420 A1    9/2010
WO  WO-2011002390 A1   1/2011

OTHER PUBLICATIONS

ISA/EPO, International Search Report and Written Opinion of the International Searching Authority, Int'l App. No. PCT/US2014/050553, Nov. 6, 2014, European Patent Office, Rijswijk, NL, 12 pgs.
ETSI, "Reconfigurable Radio Systems (RRS); Use Cases for Operation in White Space Frequency Bands," ETSI TR 102 907 v1.2.1 (Nov. 2012) Technical Report, Nov. 2012, 66 pgs., European Telecommunication Standards Institute, Sophia Antipolis Cedex, France.

* cited by examiner

*Primary Examiner* — Brenda H Pham
(74) *Attorney, Agent, or Firm* — Holland & Hart LLP

(57) ABSTRACT

Methods, systems, and devices are described for broadcast signal transmission using a number of nodes in an unlicensed spectrum. A set of nodes may be identified for use in transmission of a broadcast signal, with a first subset of the nodes transmitting the broadcast signal to deliver first content during a first time period, and with a second subset of the nodes transmitting the broadcast signal to deliver second content during a second time period. The first subset of nodes is different than the second subset of nodes. The set of nodes may thus form a single frequency network (SFN) that performs partial SFN operation during the first and second time periods.

34 Claims, 52 Drawing Sheets

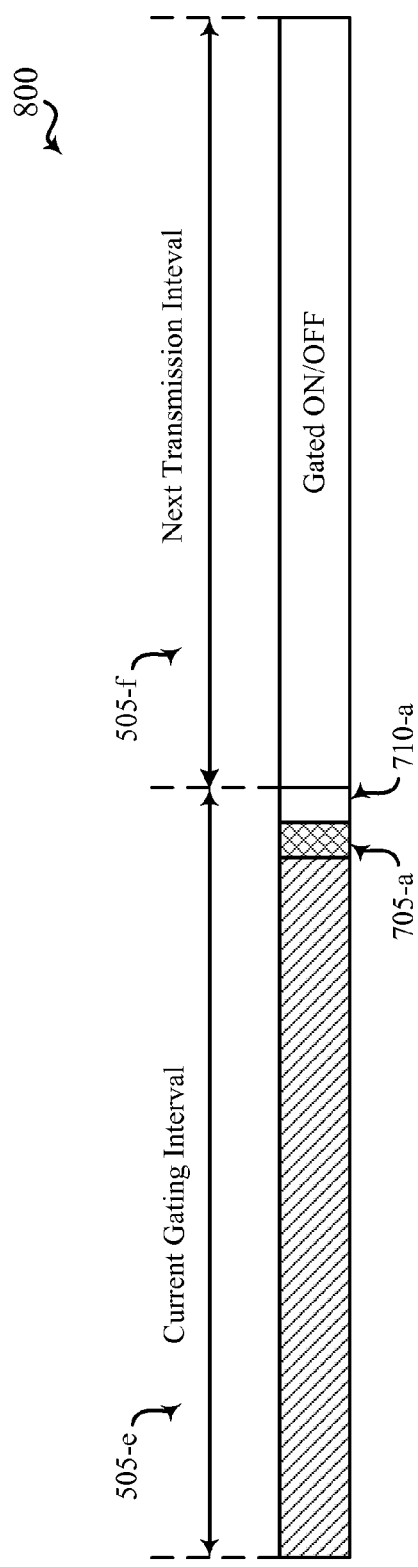
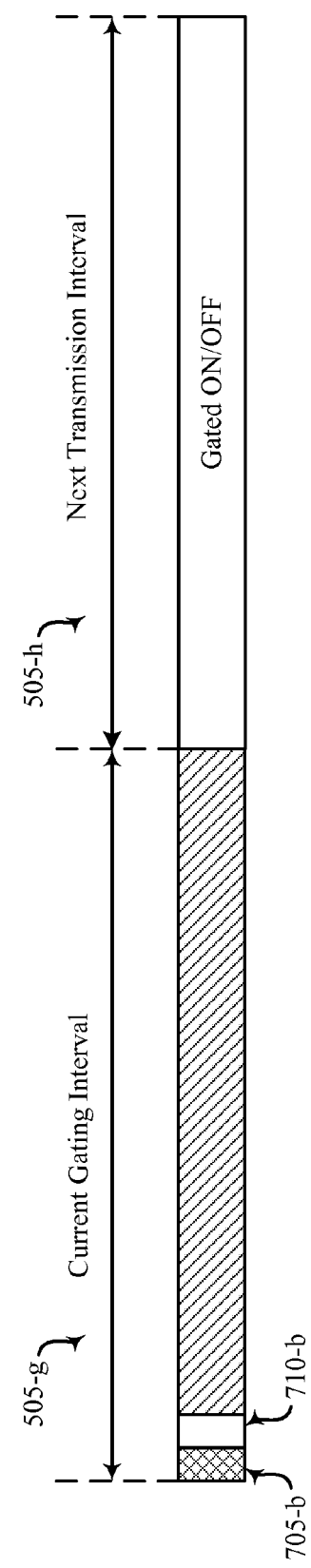
FIG. 8A
FIG. 8B

4000

Reserve first set of subframes of radio frame for transmitting information not associated with communicating service in unlicensed spectrum via MBSFN
4005

Allocate second set of subframes of radio frame for transmitting information associated with communicating service in unlicensed spectrum via MBSFN
4010

FIG. 40

LTE BASED MULTICAST IN UNLICENSED SPECTRUM

CROSS REFERENCES

The present application for patent claims priority to U.S. Provisional Patent Application No. 61/869,298 by Malladi et al., entitled "LTE Based Multicast In Unlicensed Spectrum," filed Aug. 23, 2013, assigned to the assignee hereof, and expressly incorporated by reference herein.

The present application for patent also claims priority to U.S. Provisional Patent Application No. 61/887,312 by Zhang et al., entitled "LTE eMBMS In Unlicensed Spectrum," filed Oct. 4, 2013, assigned to the assignee hereof, and expressly incorporated by reference herein.

BACKGROUND

Wireless communications networks are widely deployed to provide various communication services such as voice, video, packet data, messaging, broadcast, and the like. These wireless networks may be multiple-access networks capable of supporting multiple users by sharing the available network resources.

A wireless communications network may include a number of access points. The access points of a cellular network may include a number of base stations, such as NodeBs (NBs) or evolved NodeBs (eNBs). The access points of a wireless local area network (WLAN) may include a number of WLAN access points, such as WiFi nodes. Each access point may support communication for a number of user equipments (UEs) and may often communicate with multiple UEs at the same time. Similarly, each UE may communicate with a number of access points, and may sometimes communicate with multiple access points and/or access points employing different access technologies. An access point may communicate with a UE via downlink and uplink. The downlink (or forward link) refers to the communication link from the access point to the UE, and the uplink (or reverse link) refers to the communication link from the UE to the access point.

As cellular networks become more congested, operators are beginning to look at ways to increase capacity. One approach may include the use of WLANs to offload some of the traffic and/or signaling of a cellular network. WLANs (or WiFi networks) are attractive because, unlike cellular networks that operate in a licensed spectrum, WiFi networks generally operate in an unlicensed spectrum. However, access to unlicensed spectrum may need coordination to ensure that access points of the same or different operator deployments, using the same or different techniques for accessing the unlicensed spectrum, can co-exist and make effective use of the unlicensed spectrum.

SUMMARY

The described features generally relate to one or more improved systems, methods, and/or devices for wireless communications, and more particularly, to broadcast signal transmission using a number of nodes in an unlicensed spectrum. A set of nodes may be identified for use in transmission of a broadcast signal, with a first subset of the nodes transmitting the broadcast signal to deliver first content during a first time period, and with a second subset of the nodes transmitting the broadcast signal to deliver second content during a second time period. The first subset of nodes is different than the second subset of nodes. The set of nodes may thus form a single frequency network (SFN) that performs partial SFN operation during the first and second time periods.

UEs communicating with one or more of the nodes may receive information to synchronize listening intervals and transmission periods among each node of the set of nodes, and receive the broadcast signal from different subsets of nodes during different time periods. In some embodiments, control information related to the synchronization and timing of broadcast signal transmissions may be transmitted in a licensed spectrum, with the broadcast signal transmitted in the unlicensed spectrum. In additional or alternative embodiments, a UE may transmit a request to receive the broadcast signal responsive to receiving at least a portion of the control information. Transmission of such a request may be transmitted using the licensed or unlicensed spectrum. Transmissions in the unlicensed spectrum may operate according to a secondary downlink mode, a carrier aggregation mode, or a standalone mode.

In some aspects, a method for wireless communications is provided. The method generally includes receiving a broadcast signal delivering first content from a first subset of a number of nodes, the first subset of nodes transmitting the broadcast signal in an unlicensed spectrum during a first time period, and receiving a broadcast signal delivering second content from a second subset of the number of nodes, the second subset of nodes transmitting the broadcast signal in the unlicensed spectrum during a second time period, and the first subset of nodes is different than the second subset of nodes. In some examples, the nodes may make up a single frequency network (SFN) that performs partial SFN operation during the first and second time periods. The first and second time periods may include, for example, transmission periods that are synchronized between listening intervals for each node.

In some examples, the method may include receiving system information indicating a location of a control channel for the broadcast signal. The system information may include, for example, a system information block (SIB) including the system information transmitted from a serving node on a licensed spectrum. The system information may include, for example, an indication of a Multimedia Broadcast Multicast Services (MBMS) control channel (MCCH) location in time. In some examples, the MCCH may be transmitted on a physical multicast channel (PMCH) using a licensed spectrum, and the MCCH may be transmitted on the PMCH using the unlicensed spectrum. Receiving the system information may include, for example, receiving a system information block (SIB) indicating a portion of the MCCH that is to be transmitted on a licensed spectrum. Additionally or alternatively, the method may include transmitting, responsive to receiving the control channel, a request to receive the broadcast signal. In some examples, the broadcast signal may be transmitted from the first subset of nodes and the second subset of nodes as a supplemental downlink (SDL) carrier.

Additionally or alternatively, the method may include receiving, from a serving node on a licensed spectrum, system information indicating a location of a control channel for the broadcast signal, and receiving, from one or more nodes of the plurality of nodes, the control channel. The control channel may be received, for example, on the licensed spectrum or on an unlicensed spectrum. In some examples, the broadcast signal may be transmitted from the first subset of nodes and the second subset of nodes in a carrier aggregation mode using the unlicensed spectrum. The method may further include, in some examples, receiving, from a serving node on a licensed spectrum, system information indicating a location of a control channel for the broadcast signal, and receiving, from one or more nodes of the plurality of nodes, the control channel. The method may also include, for example, transmitting, using the licensed spectrum and responsive to receiving the system information, a request to receive the broadcast signal to a serving node. The broadcast signal may be, in some examples, transmitted from the first subset of nodes and the second subset of nodes in a standalone mode using the unlicensed spectrum. In some examples, the method also includes receiving, from a serving node on the unlicensed spectrum, system information indicating a location of a control channel for the broadcast signal, and receiving, from one or more nodes of the plurality of nodes on the unlicensed spectrum, the control channel. The method may include, in still further examples, transmitting, using the unlicensed spectrum and responsive to receiving the system information, a request to receive the broadcast signal to a serving node.

In some aspects, a method for wireless communications is provided. The method generally includes receiving information to synchronize listening intervals and transmission periods among a number of nodes, transmitting, in an unlicensed spectrum during a first time period, a broadcast signal synchronized with a first subset of the nodes, the first subset of nodes transmitting the broadcast signal in the unlicensed spectrum during the first time period, the broadcast signal delivering first content during the first time period, and transmitting, in the unlicensed spectrum during a second time period, the broadcast signal synchronized with a second subset of nodes, the second subset of nodes transmitting the broadcast signal in the unlicensed spectrum during the second time period, the broadcast signal delivering second content during the second time period, wherein the first subset of nodes is different than the second subset of nodes. In some examples, the nodes make up a single frequency network (SFN) that performs partial SFN operation during the first and second time periods. The method may also include, in some examples, performing a clear channel assessment (CCA) to determine availability of the unlicensed spectrum prior to transmitting the broadcast signal during the first and second time periods.

Additionally or alternatively, the method may include transmitting system information indicating a location of a control channel for the broadcast signal. The method may also include, for example, receiving, responsive to transmitting the control channel, one or more user equipment (UE) requests to receive the broadcast signal, and transmitting the broadcast signal during the first and second time periods is responsive to receiving a predetermined number of UE requests to receive the broadcast signal. The system information may be transmitted using a licensed spectrum and/or unlicensed spectrum. The system information may include, for example, an indication of a Multimedia Broadcast Multicast Services (MBMS) control channel location in time on a physical multicast channel (PMCH). The method may also include, in some examples, receiving, responsive to transmitting the control channel, a request to receive the broadcast signal. The broadcast signal may be transmitted, for example, as a supplemental downlink carrier. In some examples, the broadcast signal may be transmitted in a carrier aggregation mode using the unlicensed spectrum. In further examples, the broadcast signal may be transmitted in a standalone mode using the unlicensed spectrum. The method may also include, for example, transmitting, on a licensed spectrum, system information indicating a location of a control channel for the broadcast signal, and transmitting the control channel. The control channel may be transmitted on a licensed spectrum and/or unlicensed spectrum.

In some aspects, an apparatus for wireless communications is provided. The apparatus generally includes a processor and memory in electronic communication with the processor. The processor may be configured to receive a broadcast signal delivering first content from a first subset of a number of nodes, the first subset of nodes transmitting the broadcast signal in an unlicensed spectrum during a first time period, and receive a broadcast signal delivering second content from a second subset of the nodes, the second subset of nodes transmitting the broadcast signal in the unlicensed spectrum during a second time period, and the first subset of nodes is different than the second subset of nodes. The processor may also be configured to receive system information indicating a location of a control channel for the broadcast signal, such as, for example, a system information block (SIB) including the system information transmitted from a serving node on a licensed spectrum. The system information may include, for example, an indication of a Multimedia Broadcast Multicast Services (MBMS) control channel (MCCH) location in time.

In other aspects, an apparatus for wireless communications is provided. The apparatus generally includes a processor and memory in electronic communication with the processor. The processor may be configured to receive information to synchronize listening intervals and transmission periods among a number of nodes, transmit, in an unlicensed spectrum during a first time period, a broadcast signal synchronized with a first subset of the nodes, the first subset of nodes transmitting the broadcast signal in the unlicensed spectrum during the first time period, the broadcast signal delivering first content during the first time period, and transmit, in the unlicensed spectrum during a second time period, the broadcast signal synchronized with a second subset of the nodes, the second subset of nodes transmitting the broadcast signal in the unlicensed spectrum during the second time period, the broadcast signal delivering second content during the second time period, and the first subset of nodes is different than the second subset of nodes. The processor may also be configured to perform a clear channel assessment (CCA) to determine availability of the unlicensed spectrum prior to transmitting the broadcast signal during the first and second time periods. In some examples, the processor may be configured to receive, responsive to transmitting the control channel, one or more user equipment (UE) requests to receive the broadcast signal, and the transmission of the broadcast signal during the first and second time periods may be responsive to receiving a predetermined number of UE requests to receive the broadcast signal.

In some aspects, an apparatus for wireless communications is provided that may include means for receiving a broadcast signal delivering first content from a first subset of a number of nodes, the first subset of nodes transmitting the broadcast signal in an unlicensed spectrum during a first time period, and means for receiving a broadcast signal delivering second content from a second subset of the nodes, the second subset of nodes transmitting the broadcast signal in the unlicensed spectrum during a second time period, and the first subset of nodes is different than the second subset of nodes. The apparatus may also include, for example, means for receiving system information indicating a location of a control channel for the broadcast signal, such as a system information block (SIB) that includes the system information transmitted from a serving node on a licensed spectrum.

In other aspects, an apparatus for wireless communications is provided that includes means for receiving information to synchronize listening intervals and transmission periods among a number of nodes, means for transmitting, in an unlicensed spectrum during a first time period, a broadcast signal synchronized with a first subset of the nodes, the first subset of nodes transmitting the broadcast signal in the unlicensed spectrum during the first time period, the broadcast signal delivering first content during the first time period, and means for transmitting, in the unlicensed spectrum during a second time period, the broadcast signal synchronized with a second subset of the nodes, the second subset of nodes transmitting the broadcast signal in the unlicensed spectrum during the second time period, the broadcast signal delivering second content during the second time period, and the first subset of nodes is different than the second subset of nodes. The apparatus may also include, for example, means for performing a clear channel assessment (CCA) to determine availability of the unlicensed spectrum prior to transmitting the broadcast signal during the first and second time periods. The apparatus may, in some examples, also include means for transmitting system information indicating a location of a control channel for the broadcast signal.

In some aspects, a non-transitory computer-readable medium for storing instructions executable by a processor is provided. The computer-readable medium may include instructions to receive a broadcast signal delivering first content from a first subset of a number of nodes, the first subset of nodes transmitting the broadcast signal in an unlicensed spectrum during a first time period, and instructions to receive a broadcast signal delivering second content from a second subset of the nodes, the second subset of nodes transmitting the broadcast signal in the unlicensed spectrum during a second time period, and where the first subset of nodes is different than the second subset of nodes. In some examples, the instructions may be executable by the processor to receive system information indicating a location of a control channel for the broadcast signal, such as system information block (SIB) that includes the system information transmitted from a serving node on a licensed spectrum.

In other aspects, the computer-readable medium for storing instructions executable by a processor may include instructions to receive information to synchronize listening intervals and transmission periods among a number of nodes, transmit, in an unlicensed spectrum during a first time period, a broadcast signal synchronized with a first subset of the nodes, the first subset of nodes transmitting the broadcast signal in the unlicensed spectrum during the first time period, the broadcast signal delivering first content during the first time period, and transmit, in the unlicensed spectrum during a second time period, the broadcast signal synchronized with a second subset of the nodes, the second subset of nodes transmitting the broadcast signal in the unlicensed spectrum during the second time period, the broadcast signal delivering second content during the second time period, wherein the first subset of nodes is different than the second subset of nodes.

In some aspects of the disclosure, a method, a computer program product, and an apparatus for wireless communications are provided. The apparatus determines a gated period of a base station transmitting a service; and applies forward error correction (FEC) to at least one packet associated with the service based on the determined gated period.

In another aspects, the apparatus determines a gated period of a base station transmitting a service in an unlicensed spectrum; and determines a modulation and coding scheme (MCS) for at least one packet associated with the service based on the determined gated period.

In a further aspect, the apparatus determines that a service is transmitted in an unlicensed spectrum; and configures at least one radio frame for transmitting the service in the unlicensed spectrum.

In yet another aspect, the apparatus schedules to transmit a plurality of packets received for a traffic channel; transmits at least one packet of the plurality of packets according to the scheduling; activates a gated period; and refrains from transmitting a packet of the plurality of packets when the packet is scheduled to be transmitted during the gated period, wherein the packet scheduled to be transmitted during the gated period is dropped, the apparatus further deactivates the gated period, and continues to transmit packets subsequent to the dropped packet according to the scheduling when the gated period is deactivated.

In yet a further aspect, the apparatus performs a clear channel assessment (CCA) to determine channel availability for transmitting a signal in an unlicensed spectrum; and sets a transmission power for transmitting the signal according to the CCA.

In another aspect, the apparatus transmits a service in an unlicensed spectrum; and transmits, in association with the service, a multicast control channel (MCCH), multicast channel scheduling information (MSI), system information block type 13 (SIB13), and a MCCH change notification in a licensed spectrum.

In a further aspect, the apparatus transmits a service in an unlicensed spectrum; and periodically transmits a multicast control channel (MCCH) and multicast channel scheduling information (MSI) with repetition in association with the service.

In yet another aspect, the apparatus receives system information block type 13 (SIB13) and MCCH information from a base station; and for a downlink transmission, mutes all subframes allocated by SIB13 and MCCH or mutes MCCH subframes and MSI subframes.

In yet a further aspect, the apparatus receives system information block type 13 (SIB13) and multicast channel scheduling information (MSI) from a base station; for a downlink transmission, mutes all subframes allocated by SIB13 and MSI; and uses, for the downlink transmission, subframes allocated for MCCH for a unicast transmission if not used for an MBMS transmission.

In another aspect, the apparatus receives system information block type 13 (SIB13) and MCCH information from an MBMS coordination entity (MCE); and for a downlink transmission, mutes all subframes allocated by SIB13 and MCCH or mutes MCCH subframes and MSI subframes.

In a further aspect, the apparatus configures a radio frame for communicating a service in an unlicensed spectrum, by reserving a first set of subframes of the radio frame for transmitting information not associated with communicating the service in the unlicensed spectrum via a multicast broadcast single frequency network (MBSFN); and allocating a second set of subframes of the radio frame for transmitting information associated with communicating the service in the unlicensed spectrum via the MBSFN.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIGS. 8A and 8B illustrate examples of how a subframe may be used in conjunction with a current gating interval;

FIG. 40 is a flowchart of an example of a method for configuration of a radio frame for communicating service in an unlicensed spectrum according to various embodiments.

DETAILED DESCRIPTION

Figure 1:
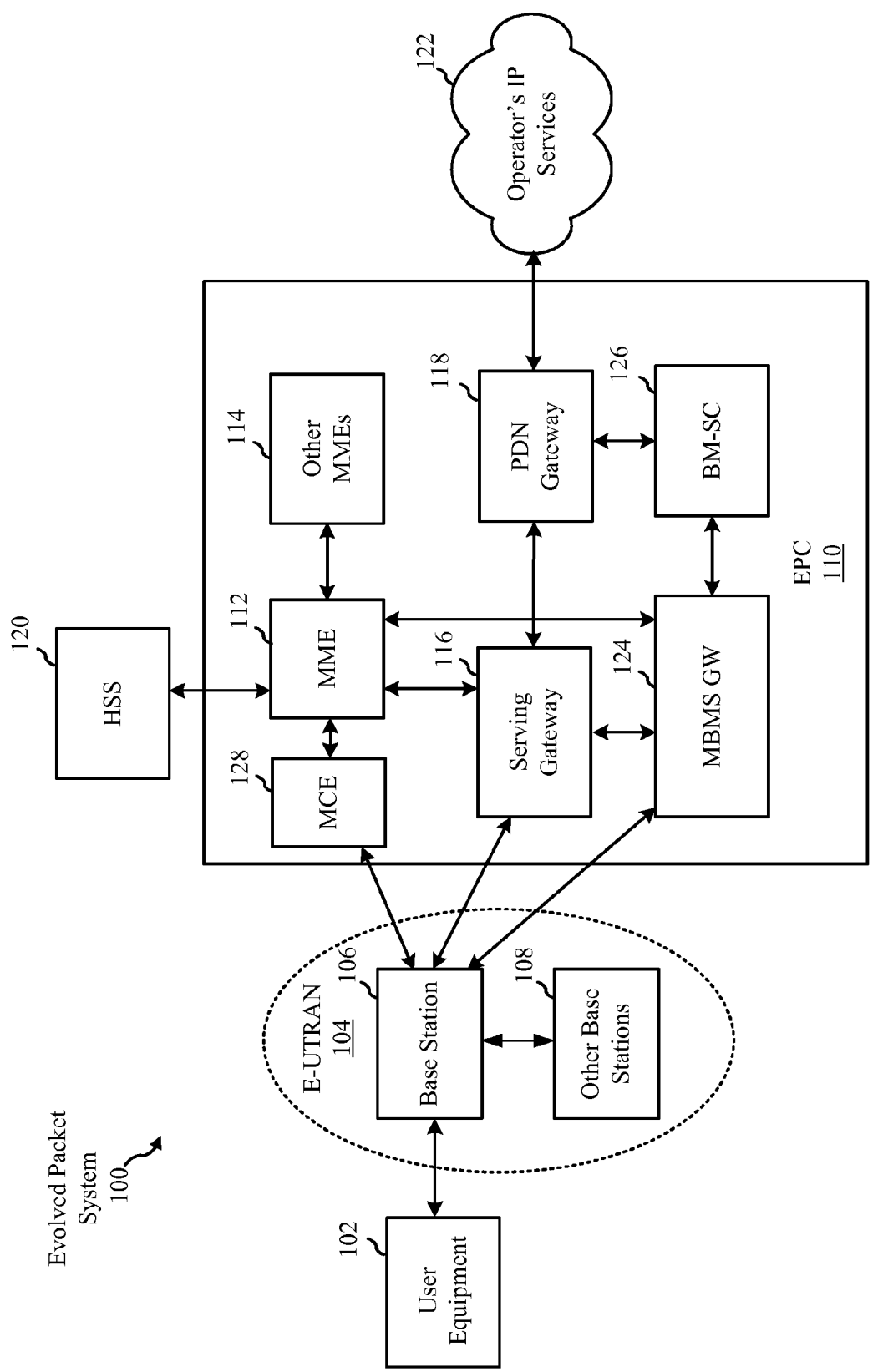
FIG. 1 shows a diagram that illustrates an LTE network architecture.

Methods, apparatuses, systems, and devices are described in which an unlicensed spectrum (e.g., a spectrum typically used for WiFi communications) may be used for cellular communications (e.g., Long Term Evolution (LTE) communications). Specifically, the techniques disclosed herein may apply to LTE communications over an unlicensed spectrum. Operators have so far looked at WiFi as the primary mechanism to use unlicensed spectrum to relieve ever increasing levels of congestion in cellular networks. However, a new carrier type (NCT) based on LTE in an unlicensed spectrum may be compatible with carrier-grade WiFi, making LTE communications in an unlicensed spectrum an alternative to WiFi. LTE communications in an unlicensed spectrum may leverage LTE concepts and may introduce some modifications to physical layer (PHY) and media access control (MAC) aspects of the network or network devices to provide efficient operation in the unlicensed spectrum and to meet regulatory requirements. The unlicensed spectrum may range from 600 Megahertz (MHz) to 6 Gigahertz (GHz), for example. In some scenarios, LTE communications in an unlicensed spectrum may perform significantly better than WiFi with respect to spectrum utilization and/or data rate. For example, an all LTE deployment (for single or multiple operators) in an unlicensed spectrum, compared to an all WiFi deployment, or when there are dense small cell deployments in an unlicensed spectrum, may perform significantly better than WiFi due to better base station coordination, for example. LTE communications in an unlicensed spectrum may perform better than WiFi in other scenarios such as when an LTE communication in an unlicensed spectrum is mixed with WiFi (for single or multiple operators).

With the increase in traffic because of offloading from cellular networks, access to unlicensed spectrum may provide operators with opportunities for enhanced data transmission capacity. Prior to gaining channel access and transmitting using an unlicensed spectrum, a transmitting device may, in some deployments perform a clear channel assessment (CCA) during a listening interval to determine if a particular carrier is available. If it is determined that a carrier is not available, a CCA may be performed again at a later time. Furthermore, use of unlicensed spectrum may need coordination to ensure that access points of the same or different operator deployments, using the same or different techniques for accessing the unlicensed spectrum, may co-exist within the unlicensed spectrum.

In some cases, the co-existence may be facilitated by the synchronization of listening intervals and coordination of CCAs performed by different devices or nodes that want to access the unlicensed spectrum. In some of the broadcast signal transmission methods disclosed herein, different nodes in a system may be coordinated to provide broadcast signal. In some deployments, a set of nodes may be identified for use in transmission of a broadcast signal, each node of the set of nodes may have synchronized listening intervals and transmission periods. A first subset of the nodes may transmit the broadcast signal to deliver first content during a first time period, and a second subset of the nodes may transmit the broadcast signal to deliver second content during a second time period. The first subset of nodes may be different than the second subset of nodes. The set of nodes may thus form a single frequency network (SFN) that performs partial SFN operation during the first and second time periods.

UEs communicating with one or more of the nodes may receive information related to synchronized listening intervals and transmission periods among each node of the set of nodes, and receive the broadcast signal from different subsets of nodes during different time periods. In some embodiments, control information related to the synchronization and timing of broadcast signal transmissions may be transmitted in a licensed spectrum, with the broadcast signal transmitted in the unlicensed spectrum. In additional or alternative embodiments, a UE may transmit a request to receive the broadcast signal responsive to receiving at least a portion of the control information. Transmission of such a request may be transmitted using the licensed or unlicensed spectrum.

Various deployment scenarios may be supported according to various embodiments, including a supplemental downlink mode in which LTE downlink traffic may be offloaded to an unlicensed spectrum. A carrier aggregation mode may be used to offload both LTE downlink and uplink traffic from a licensed spectrum to an unlicensed spectrum. In a standalone mode, LTE downlink and uplink communications between a base station (e.g., eNB) and a UE may take place in an unlicensed spectrum. LTE and other base stations and UEs may support one or more of these or similar modes of operation. OFDMA communications signals may be used for LTE downlink communications in an unlicensed spectrum, while SC-FDMA communications signals may be used for LTE uplink communications in an unlicensed spectrum.

For a single service provider (SP), an LTE network in an unlicensed spectrum may be configured to be synchronous with an LTE network in the licensed spectrum. However, LTE networks using an unlicensed spectrum deployed on a given channel by multiple SPs may be configured to be synchronous across the multiple SPs. One approach to incorporate both the above features may involve using a constant timing offset between LTE communications in a licensed spectrum and LTE communications in an unlicensed spectrum for a given SP. An LTE network using an unlicensed spectrum may provide unicast and/or multicast services according to the needs of the SP. Moreover, an LTE network using an unlicensed spectrum may operate in a bootstrapped mode in which LTE cells act as anchor and provide relevant LTE cell information for LTE communications over an unlicensed spectrum (e.g., radio frame timing, common channel configuration, system frame number or SFN, etc.). In this mode, there may be close interworking between an LTE in a licensed spectrum and an LTE in an unlicensed spectrum. For example, the bootstrapped mode may support the supplemental downlink and the carrier aggregation modes described above. The PHY-MAC layers of the LTE network using an unlicensed spectrum may operate in a standalone mode in which the LTE network using an unlicensed spectrum operates independently from an LTE network using a licensed spectrum. In this case, there may be a loose interworking between an LTE in a licensed spectrum and an LTE in an unlicensed spectrum based on RLC-level aggregation with co-located LTE cells for communications in a licensed spectrum and an unlicensed spectrum, or multiflow across multiple cells and/or base stations, for example.

The techniques described herein are not limited to LTE, and may also be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (WiFi), IEEE 802.16 (WiMAX), IEEE 802.20, Flash-OFDM, etc. UTRA and E-UTRA are part of Universal Mobile Telecommunication System (UMTS). LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

The following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

While the examples herein are primarily described within the context of an unlicensed radio frequency spectrum band, it should be understood that the principles may also be applied to transmissions over a licensed radio frequency spectrum band that is shared by two or more deployments (e.g., two or more public land mobile networks (PLMNs) or other operators).

Referring first to FIG. 1, a diagram illustrates an example of an LTE network architecture 100. The LTE network architecture 100 may be referred to as an Evolved Packet System (EPS). In such embodiments, the LTE network architecture 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the base stations 106 and other base stations 108. The base station 106 provides user and control planes protocol terminations toward the UE 102. The base station 106 may be connected to the other base stations 108 via a backhaul (e.g., an X2 interface). The base station 106 provides an access point to the EPC 110 for a UE 102. The base station 106 is connected to the EPC 110. The EPC 110 may include a Mobility Management Entity (MME) 112, other MMEs 114, a Serving Gateway 116, a Multimedia Broadcast Multicast Service (MBMS) Gateway 124, a Broadcast Multicast Service Center (BM-SC) 126, a Packet Data Network (PDN) Gateway 118, and a multicell/multicast coordination entity (MCE) 128. The MME 112 is the control node that processes the signaling between the UE 102 and the EPC 110. Generally, the MME 112 provides bearer and connection management. User IP packets may be transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, an intranet, an IP Multimedia Subsystem (IMS), and a PS Streaming Service (PSS). The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the base stations (e.g., 106, 108) belonging to a Multicast Broadcast Single Frequency Network (MBSFN) area broadcasting a particular service, and may be responsible for session management (start/stop) and for collecting eMBMS related charging information. The MCE 128 may be responsible for allocating time and frequency resources for multicell MBMS transmission. As such, the MCE 128 performs scheduling on the radio interface.

Figure 2:
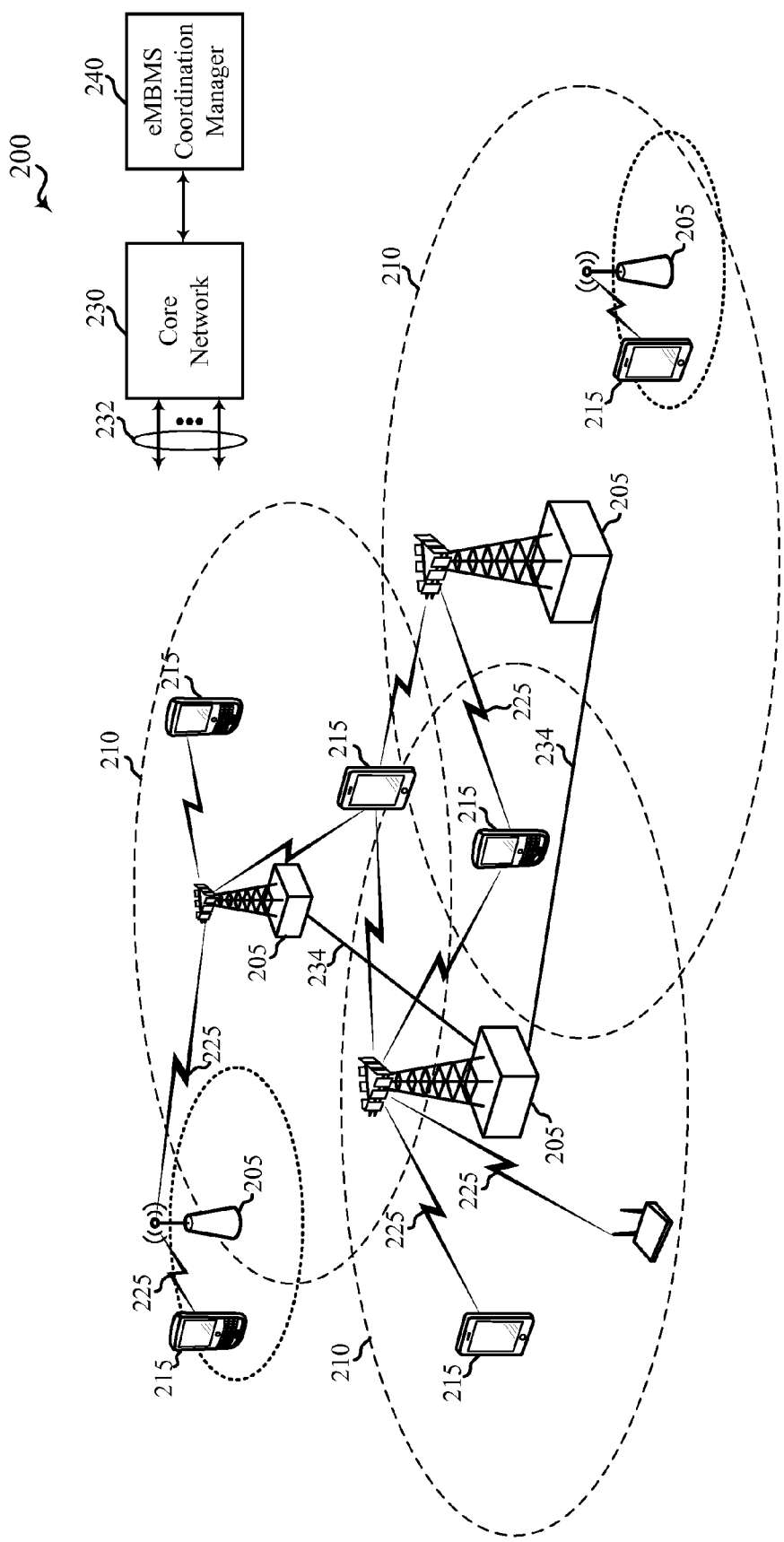
FIG. 2 shows a diagram that illustrates an example of a wireless communications system or network.

Turning next to FIG. 2, a diagram illustrates an example of a wireless communications system 200. The wireless communications system 200 includes a plurality of base stations (e.g., access points, eNBs, or WLAN access points) 205, a number of user equipments (UEs) 215, and a core network 230. Some of the base stations 205 may communicate with the UEs 215 under the control of a base station controller (not shown), which may be part of the core network 230 or certain base stations 205 (e.g., access points or eNBs) in various embodiments. Some of the base stations 205 may communicate control information and/or user data with the core network 230 through backhaul 232. In some embodiments, some of the base stations 205 may communicate, either directly or indirectly, with each other over backhaul links 234, which may be wired or wireless communication links. The wireless communications system 200 may support operation on multiple carriers (waveform signals of different frequencies). Multi-carrier transmitters can transmit modulated signals simultaneously on the multiple carriers. For example, each communications link 225 may be a multi-carrier signal modulated according to various radio technologies. Each modulated signal may be sent on a different carrier and may carry control information (e.g., reference signals, control channels, etc.), overhead information, data, etc.

The base stations 205 may wirelessly communicate with the UEs 215 via one or more base station antennas. Each of the base stations 205 may provide communication coverage for a respective coverage area 210. In some embodiments, a base station 205 may be referred to as a access point, a base transceiver station (BTS), a radio base station, a radio transceiver, a basic service set (BSS), an extended service set (ESS), a NodeB, an evolved NodeB (eNB), a Home NodeB, a Home eNodeB, a WLAN access point, a WiFi node or some other suitable terminology. The coverage area 210 for an access point may be divided into sectors making up only a portion of the coverage area (not shown). The wireless communications system 200 may include base stations 205 of different types (e.g., macro, micro, and/or pico base stations). The base stations 205 may also utilize different radio technologies, such as cellular and/or WLAN radio access technologies. The base stations 205 may be associated with the same or different access networks or operator deployments. The coverage areas of different base stations 205, including the coverage areas of the same or different types of base stations 205, utilizing the same or different radio technologies, and/or belonging to the same or different access networks, may overlap.

In some embodiments, the wireless communications system 200 may include an LTE/LTE-A communications system (or network) that supports one or more modes of operation or deployment scenarios for LTE/LTE-A in an unlicensed spectrum, and may employ multiple component carriers having synchronized listening intervals and coordinated CCAs. In some embodiments, the wireless communications system 200 may support enhanced Multimedia Broadcast Multicast Services (eMBMS), which is a point-to-multipoint interface specification designed to provide efficient delivery of broadcast and multicast services both within a cell as well as within a network such as the wireless communications system 200. For broadcast transmission across multiple cells, eMBMS results in a system having a single-frequency network (SFN) configuration for transmissions associated with a broadcast signal. Such eMBMS operation may be facilitated by eMBMS coordination manager 240, and will be described in more detail below.

In other embodiments, the wireless communications system 200 may support wireless communications using an unlicensed spectrum and an access technology different from LTE/LTE-A in an unlicensed spectrum, or a licensed spectrum and an access technology different from LTE/LTE-A. In LTE/LTE-A communications systems, the term evolved NodeB or eNB may be generally used to describe of the base stations 205. The wireless communications system 200 may be a Heterogeneous LTE/LTE-A network in which different types of base stations provide coverage for various geographical regions. For example, each base station 205 may provide communication coverage for a macro cell, a pico cell, a femto cell, and/or other types of cell. Small cells such as pico cells, femto cells, and/or other types of cells may include low power nodes or LPNs. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 230 may communicate with the base stations 205 via a backhaul 232 (e.g., S1, etc.). The base stations 205 may also communicate with one another, e.g., directly or indirectly via backhaul links 234 (e.g., X2, etc.) and/or via backhaul 232 (e.g., through core network 230). The wireless communications system 200 may support synchronous or asynchronous operation. For synchronous operation, the base stations may have similar frame and/or gating timing, and transmissions from different base stations may be approximately aligned in time. For asynchronous operation, the base stations may have different frame and/or gating timing, and transmissions from different base stations may not be aligned in time.

The UEs 215 may be dispersed throughout the wireless communications system 200, and each UE 215 may be stationary or mobile. A UE 215 may also be referred to by those skilled in the art as a mobile device, a mobile station, a subscriber station, a mobile unit, a subscriber unit, a wireless unit, a remote unit, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 215 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A UE 215 may be able to communicate with macro eNBs, pico eNBs, femto eNBs, relays, and the like. A UE 215 may also be able to communicate over different access networks, such as cellular or other WWAN access networks, or WLAN access networks.

The communications links 225 shown in wireless communications system 200 may include uplinks for carrying uplink (UL) transmissions (e.g., from a UE 115 to a base station 205) and/or downlinks for carrying downlink (DL) transmissions (e.g., from a base station 205 to a UE 215). The UL transmissions may also be called reverse link transmissions, while the DL transmissions may also be called forward link transmissions. The downlink transmissions may be made using a licensed spectrum, an unlicensed spectrum, or both. Similarly, the uplink transmissions may be made using a licensed spectrum, an unlicensed spectrum, or both.

In some embodiments of the wireless communications system 200, various deployment scenarios for LTE/LTE-A in an unlicensed spectrum may be supported including a supplemental downlink mode in which LTE downlink capacity in a licensed spectrum may be offloaded to an unlicensed spectrum, a carrier aggregation mode in which both LTE downlink and uplink capacity may be offloaded from a licensed spectrum to an unlicensed spectrum, and a standalone mode in which LTE downlink and uplink communications between a base station (e.g., an eNB) and a UE may take place in an unlicensed spectrum. OFDMA communications signals may be used in the communications links 225 for LTE downlink transmissions in an unlicensed and/or a licensed spectrum, while SC-FDMA communications signals may be used in the communications links 225 for LTE uplink transmissions in an unlicensed and/or a licensed spectrum. Transmissions using the unlicensed spectrum may be carried using one or more carrier frequencies in a frequency band. A frequency band, for example, may be divided into multiple carrier frequencies, and each carrier frequency may have the same bandwidth or different bandwidth. For example, each carrier frequency may occupy 20 MHz of a 5 GHz frequency band.

In many deployments, as mentioned above, a device seeking to transmit using unlicensed spectrum may be required to verify that the spectrum is available for use in such a transmission, that is, the spectrum is not already in use by one or more other devices. For example, a CCA may be used to determine availability of the unlicensed spectrum. Performance of a CCA generally involves checking that the desired spectrum is not otherwise occupied prior to initiating transmissions. In some embodiments, CCA opportunities are coordinated across multiple base stations 205, and may occur at periodic listening intervals, such as every 10 ms. A transmitting entity, such as a base station 205, may desire channel access and perform a CCA to determine if a particular carrier frequency in the unlicensed spectrum is occupied. If the particular carrier frequency in the unlicensed spectrum is occupied, the base station 205 waits until the next CCA opportunity before attempting to obtain channel access again on the associated carrier frequency.

According to some embodiments, a set of base stations 205 may provide a broadcast signal, such as a signal broadcast according to eMBMS techniques, using an unlicensed spectrum. The eMBMS coordination manager 240 in such embodiments may provide control information to each base station 205 that defines the characteristics of the broadcast signal, such as resources to be used to transmit the broadcast signal, timing of content to be transmitted using the broadcast signal, etc. In such embodiments, each base station 205 performs a CCA and, if the associated portion of the unlicensed spectrum is available, will transmit the broadcast signal according to the information provided by the eMBMS coordination manager 240. If a CCA fails for a particular base station 205, meaning that another transmitter within a vicinity of the base station 205 is transmitting using the unlicensed spectrum, the particular base station 205 will not transmit signals using the unlicensed spectrum for the transmission period associated with the listening interval (although the base station 205 may transmit one or more signals using the licensed spectrum). According to some embodiments, a UE 215 receiving such a broadcast signal may thus receive the broadcast signal from different base stations 205 during different time periods.

According to various embodiments, transmission of broadcast signals using unlicensed spectrum may be coordinated so as to provide such broadcast transmissions in deployments where a UE 215 may receive signals from multiple base stations 205, thus if one or more base stations 205 are not transmitting the broadcast signal, a UE 215 may still receive the broadcast signal from another base station 205 having an overlapping coverage area. Additional details regarding the implementation of broadcast signals in various LTE deployment scenarios or modes of operation for unlicensed spectrum in a system, such as the wireless communications system 200, as well as other features and functions related to the operation of LTE/LTE-A in an unlicensed spectrum, are provided below with reference to FIGS. 3A-40.

Figure 3A:
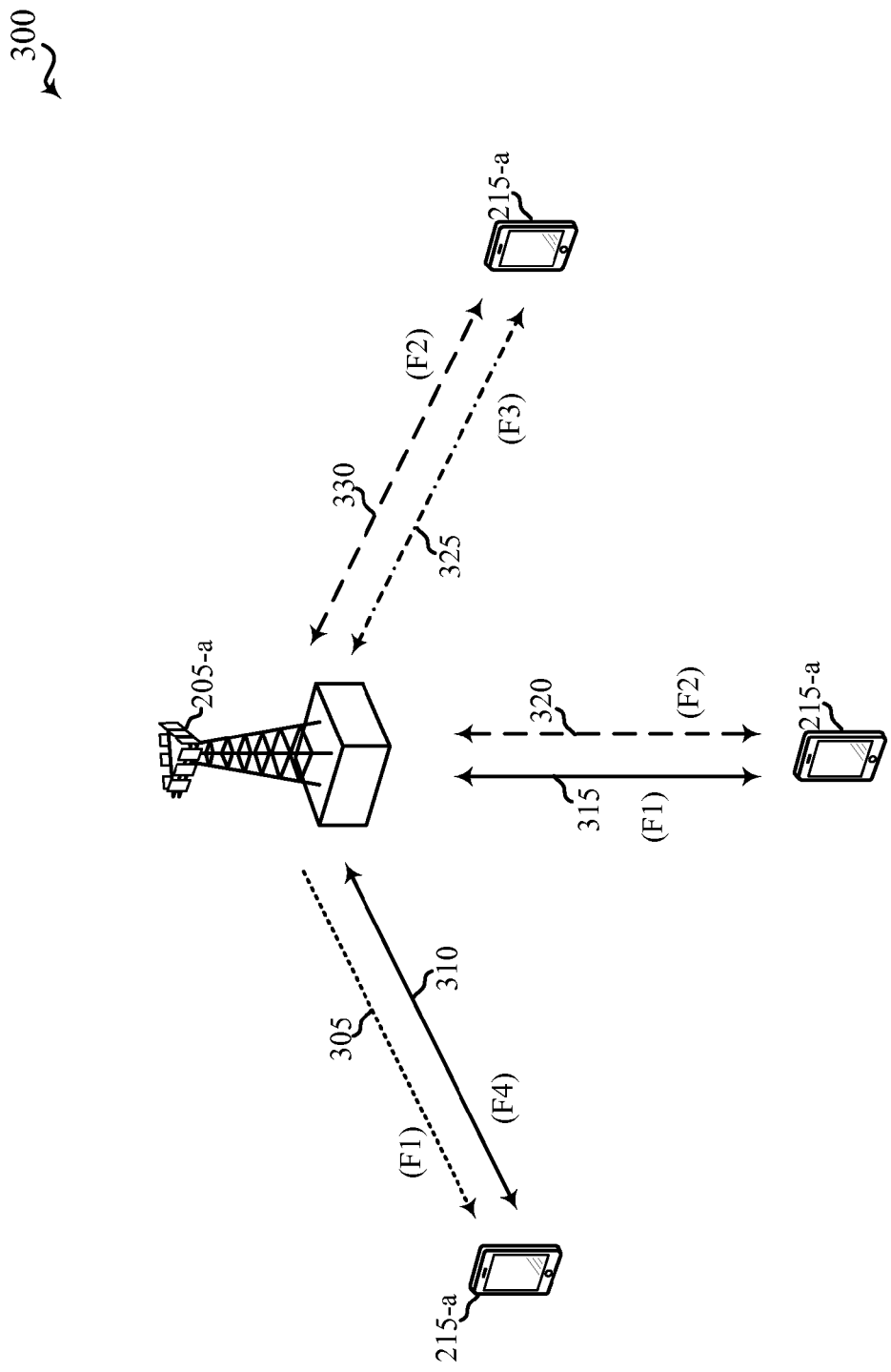
FIG. 3A shows a diagram that illustrates examples of a supplemental downlink mode and of a carrier aggregation mode for an LTE using an unlicensed spectrum according to various embodiments.

FIG. 3A shows a diagram of a wireless communications system 300 illustrating examples of a supplemental downlink mode, a carrier aggregation mode, and a standalone mode for an LTE network that supports LTE/LTE-A communications over an unlicensed spectrum. The wireless communications system 300 may be an example of portions of the wireless communications system 200 of FIG. 2. Moreover, the base station 205-a may be an example of the base stations 205 of FIG. 2, while the UEs 215-a may be examples of the UEs 215 of FIG. 2.

In the example of a supplemental downlink mode in the wireless communications system 300, the base station 205-a may transmit OFDMA communications signals to a UE 215-a using a downlink 305. The downlink 305 is associated with a frequency F1 in an unlicensed spectrum. The base station 205-a may transmit OFDMA communications signals to the same UE 215-a using a bidirectional link 310 and may receive SC-FDMA communications signals from that UE 215-a using the bidirectional link 310. The bidirectional link 310 is associated with a frequency F4 in a licensed spectrum. The downlink 305 in the unlicensed spectrum and the bidirectional link 310 in the licensed spectrum may operate concurrently. The downlink 305 may provide a downlink capacity offload for the base station 205-a. In some embodiments, the downlink 305 may be used for unicast services (e.g., addressed to one UE) services or for multicast services (e.g., addressed to several UEs). This scenario may occur with any service provider (e.g., traditional mobile network operator or MNO) that uses a licensed spectrum and needs to relieve some of the traffic and/or signaling congestion.

In one example of a carrier aggregation mode in the wireless communications system 300, the base station 205-a may transmit OFDMA communications signals to a UE 215-a using a bidirectional link 315 and may receive SC-FDMA communications signals from the same UE 215-a using the bidirectional link 315. The bidirectional link 315 is associated with the frequency F1 in the unlicensed spectrum. The base station 205-a may also transmit OFDMA communications signals to the same UE 215-a using a bidirectional link 320 and may receive SC-FDMA communications signals from the same UE 215-a using the bidirectional link 320. The bidirectional link 320 is associated with a frequency F2 in a licensed spectrum. The bidirectional link 315 may provide a downlink and uplink capacity offload for the base station 205-a. Like the supplemental downlink described above, this scenario may occur with any service provider (e.g., MNO) that uses a licensed spectrum and needs to relieve some of the traffic and/or signaling congestion.

In another example of a carrier aggregation mode in the wireless communications system 300, the base station 205-a may transmit OFDMA communications signals to a UE 215-a using a bidirectional link 325 and may receive SC-FDMA communications signals from the same UE 215-a using the bidirectional link 325. The bidirectional link 325 is associated with the frequency F3 in an unlicensed spectrum. The base station 205-a may also transmit OFDMA communications signals to the same UE 115-a using a bidirectional link 330 and may receive SC-FDMA communications signals from the same UE 215-a using the bidirectional link 330. The bidirectional link 330 is associated with the frequency F2 in the licensed spectrum. The bidirectional link 325 may provide a downlink and uplink capacity offload for the base station 205-a. This example and those provided above are presented for illustrative purposes and there may be other similar modes of operation or deployment scenarios that combine LTE communications in a licensed spectrum and LTE communications in an unlicensed spectrum for capacity offload.

As described above, the typical service provider that may benefit from the capacity offload offered by using LTE communications in an unlicensed spectrum is a traditional MNO with LTE spectrum. For these service providers, an operational configuration may include a bootstrapped mode (e.g., supplemental downlink, carrier aggregation) that uses the LTE primary component carrier (PCC) on the licensed spectrum and the LTE secondary component carrier (SCC) on the unlicensed spectrum.

In the supplemental downlink mode, control for LTE communications in an unlicensed spectrum may be transported over the LTE uplink (e.g., uplink portion of the bidirectional link 310). One of the reasons to provide downlink capacity offload is because data demand is largely driven by downlink consumption. Moreover, in this mode, there may not be a regulatory impact since the UE is not transmitting in the unlicensed spectrum. There is no need to implement listen-before-talk (LBT) or carrier sense multiple access (CSMA) requirements on the UE. However, LBT may be implemented on the base station (e.g., eNB) by, for example, using a periodic (e.g., every 10 milliseconds) clear channel assessment (CCA) and/or a grab-and-relinquish mechanism aligned to a radio frame boundary.

In the carrier aggregation mode, data and control may be communicated in LTE (e.g., bidirectional links 310, 320, and 330) while data may be communicated in an unlicensed spectrum (e.g., bidirectional links 315 and 325). The carrier aggregation mechanisms supported when using an unlicensed spectrum may fall under a hybrid frequency division duplex-time division duplex (FDD-TDD) carrier aggregation or a TDD-TDD carrier aggregation with different symmetry across component carriers.

Figure 3B:
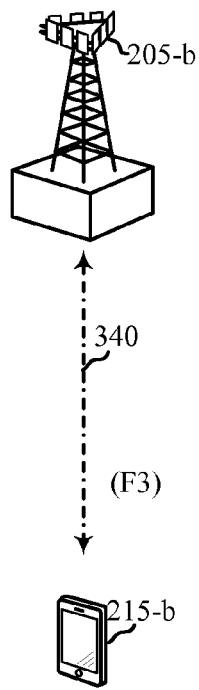
FIG. 3B shows a diagram that illustrates an example of a standalone mode for an LTE using an unlicensed spectrum according to various embodiments.

FIG. 3B shows a diagram of a wireless communications system 300-a illustrating an example of a standalone mode for an LTE using an unlicensed spectrum. The wireless communications system 300-a may be an example of portions of the wireless communications system 200 of FIG. 2. Moreover, the base station 205-b may be an example of the base stations 205 of FIG. 2 and the base station 205-a of FIG. 3A, while the UE 215-b may be an example of the UEs 215 of FIG. 2 and the UEs 215-a of FIG. 3A.

In the example of a standalone mode in the wireless communications system 300-a, the base station 205-b may transmit OFDMA communications signals to the UE 215-b using a bidirectional link 340 and may receive SC-FDMA communications signals from the UE 215-b using the bidirectional link 340. The bidirectional link 340 is associated with the frequency F3 in an unlicensed spectrum described above with reference to FIG. 3A. The standalone mode may be used in non-traditional wireless access scenarios, such as in-stadium access (e.g., unicast, multicast). The typical service provider for this mode of operation may be a stadium owner, cable company, event hosts, hotels, enterprises, and large corporations that do not have licensed spectrum. For these service providers, an operational configuration for the standalone mode may use the PCC on the unlicensed spectrum. Moreover, LBT may be implemented on both the base station and the UE.

Figure 4:
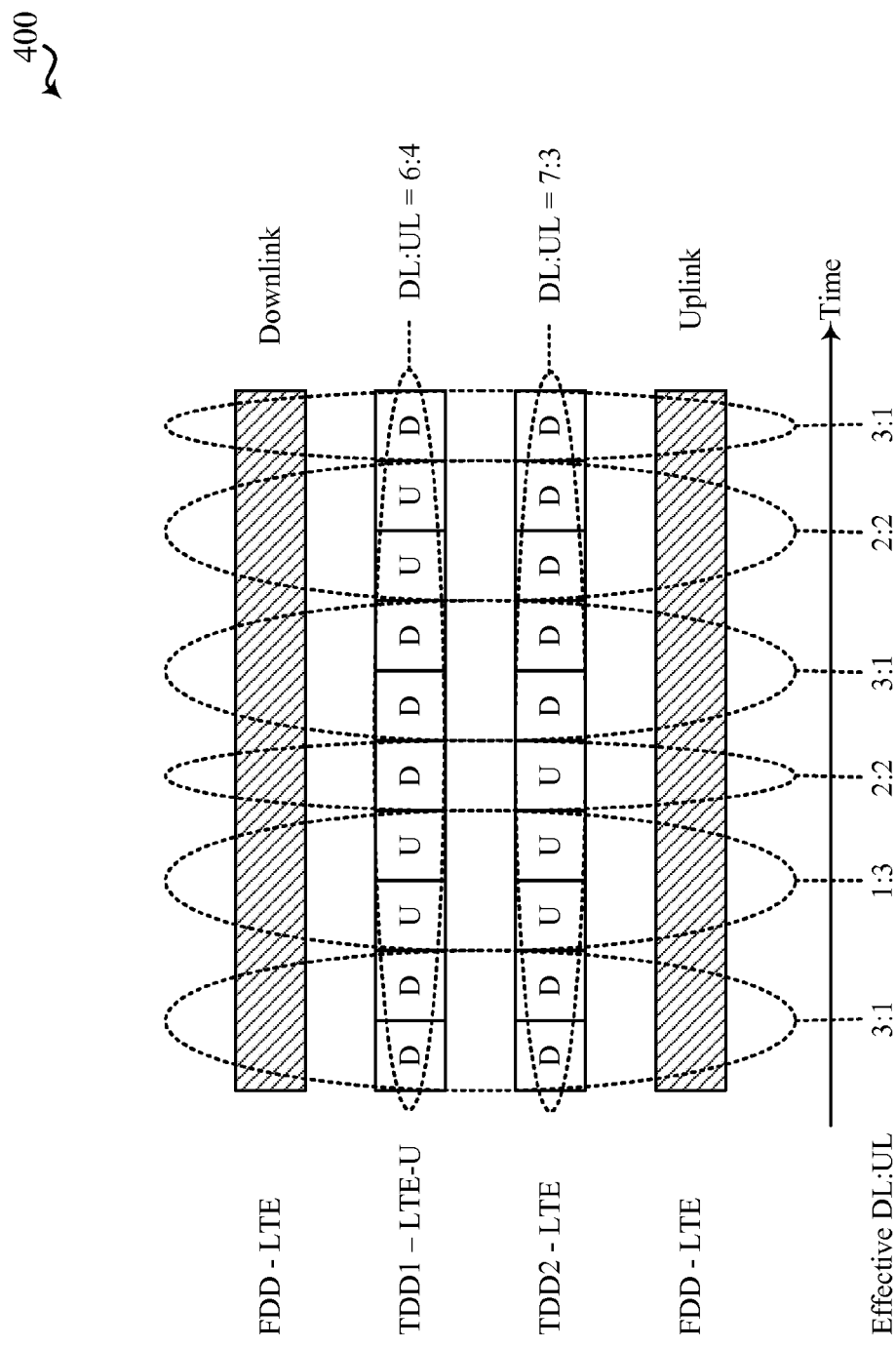
FIG. 4 shows a diagram that illustrates an example of carrier aggregation when using LTE concurrently in licensed and unlicensed spectrum according to various embodiments.

FIG. 4 shows a diagram 400 illustrating an example of carrier aggregation when using LTE concurrently in licensed and unlicensed spectrum according to various embodiments. The carrier aggregation scheme in diagram 400 may correspond to the hybrid FDD-TDD carrier aggregation described above with reference to FIG. 3A. This type of carrier aggregation may be used in at least portions of the wireless communications system 200 of FIG. 2. Moreover, this type of carrier aggregation may be used in the base stations 205, and/or 205-a of FIGS. 2 and/or 3A, and/or in the UEs 215, and/or 215-a of FIGS. 2 and/or 3A.

In this example, an FDD (FDD-LTE) may be performed in connection with LTE in the downlink, a first TDD (TDD1) may be performed in connection with LTE communications in an unlicensed spectrum (referred to as "LTE-U" in FIG. 4), a second TDD (TDD2) may be performed in connection with LTE, and another FDD (FDD-LTE) may be performed in connection with LTE in the uplink TDD1 results in a DL:UL ratio of 6:4, while the ratio for TDD2 is 7:3. On the time scale, the different effective DL:UL ratios are 3:1, 1:3, 2:2, 3:1, 2:2, and 3:1. This example is presented for illustrative purposes and there may be other carrier aggregation schemes that combine the operations of LTE in a licensed spectrum and LTE in an unlicensed spectrum.

In some embodiments, a transmitting device such as a base station 205 or UE 215 (or a transmitter of a transmitting device) may use a gating interval (gated period) to gain access to a channel of the unlicensed spectrum. The gating interval may define the application of a contention-based protocol, such as a Listen Before Talk (LBT) protocol based on the LBT protocol specified in ETSI (EN 301 893). When using a gating interval that defines the application of an LBT protocol, the gating interval may indicate when a transmitting device needs to perform a clear channel assessment (CCA). The outcome of the CCA indicates to the transmitting device whether a channel of the unlicensed spectrum is available or in use. When the CCA indicates that the channel is available (e.g., "clear" for use), the gating interval may allow the transmitting device to use the channel—typically for a predefined period of time. When the CCA indicates that the channel is not available (e.g., in use or reserved), the gating interval may prevent the transmitting device from using the channel for a period of time.

In some cases, it may be useful for a transmitting device to generate a gating interval on a periodic basis and synchronize at least one boundary of the gating interval with at least one boundary of a periodic frame structure. For example, it may be useful to generate a periodic gating interval for a cellular downlink in an unlicensed spectrum, and to synchronize at least one boundary of the periodic gating interval with at least one boundary of a periodic frame structure associated with the cellular downlink Examples of such synchronization are illustrated in FIGS. 5A, 5B, 5C, and 5D.

Figure 5A:
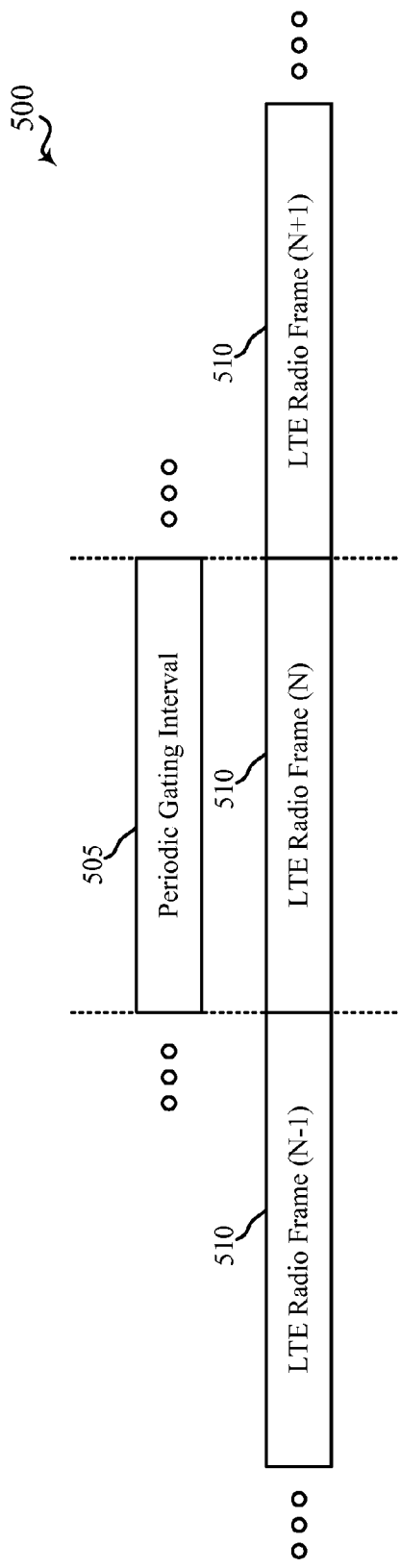
FIG. 5A illustrates a first example of a periodic gating interval for a cellular downlink in an unlicensed spectrum.

FIG. 5A illustrates a first example 500 of a periodic gating interval 505 for a cellular downlink in an unlicensed spectrum. The periodic gating interval 505 may be used by a base station that supports LTE communications over an unlicensed spectrum. Examples of such a base station may be the base stations 205, 205-a, and/or 205-b of FIGS. 2, 3A, and/or 3B. The gating interval 505 may be used with the wireless communications system 200 of FIG. 2 and with portions of the wireless communications system 200 shown in FIGS. 3A and/or 3B.

By way of example, the duration of the periodic gating interval 505 is shown to be equal to (or approximately equal to) the duration of the periodic frame structure 510 associated with the cellular downlink. In some embodiments, "approximately equal" means the duration of the periodic gating interval 505 is within a cyclic prefix (CP) duration of the duration of the periodic frame structure 510.

At least one boundary of the periodic gating interval 505 may be synchronized with at least one boundary of the periodic frame structure 510. In some cases, the periodic gating interval 505 may have boundaries that are aligned with the frame boundaries of the periodic frame structure 510. In other cases, the periodic gating interval 505 may have boundaries that are synchronized with, but offset from, the frame boundaries of the periodic frame structure 510. For example, the boundaries of the periodic gating interval 505 may be aligned with subframe boundaries of the periodic frame structure 510, or with subframe midpoint boundaries (e.g., the midpoints of particular subframes) of the periodic frame structure 510.

In some cases, each periodic frame structure 510 may include an LTE radio frame (e.g., an LTE radio frame (N−1), an LTE radio frame (N), or an LTE radio frame (N+1)). Each LTE radio frame may have a duration of ten milliseconds, and the periodic gating interval 505 may also have a duration of ten milliseconds. In these cases, the boundaries of the periodic gating interval 505 may be synchronized with the boundaries (e.g., frame boundaries, subframe boundaries, or subframe midpoint boundaries) of one of the LTE radio frames (e.g., the LTE radio frame (N)).

Figure 5B:
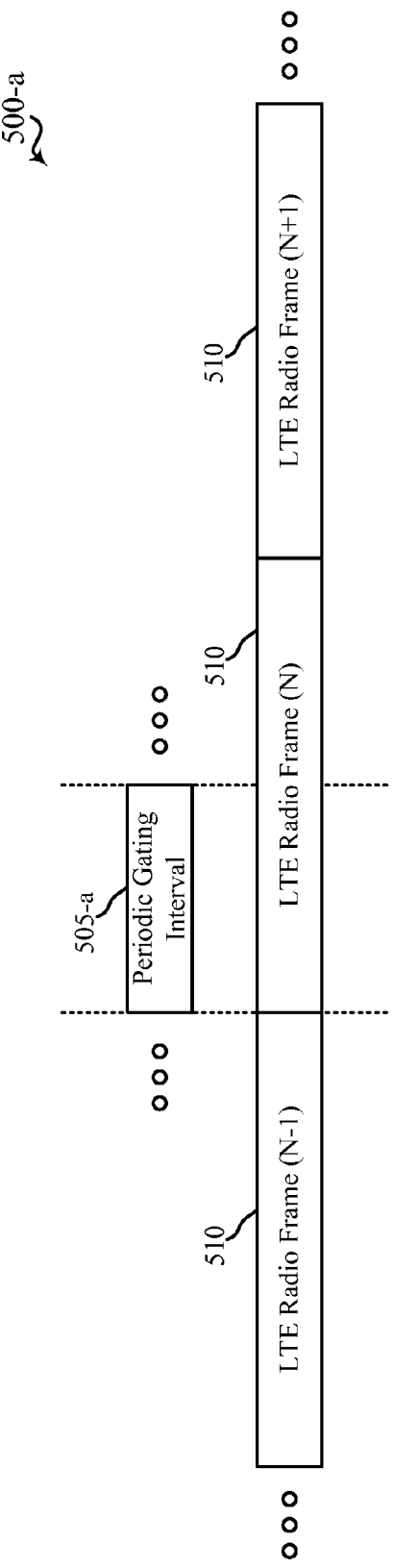
FIG. 5B illustrates a second example of a periodic gating interval for a cellular downlink in an unlicensed spectrum.

FIG. 5B illustrates a second example 500-a of a periodic gating interval 505-a for a cellular downlink in an unlicensed spectrum. The periodic gating interval 505-a may be used by a base station that supports LTE communications over an unlicensed spectrum. Examples of such a base station may be the base stations 205, 205-a, and/or 205-b of FIGS. 2, 3A, and/or 3B. The gating interval 505-a may be used with the wireless communications system 200 of FIG. 2 and with portions of the wireless communications system 200 shown in FIGS. 3A and/or 3B.

By way of example, the duration of the periodic gating interval 505-a is shown to be a sub-multiple of (or an approximate sub-multiple of) the duration of the periodic frame structure 510 associated with the cellular downlink. In some embodiments, an "approximate sub-multiple of" means the duration of the periodic gating interval 505-a is within a cyclic prefix (CP) duration of the duration of a sub-multiple of (e.g., half) the periodic frame structure 510.

At least one boundary of the periodic gating interval 505-a may be synchronized with at least one boundary of the periodic frame structure 510. In some cases, the periodic gating interval 505-a may have a leading or trailing boundary that is aligned with a leading or trailing frame boundary of the periodic frame structure 510. In other cases, the periodic gating interval 505-a may have boundaries that are synchronized with, but offset from, each of the frame boundaries of the periodic frame structure 510. For example, the boundaries of the periodic gating interval 505-a may be aligned with subframe boundaries of the periodic frame structure 510, or with subframe midpoint boundaries (e.g., the midpoints of particular subframes) of the periodic frame structure 510.

In some cases, each periodic frame structure 510 may include an LTE radio frame (e.g., an LTE radio frame (N−1), an LTE radio frame (N), or an LTE radio frame (N+1)). Each LTE radio frame may have a duration of ten milliseconds, and the periodic gating interval 505-a may have a duration of five milliseconds. In these cases, the boundaries of the periodic gating interval 505-a may be synchronized with the boundaries (e.g., frame boundaries, subframe boundaries, or subframe midpoint boundaries) of one of the LTE radio frames (e.g., LTE radio frame (N)). The periodic gating interval 505-a may then be repeated, for example, every periodic frame structure 510, more than once every periodic frame structure 510 (e.g., twice), or once every Nth periodic frame structure 510 (e.g., for N=2, 3, . . . ).

Figure 5C:
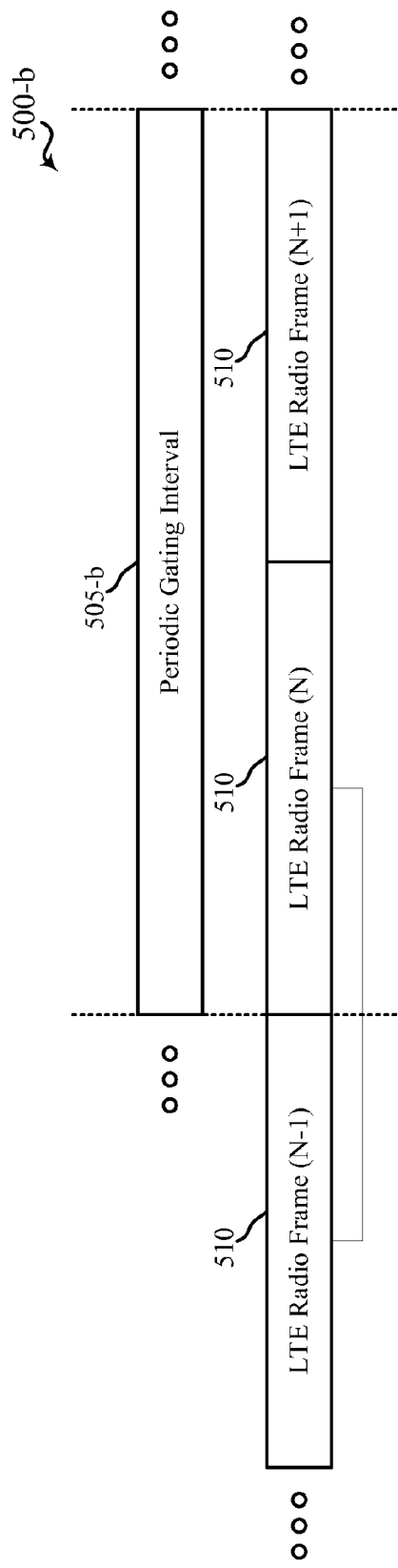
FIG. 5C illustrates a third example of a periodic gating interval for a cellular downlink in an unlicensed spectrum.

FIG. 5C illustrates a third example 500-b of a periodic gating interval 505-b for a cellular downlink in an unlicensed spectrum. The periodic gating interval 505-b may be used by a base station that supports LTE communications over an unlicensed spectrum. Examples of such a base station may be the base stations 205, 205-a, and/or 205-b of FIGS. 2, 3A, and/or 3B. The gating interval 505-b may be used with the wireless communications system 200 of FIG. 2 and with portions of the wireless communications system 200 shown in FIGS. 3A and/or 3B.

By way of example, the duration of the periodic gating interval 505-b is shown to be an integer multiple of (or an approximate integer multiple of) the duration of the periodic frame structure 510 associated with the cellular downlink. In some embodiments, an "approximate integer multiple of" means the duration of the periodic gating interval 505-b is within a cyclic prefix (CP) duration of an integer multiple of (e.g., double) the duration of the periodic frame structure 510.

At least one boundary of the periodic gating interval 505-b may be synchronized with at least one boundary of the periodic frame structure 510. In some cases, the periodic gating interval 505-b may have a leading boundary and a trailing boundary that are aligned with respective leading or trailing frame boundaries of the periodic frame structure 510. In other cases, the periodic gating interval 505-b may have boundaries that are synchronized with, but offset from, the frame boundaries of the periodic frame structure 510. For example, the boundaries of the periodic gating interval 505-b may be aligned with subframe boundaries of the periodic frame structure 510, or with subframe midpoint boundaries (e.g., the midpoints of particular subframes) of the periodic frame structure 510.

In some cases, each periodic frame structure 510 may include an LTE radio frame (e.g., an LTE radio frame (N−1), an LTE radio frame (N), or an LTE radio frame (N+1)). Each LTE radio frame may have a duration of ten milliseconds, and the periodic gating interval 505-b may have a duration of twenty milliseconds. In these cases, the boundaries of the periodic gating interval 505-b may be synchronized with the boundaries (e.g., frame boundaries, subframe boundaries, or subframe midpoint boundaries) of one or two of the LTE radio frames (e.g., LTE radio frame (N) and LTE radio frame (N+1)).

Figure 5D:
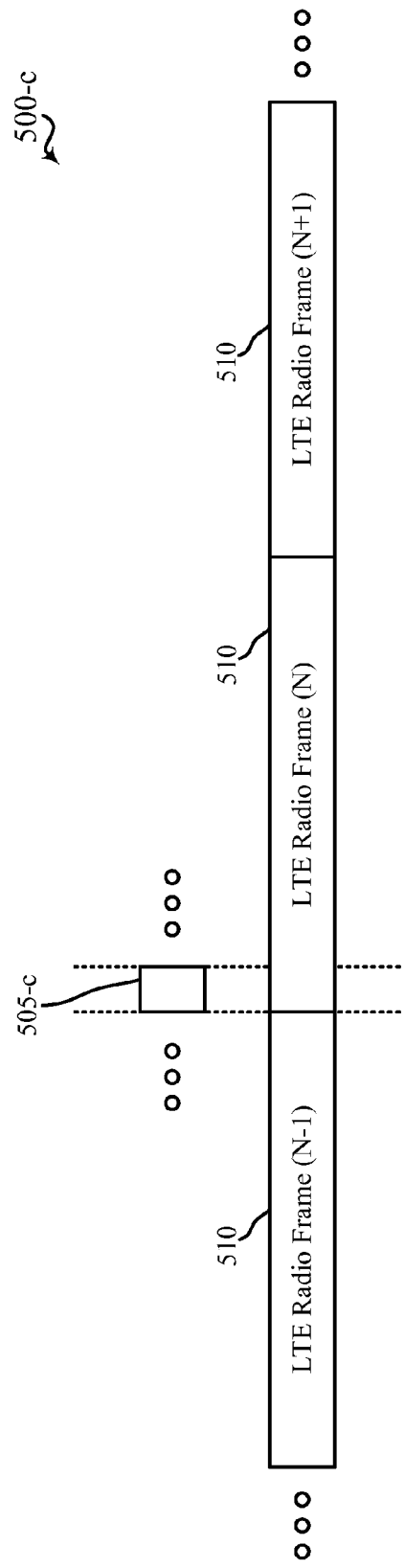
FIG. 5D illustrates a fourth example of a periodic gating interval for a cellular downlink in an unlicensed spectrum.

FIG. 5D illustrates a fourth example 500-c of a periodic gating interval 505-c for a cellular downlink in an unlicensed spectrum. The periodic gating interval 505-c may be used by a base station that supports LTE communications over an unlicensed spectrum. Examples of such a base station may be the base stations 205, 205-a, and/or 205-b of FIGS. 2, 3A, and/or 3B. The gating interval 505-c may be used with the wireless communications system 200 of FIG. 2 and with portions of the wireless communications system 200 shown in FIGS. 3A and/or 3B.

By way of example, the duration of the periodic gating interval 505-c is shown to be a sub-multiple of (or an approximate sub-multiple of) the duration of the periodic frame structure 510 associated with the cellular downlink. The sub-multiple may be one-tenth of the duration of the periodic frame structure 510.

At least one boundary of the periodic gating interval 505-c may be synchronized with at least one boundary of the periodic frame structure 510. In some cases, the periodic gating interval 505-c may have a leading or trailing boundary that is aligned with a leading or trailing frame boundary of the periodic frame structure 510. In other cases, the periodic gating interval 505-c may have boundaries that are synchronized with, but offset from, each of the frame boundaries of the periodic frame structure 510. For example, the boundaries of the periodic gating interval 505-c may be aligned with subframe boundaries of the periodic frame structure 510, or with subframe midpoint boundaries (e.g., the midpoints of particular subframes) of the periodic frame structure 510.

In some cases, each periodic frame structure 510 may include an LTE radio frame (e.g., an LTE radio frame (N−1), an LTE radio frame (N), or an LTE radio frame (N+1)). Each LTE radio frame may have a duration of ten milliseconds, and the periodic gating interval 505-c may have a duration of one millisecond (e.g., the duration of one subframe). In these cases, the boundaries of the periodic gating interval 505-c may be synchronized with the boundaries (e.g., frame boundaries, subframe boundaries, or subframe midpoint boundaries) of one of the LTE radio frames (e.g., LTE radio frame (N)). The periodic gating interval 505-c may then be repeated, for example, every periodic frame structure 510, more than once every periodic frame structure 510, or once every Nth periodic frame structure 510 (e.g., for N=2, 3, . . . ).

Figure 6:
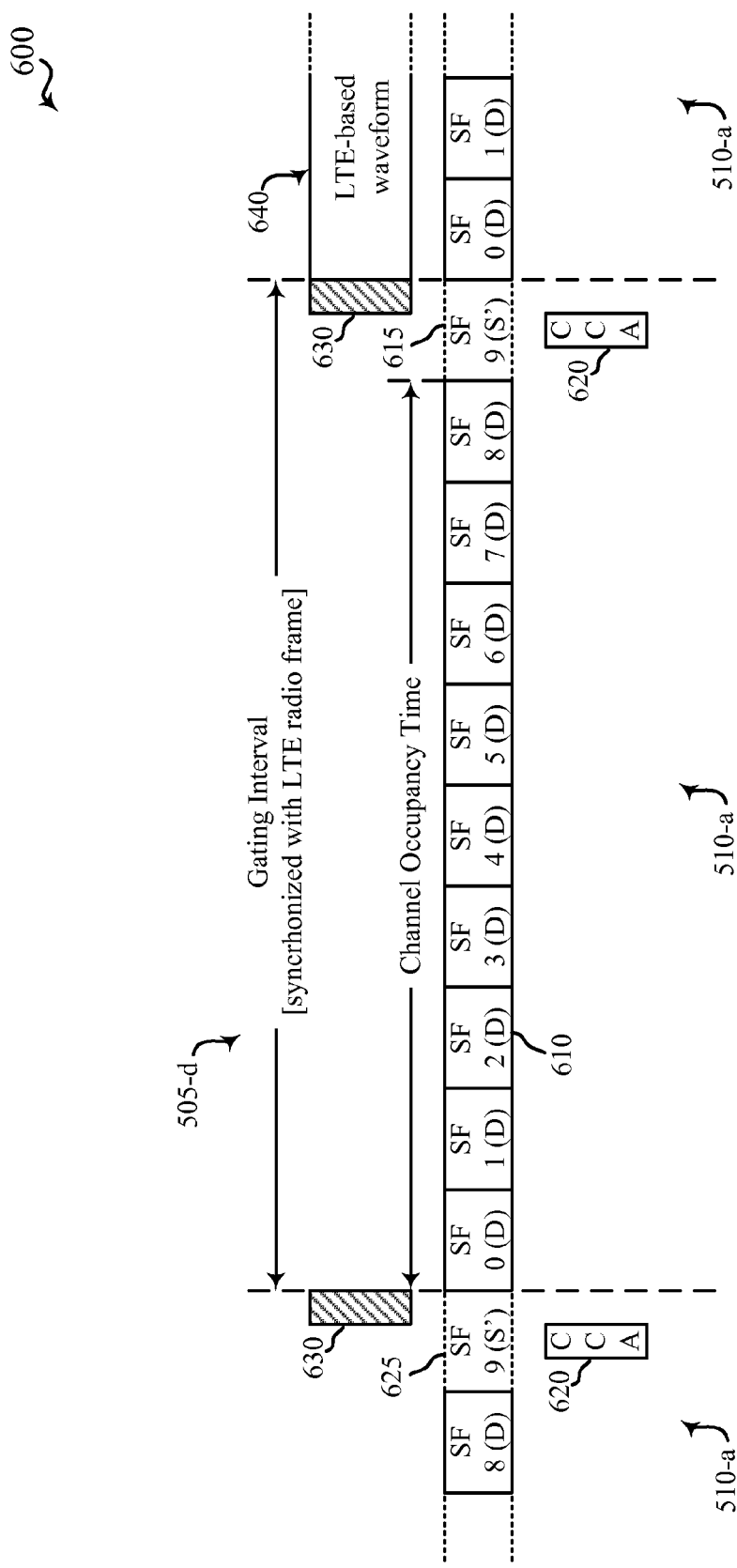
FIG. 6 illustrates a fifth example of a periodic gating interval for a cellular downlink in an unlicensed spectrum.

FIG. 6 illustrates a fifth example 600 of a periodic gating interval 505-d for a cellular downlink in an unlicensed spectrum. The periodic gating interval 505-d may be used by a base station that supports LTE communications over an unlicensed spectrum. Examples of such a base station may be the base stations 205, 205-a, and/or 205-b of FIGS. 2, 3A, and/or 3B. The gating interval 505 may be used with the wireless communications system 200 of FIG. 2 and with portions of the wireless communications system 200 shown in FIGS. 3A and/or 3B.

By way of example, the duration of the periodic gating interval 505-d is shown to be equal to (or approximately equal to) the duration of a periodic frame structure 510-a associated with the cellular downlink. The boundaries of the periodic gating interval 505-d may be synchronized with (e.g., aligned with) the boundaries of the periodic frame structure 510-a.

The periodic frame structure 510-a may include an LTE radio frame having ten subframes (e.g., SF0, SF1, SF9). Subframes SF0 through SF8 may be downlink (D) subframes 610, and subframe SF9 may be a special (S') subframe 615. The D subframes 610 may collectively define a channel occupancy time of the LTE radio frame, and at least part of the S' subframe 615 may define a channel idle time. Under the current LTE standard, an LTE radio frame may have a maximum channel occupancy time (ON time) between one and 9.5 milliseconds, and a minimum channel idle time (OFF time) of five percent of the channel occupancy time (e.g., a minimum of 50 microseconds). To ensure compliance with the LTE standard, the periodic gating interval 505-d may abide by these requirements of the LTE standard by providing a 0.5 millisecond guard period (i.e., OFF time) as part of the S' subframe 615.

Because the S' subframe 615 has a duration of one millisecond, it may include one or more CCA slots 620 (e.g., time slots) in which the transmitting devices contending for a particular channel of an unlicensed spectrum may perform their CCAs. When a transmitting device's CCA indicates the channel is available, but the device's CCA is completed before the end of the periodic gating interval 505-*d*, the device may transmit one or more signals to reserve the channel until the end of the periodic gating interval 505-*d*. The one or more signals may in some cases include Channel Usage Beacon Signals (CUBS) 630. CUBS 630 may be used for both channel synchronization and channel reservation. That is, a device that performs a CCA for the channel after another device begins to transmit CUBS on the channel may detect the energy of the CUBS 630 and determine that the channel is currently unavailable.

Following a transmitting device's successful completion of a CCA for a channel and/or the transmission of CUBS 630 over a channel, the transmitting device may use the channel for up to a predetermined period of time (e.g., one LTE radio frame) to transmit a waveform (e.g., an LTE-based waveform 640).

When a gating interval defines an application of the LBT protocol specified in ETSI (EN 301 893), the gating interval may take the form of an LBT Fixed Based Equipment (LBT-FBE) gating interval or an LBT Load Based Equipment (LBT-LBE) gating interval. An LBT-FBE gating interval may have a fixed/periodic timing and may not be directly influenced by traffic demand (e.g., its timing can be changed through reconfiguration). In contrast, an LBT-LBE gating interval may not have a fixed timing (i.e., be asynchronous) and may be largely influenced by traffic demand. FIGS. 5A, 5B, 5C, 5D, and 6 each illustrate an example of a periodic gating interval 505, which periodic gating interval 505 may be an LBT-FBE gating interval. A potential advantage of the periodic gating interval 505 described with reference to FIG. 5A is that it may preserve the ten millisecond LTE radio frame structure defined in the current LTE specification. However, when the duration of a gating interval is less than the duration of an LTE radio frame (e.g., as descried with reference to FIG. 5B or 5D), the advantages of preserving the LTE radio frame structure no longer exist and an LBT-LBE gating interval may be advantageous. A potential advantage of using an LBT-LBE gating interval is that it may retain the subframe structure of LTE PHY channels, without any symbol puncturing at the beginning or end of the gating interval. However, a potential disadvantage of using an LBT-LBE gating interval is not being able to synchronize the use of a gating interval between the different base stations of an operator (e.g., because each base station uses a random back-off time for an extended CCA).

Figure 7A:
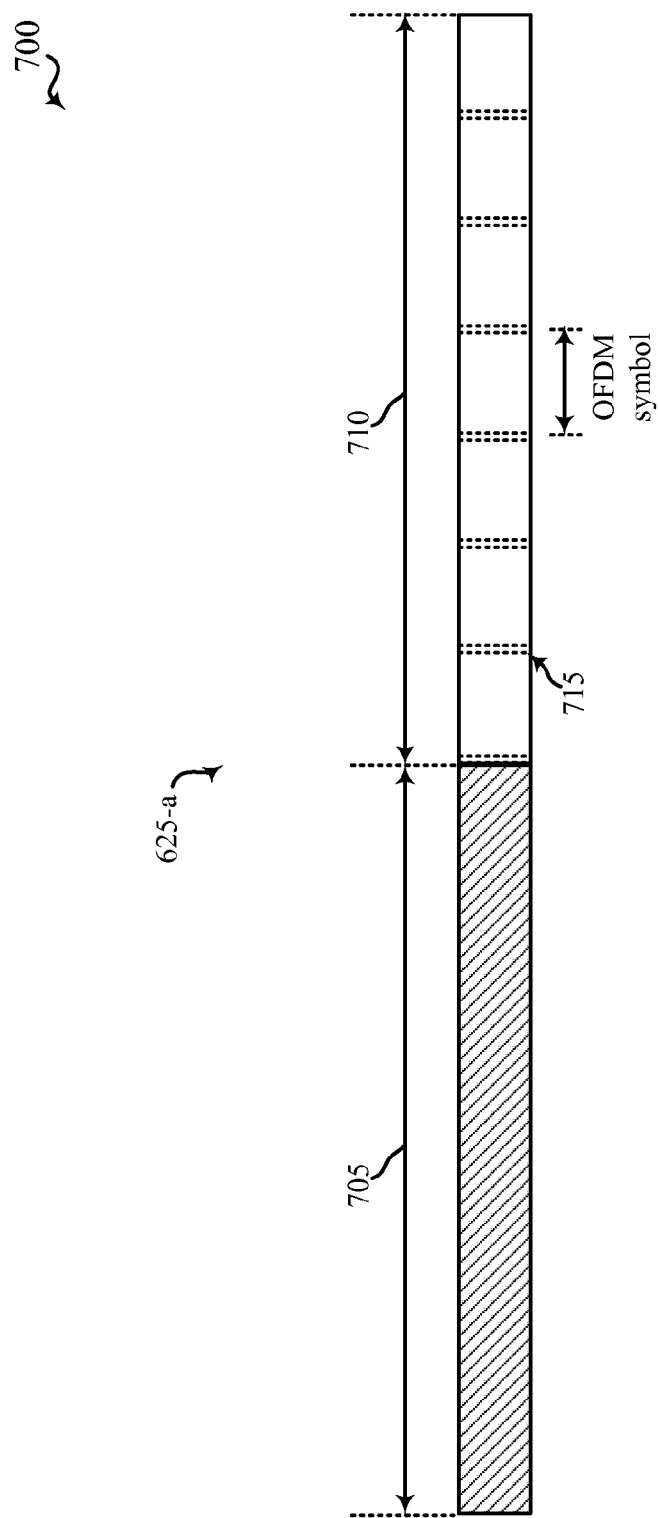
FIGS. 7A and 7B illustrate how a contention-based protocol may be implemented within a subframe of a gating interval.
Figure 7B:
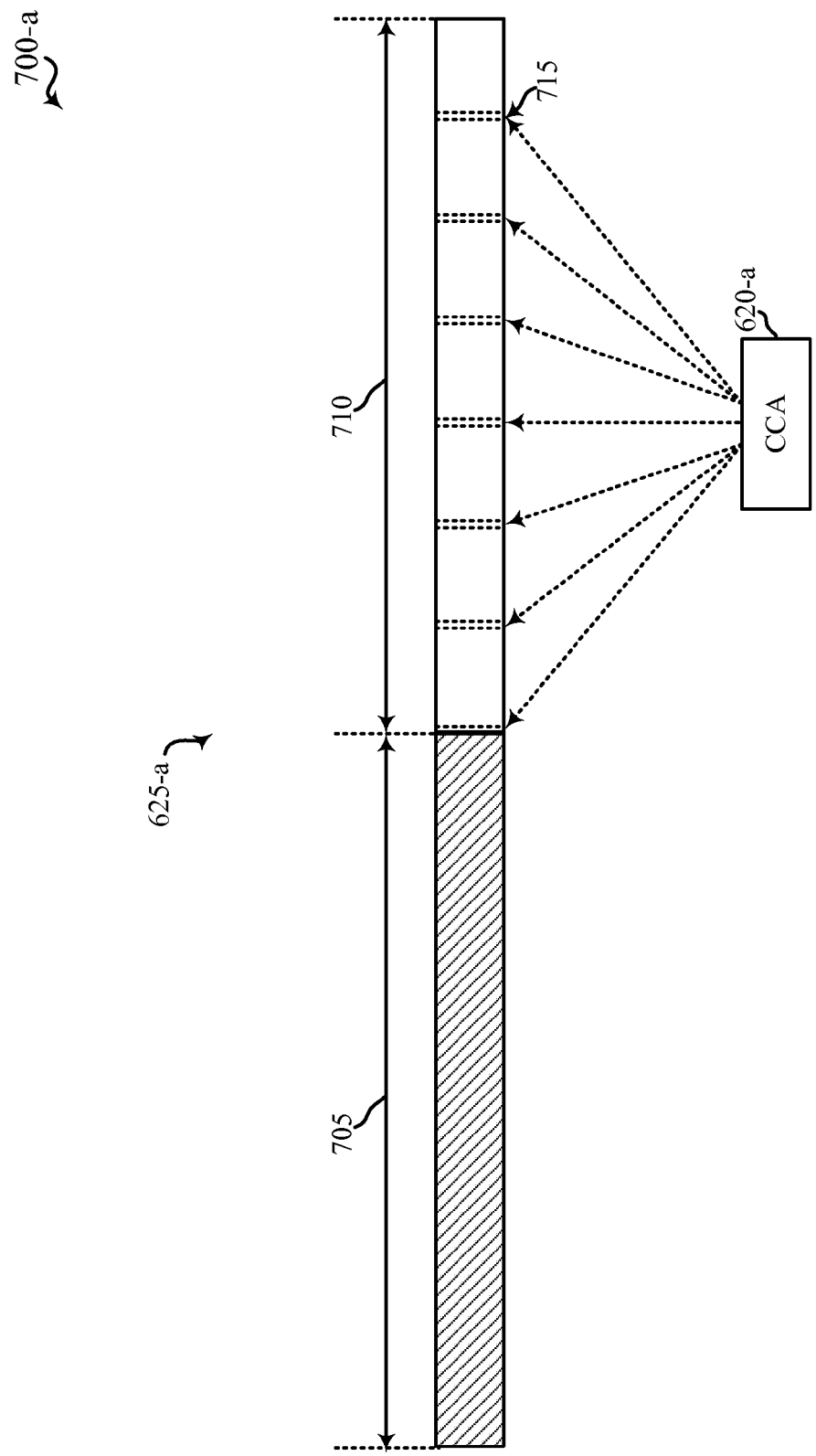

FIGS. 7A and 7B illustrate how a contention-based protocol such as LBT may be implemented within an S' subframe 625-*a* of a gating interval, such as an S' subframe of the ten millisecond gating interval 505-*d* described with reference to FIG. 6. The contention-based protocol may be used with, for example, the base stations 205, 205-*a*, and/or 205-*b* of FIGS. 2, 3A, and/or 3B. The contention-based protocol may be used with the wireless communications system 200 of FIG. 2 and with portions of the wireless communications system 200 shown in FIGS. 3A and/or 3B.

Referring now to FIG. 7A, shown is an example 700 of an S' subframe 625-*a* having a guard period 705 and a CCA period 710. By way of example, each of the guard period 705 and the CCA period 710 may have a duration of 0.5 milliseconds and include seven OFDM symbol positions 715. As shown in FIG. 7B, in an example 700-*a* of an S' subframe, each of the OFDM symbol positions 715 in the CCA period 710 may be transformed into a CCA slot 620-*a* upon a base station selecting the OFDM symbol position 715 for performing a CCA. In some cases, the same or different ones of the OFDM symbol positions 715 may be pseudo-randomly selected by ones of multiple base stations, thereby providing a sort of CCA time dithering. The base stations may be operated by a single LTE operator or different operators. An OFDM symbol position 715 may be pseudo-randomly selected in that a base station may be configured to select different ones of the OFDM symbol positions at different times, thereby giving each of the multiple base stations an opportunity to select the OFDM symbol position 715 that occurs earliest in time. This may be advantageous in that the first base station to perform a successful CCA has an opportunity to reserve a corresponding channel or channels of an unlicensed spectrum, and a base station's pseudo-random selection of an OFDM symbol position 715 for performing a CCA ensures that it has the same chance of performing a successful CCA as every other base station. In the case of base stations operated by a single LTE operator, the base stations may in some cases be configured to select the same CCA slot 620-*a*.

FIGS. 8A and 8B provide examples of how an S' subframe such as the S' subframe 625-*a* described with reference to FIGS. 7A and/or 7B may be used in conjunction with a current gating interval 505. By way of example, the current gating intervals 505-*e*, 505-*g* shown in FIGS. 8A and 8B may be examples of the ten millisecond gating interval 505-*d* described with reference to FIG. 6. The use of S' subframes in conjunction with a current gating interval may be handled by, for example, the base stations 205, 205-*a*, and/or 205-*b* of FIGS. 2, 3A, and/or 3B. The use of S' subframes in conjunction with a current gating interval may be handled may be the wireless communications system 200 of FIG. 2 and with portions of the wireless communications system 200 shown in FIGS. 3A and/or 3B.

FIG. 8A provides an example 800 in which an S' subframe is included as a last subframe of the current gating interval 505-*e*. Thus, the guard period 705-*a* and the CCA period 710-*a* of the S' subframe occur at the end of the current gating interval 505-*e*, just prior to a trailing boundary of the current gating interval 505-*e* and the start of a next transmission interval 505-*f*. The next transmission interval 505-*f* may be gated ON or gated OFF for a downlink transmission of each of a number of transmitting devices, depending on whether a CCA performed by the transmitting device indicates that an unlicensed spectrum is available or unavailable during the next transmission interval 505-*f*. In some cases, the next transmission interval 505-*f* may also be a next gating interval.

FIG. 8B provides an example 800-*a* in which an S' subframe is included as a first subframe of the current gating interval 505-*g*. Thus, the guard period 705-*b* and the CCA period 710-*b* of the S' subframe occur at the start of the current gating interval 505-*g*, just after a leading boundary of the current gating interval 505-*g*. The next transmission interval 505-*h* may be gated ON or gated OFF for a downlink transmission of each of a number of transmitting devices, depending on whether a CCA performed by the transmitting device indicates that an unlicensed spectrum is available or unavailable during the next transmission interval 505-*h*. In some cases, the next transmission interval 505-*h* may also be a next gating interval.

Figure 8C:
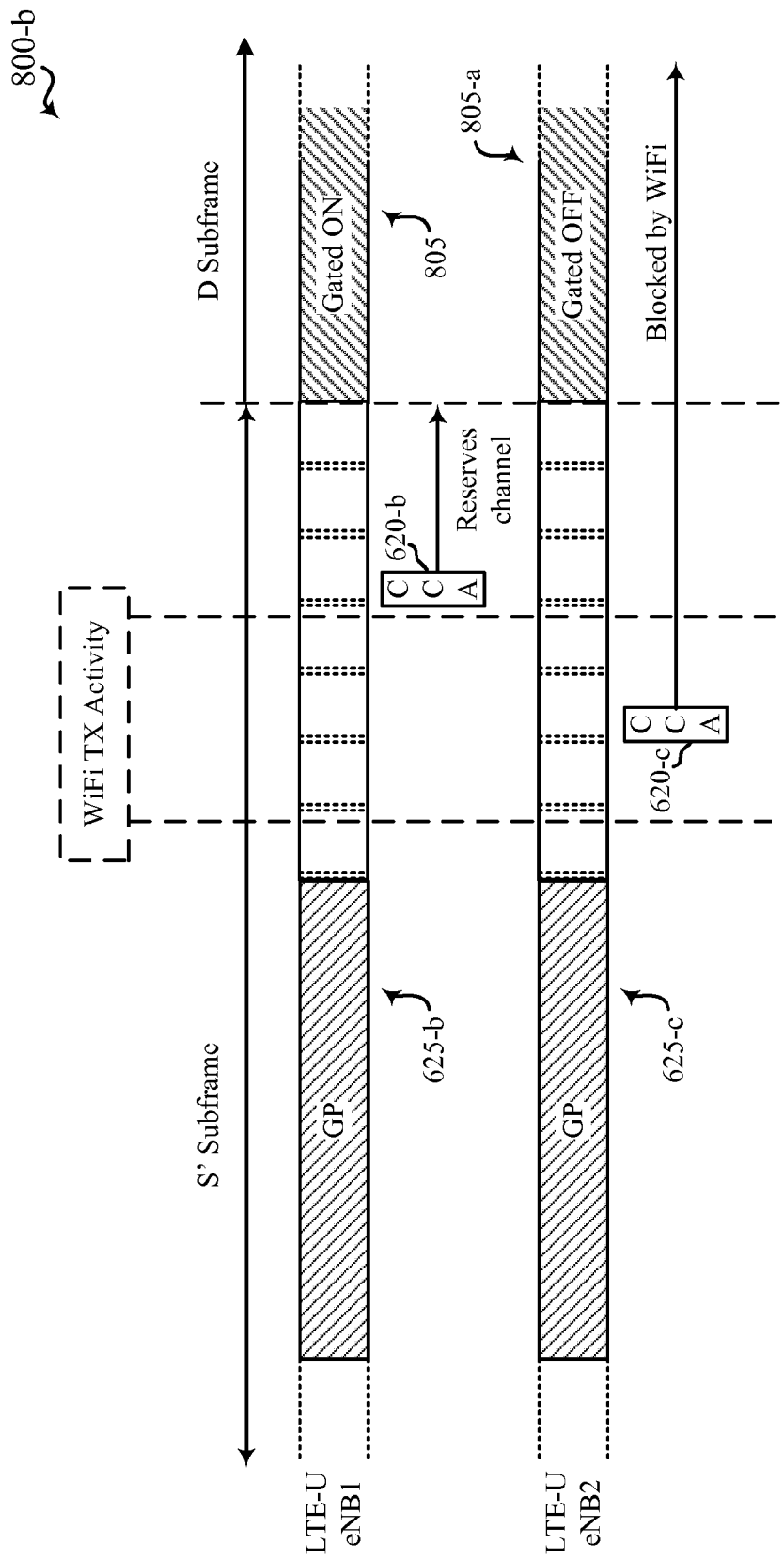
FIG. 8C illustrates an example of how the performance of clear channel assessments (CCAs) for an unlicensed spectrum (or a channel of the unlicensed spectrum) may be synchronized across multiple base stations.

FIG. 8C provides an example 800-b of how the performance of CCAs for an unlicensed spectrum (or a channel of the unlicensed spectrum) may be synchronized across multiple base stations 205. By way of example, the multiple base stations 205 may include an eNB1 and an eNB2. The performance of CCAs may be provided by, for example, the base stations 205, 205-a, and/or 205-b of FIGS. 2, 3A, and/or 3B. The performance of CCAs may be used in the wireless communications system 200 of FIG. 2 and with portions of the wireless communications system 200 shown in FIGS. 3A and/or 3B.

Because of synchronization between the eNB1 and the eNB2, an S' subframe 625-b within a current gating interval of the eNB1 may be synchronized with an S' subframe 625-c within a current gating interval of the eNB2. Also, and because of a synchronized pseudo-random CCA slot selection processes implemented by each eNB, the eNB2 may select a CCA slot 620-c that occurs at a different time (e.g., different OFDM symbol position) than the CCA slot 620-b selected by eNB1. For example, the eNB1 may select a CCA slot 620-b aligned with the fifth OFDM symbol position of the aligned CCA periods of the S' subframes 625-b and 625-c, and the eNB2 may select a CCA slot 620-c aligned with the third OFDM symbol position of the aligned CCA periods.

A next transmission interval following the synchronized S' subframes 625-b and 625-c may begin after the CCA periods of the S' subframes 625-b and 625-c and start with a D subframe, as shown. Because the CCA slot 620-c of the eNB2 is scheduled first in time, the eNB2 has a chance to reserve the next transmission interval before the eNB1 has a chance to reserve the next transmission interval. However, because of the pseudo-random CCA slot selection process implemented by each of eNB1 and eNB2, the eNB1 may be provided the first chance to reserve a later transmission interval (e.g., because its CCA slot may occur at an earlier time than the CCA slot of the eNB2 in a later gating interval).

By way of example, FIG. 8C shows there is a WiFi transmission (Tx) activity that coincides with a portion of the aligned CCA periods of the S' subframes 625-b and 625-c. Because of the timing of the CCA slot 620-c selected by the eNB2, the eNB2 may determine as a result of performing its CCA that the unlicensed spectrum is unavailable, and may gate OFF a downlink transmission 805-a in the unlicensed spectrum for the next transmission interval. A downlink transmission of the eNB2 may therefore be blocked as a result of the WiFi Tx activity occurring during performance of the eNB2's CCA.

During the CCA slot 620-b, the eNB1 may perform its CCA. Because of the timing of the CCA slot 620-b selected by the eNB1, the eNB1 may determine as a result of performing its CCA that the unlicensed spectrum is available (e.g., because the WiFi Tx activity does not occur during the CCA slot 620-b, and because the eNB2 was not able to reserve the next transmission interval at an earlier time). The eNB1 may therefore reserve the next transmission interval and gate ON a downlink transmission 805 in the unlicensed spectrum for the next transmission interval. Methods for reserving the unlicensed spectrum (or a channel of the unlicensed spectrum) are described in detail later in this description.

FIGS. 7A, 7B, 8A, 8B, and 8C provide examples of how a CCA slot 620 may be selected in the context of a ten millisecond gating interval, such as the gating interval 505-d described with reference to FIG. 6. In contrast, FIGS. 8D, 8E, 8F, and 8G provide examples of how a CCA slot 620 may be selected in the context of a one or two millisecond gating interval. A gating interval of ten milliseconds may provide advantages such as a low gating interval overhead in the presence of a low WiFi activity, and an ability to retain the subframe-based PHY channel design of existing LTE channels. However, it may have the disadvantage of a long channel idle time (e.g., 0.5+ milliseconds, depending on a CCA delay induced by CCA dithering), which may provide a WiFi node with a short contention window transmit opportunity (e.g., a transmit opportunity during the guard period 705 described with reference to FIGS. 7A and 7B). It may also have the disadvantage of delaying a downlink transmission at least ten milliseconds when a CCA is not successful. A gating interval of, for example, one or two milliseconds may lead to a higher gating interval overhead, and may require more extensive changes to the LTE PHY channel design to support sub-millisecond transmit durations. However, a gating interval of perhaps one or two milliseconds may mitigate or eliminate the aforementioned disadvantages associated with a ten millisecond gating interval.

Figure 8D:
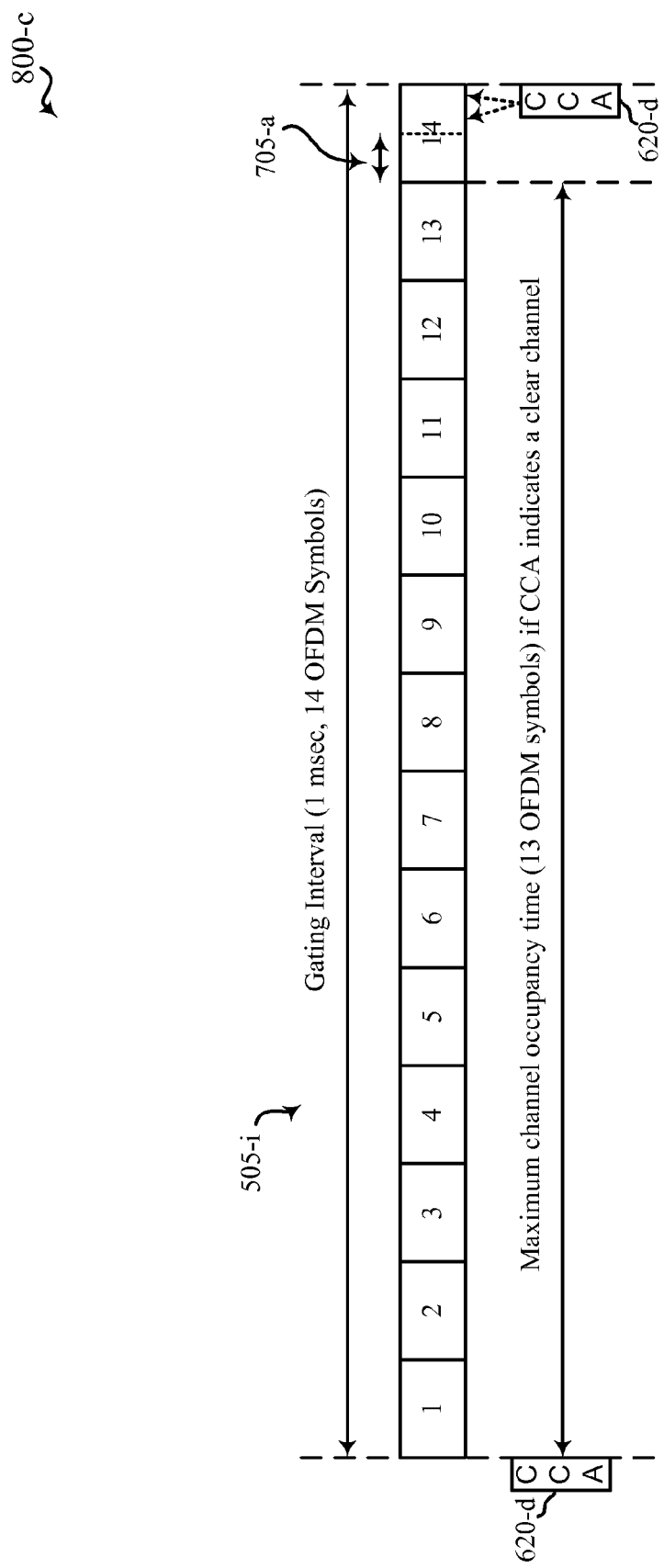
FIGS. 8D, 8E, 8F, and 8G illustrate examples of how a CCA slot may be selected in the context of a one or two millisecond gating interval.

FIG. 8D provides an example 800-c of a one millisecond gating interval 505-i. A one millisecond gating interval may be used by the base stations 205, 205-a, and/or 205-b of FIGS. 2, 3A, and/or 3B. The one millisecond gating interval may be used in the wireless communications system 200 of FIG. 2 and with portions of the wireless communications system 200 shown in FIGS. 3A and/or 3B.

The current LTE specification requires a channel occupancy time (ON time)≥one millisecond, and a channel idle time≥five percent of the channel occupancy time. Thus, the current LTE specification dictates a minimum gating interval duration of 1.05 milliseconds. However, if the LTE specification could be relaxed to require a minimum channel occupancy time of perhaps 0.95 milliseconds, then a one millisecond gating interval would be possible.

As shown in FIG. 8D, a gating interval 505-i of one millisecond may include 14 OFDM symbols (or symbol positions). When a successful CCA is performed during a CCA slot 620-d preceding the gating interval 505-i, a downlink transmission may occur during the first 13 OFDM symbols of the gating interval 505-i. Such a downlink transmission may have a duration (or channel occupancy time) of 929 microseconds. In accord with the current LTE standard, a channel occupancy time of 929 microseconds would require a channel idle time or guard period 705-a of 48 microseconds, which is less than the 71.4 microsecond duration of one OFDM symbol. As a result, the channel idle time or guard period 705-a of 48 microseconds, as well as one or more CCA slots 620-d, may be provided during the 14th OFDM symbol position. In some cases, two CCA slots 620-d having a total duration of 20 microseconds may be provided during the 14th OFDM symbol position, thereby enabling some amount of CCA randomization (dithering). Of note, each CCA slot 620-d in the example 800-c has a duration of less than one OFDM symbol.

Figure 8E:
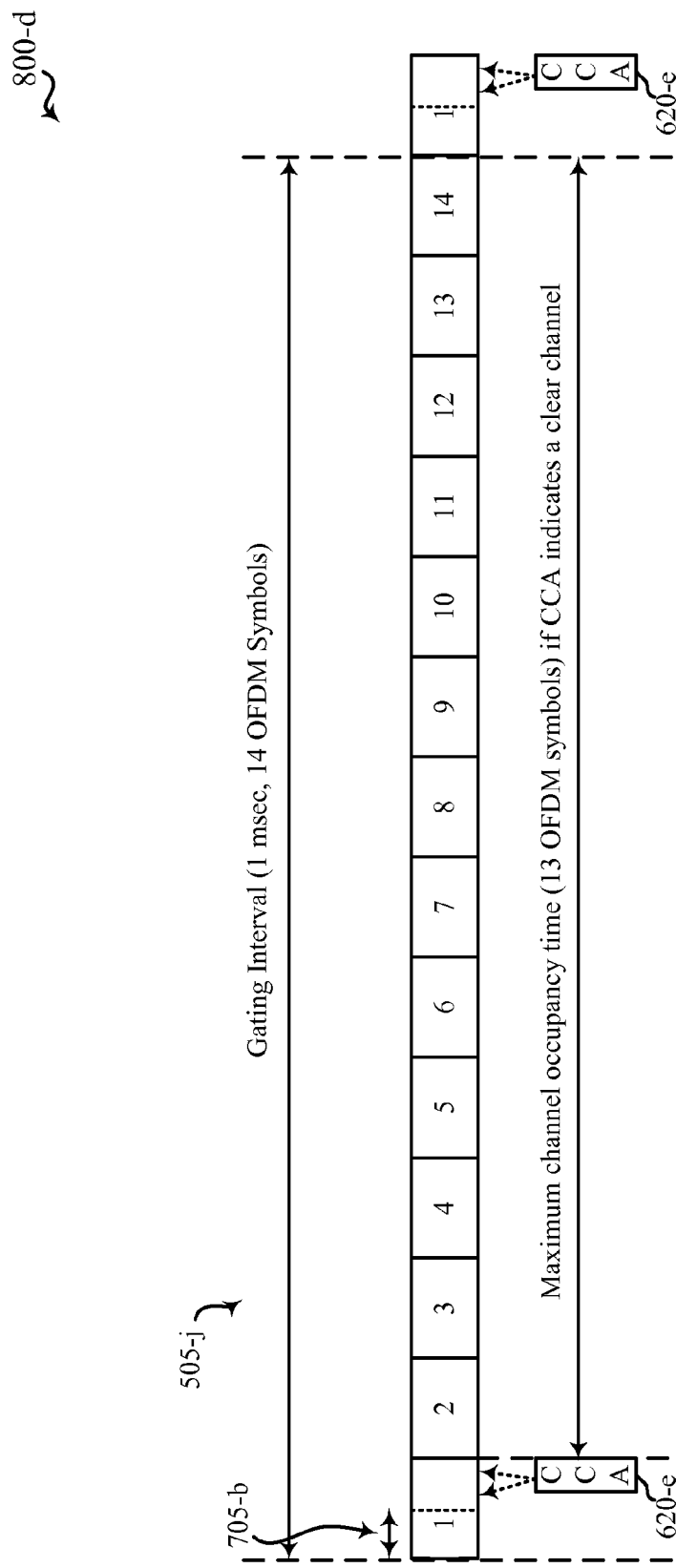

Because the CCA slots 620-d are positioned at the end of the one millisecond gating interval 505-i or subframe shown in FIG. 8D, the gating interval 505-i is common reference signal (CRS) friendly. An example 800-d of a one millisecond gating interval 505-j that is UE-specific reference signal (UERS) friendly is shown in FIG. 8E. Similar to the gating interval 505-i, the gating interval 505-j includes 14 OFDM symbols. However, the channel idle time or guard period 705-b and CCA slots 620-e are provided in the first OFDM symbol position. A successful CCA performed during a CCA slot 620-e of the current gating interval 505-j thereby enables the unlicensed spectrum to be reserved, and enables a downlink transmission to be made, in the current gating interval. The next transmission interval is therefore included within the current gating interval.

Figure 8F:
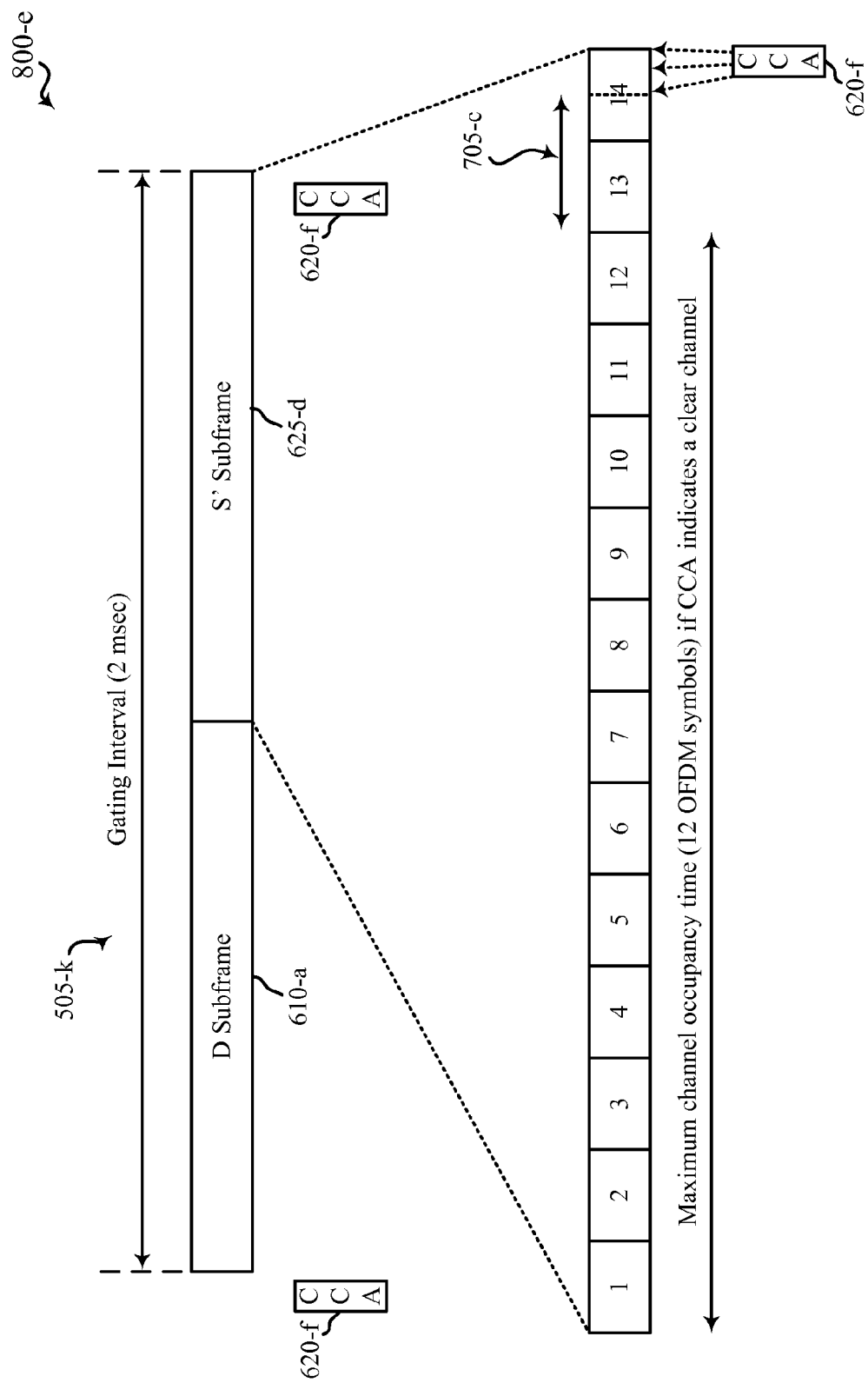

FIG. 8F provides an example 800-*e* of a two millisecond gating interval 505-*k*. A two millisecond gating interval may be used by the base stations 205, 205-*a*, and/or 205-*b* of FIGS. 2, 3A, and/or 3B. The two millisecond gating interval may be used in the wireless communications system 200 of FIG. 2 and with portions of the wireless communications system 200 shown in FIGS. 3A and/or 3B.

In contrast to the one millisecond gating intervals 505-*i* and 505-*j*, the two millisecond gating interval 505-*k* complies with the current LTE specification requirements for maximum channel occupancy time and minimum channel idle time.

As shown, the gating interval 505-*k* may include a D subframe 610-*a* and an S' subframe 625-*d*. However, the S' subframe is configured somewhat differently than previously described S' subframes. More particularly, the first 12 OFDM symbol positions of the S' subframe, as well as the 14 OFDM symbol positions of the preceding D subframe, may be used for a downlink transmission upon performing a successful CCA during a CCA slot 620-*f* preceding the gating interval 505-*k*. The channel occupancy time may therefore be 1.857 milliseconds, requiring a channel idle time or guard period 705-*c* of 96 microseconds. The channel idle time or guard period 705-*c* may therefore occupy the 13th OFDM symbol position of the S' subframe and part of the 14th OFDM symbol position of the S' subframe. However, the remaining duration of the 14th OFDM symbol position may be filled, at least in part, by a number of CCA slots 620-*f*. In some cases, the number of CCA slots 620-*f* may be three CCA slots 620-*f*, which provides a slightly greater amount of CCA randomization (dithering) than the one millisecond gating intervals described with reference to FIGS. 8D and 8E.

Figure 8G:
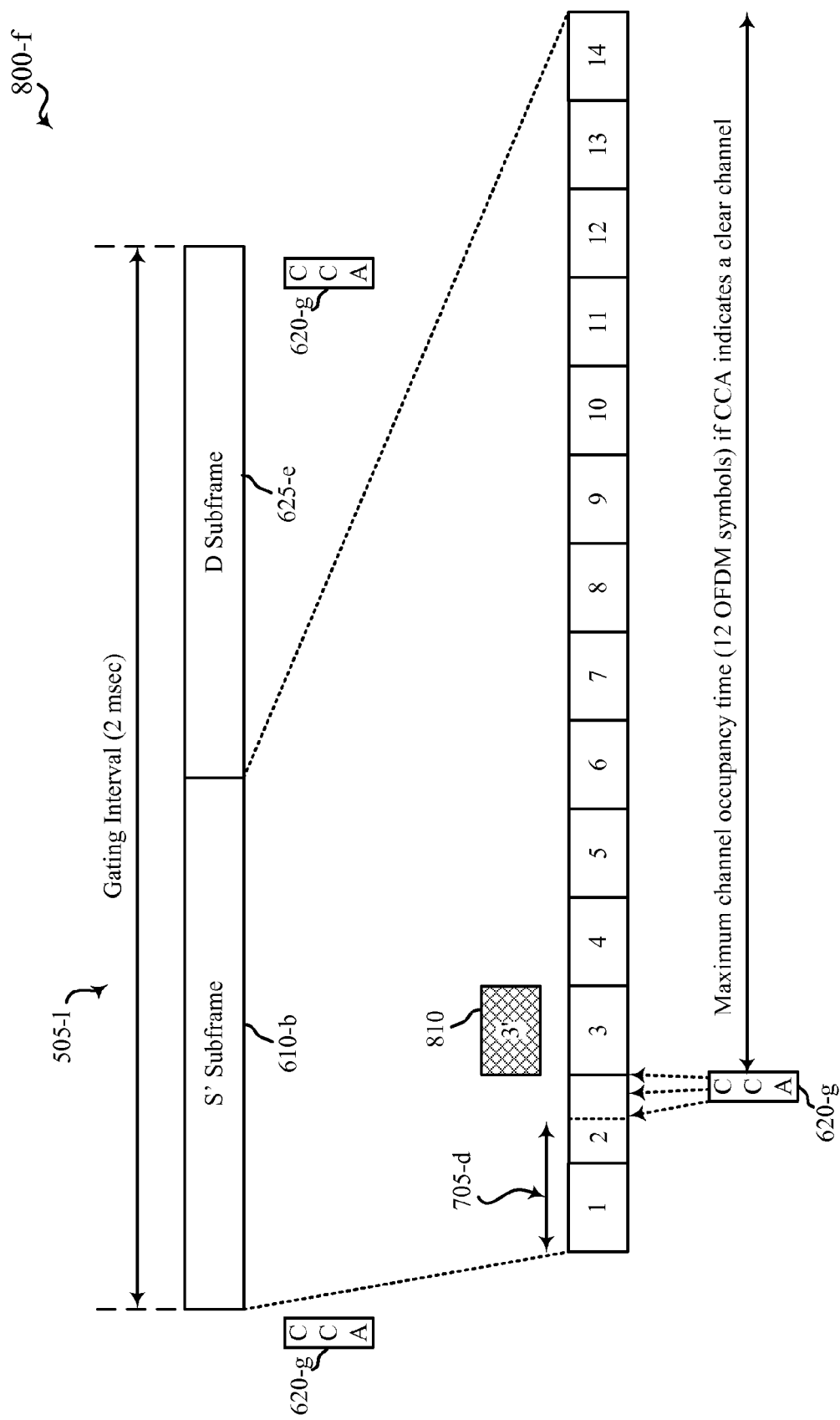

Because the CCA slots 620-*f* are positioned at the end of the two millisecond gating interval 505-*k* shown in FIG. 8F, the gating interval 505-*k* is CRS friendly. An example 800-*f* of a two millisecond gating interval 505-*l* that is UERS friendly is shown in FIG. 8G. Similar to the gating interval 505-*k*, the gating interval 505-*l* includes a D subframe 625-*e* and an S' subframe 610-*b*. However, the temporal order of the subframes is reversed, with the S' subframe 610-*b* occurring first in time and the D subframe 625-*e* occurring later in time. Furthermore, the channel idle time or guard period 705-*d* and CCA slots 620-*g* are provided in the first OFDM symbol position of the S' subframe 610-*b*. A successful CCA performed during a CCA slot 620-*g* of the current gating interval 505-*l* thereby enables the unlicensed spectrum to be reserved, and enables a downlink transmission 810 to be made, in the current gating interval. The next transmission interval is therefore included within the current gating interval.

Figure 9:
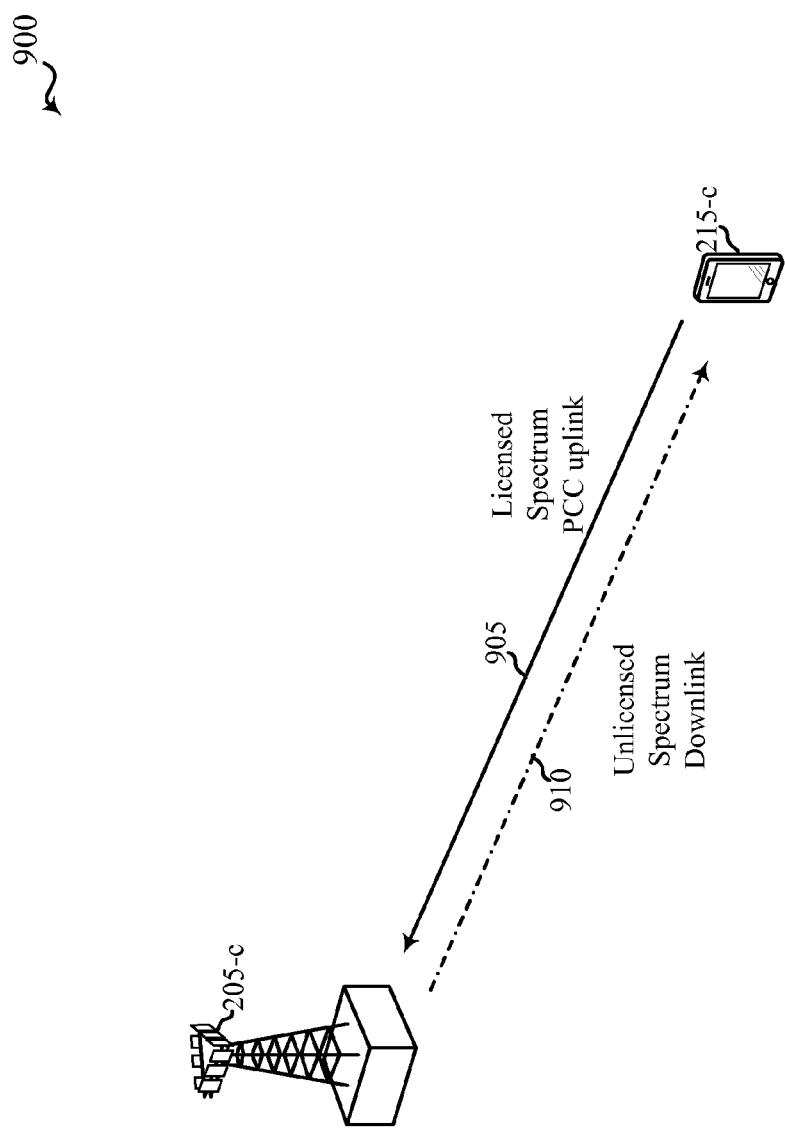
FIG. 9 shows a diagram that illustrates communications between a base station and a UE.

FIG. 9 shows a diagram 900 illustrating communications between a base station 205-*c* and a UE 215-*c*. The base station 205-*c* may be an example of the base stations 205, 205-*a*, and/or 205-*b* of FIGS. 2, 3A, and/or 3B. The UE 215-*c* may be an example of the UEs 215, 215-*a*, and/or 215-*b* of FIGS. 2, 3A, and/or 3B. The base station 205-*c* and the UE 215-*c* may be used in the wireless communications system 200 of FIG. 2 and with portions of the wireless communications system 200 shown in FIGS. 3A and/or 3B.

The base station 205-*c* may communicate with the UE 215-*c* via a downlink 910 in an unlicensed spectrum, and the UE 215-*c* may communicate with the base station 205-*c* via a primary component carrier (PCC) uplink 905 in a licensed spectrum. The UE 215-*c* may transmit feedback information to the base station 205-*c* via the PCC uplink 905, and the base station 205-*c* may receive the feedback information from the UE 215-*c* via the PCC uplink 905. In some cases, the feedback information may address (or pertain to) signals transmitted from the base station 205-*c* to the UE 215-*c* via the downlink 910. Transmitting feedback information for the unlicensed spectrum via the licensed spectrum may improve the reliability of feedback information for the unlicensed spectrum.

The feedback information may in some cases include feedback information for at least one transmission interval gated from the downlink 910.

In some embodiments, the feedback information may include channel state information (CSI), such as CSI for the downlink 910. For at least one transmission interval during which the base station 205-*c* gated OFF transmissions for the downlink 910, the CSI may include long-term CSI. However, for at least one transmission interval during which the base station 205-*c* gated ON transmissions for the downlink, the CSI may include short-term CSI. The long-term CSI may include, for example, radio resource management (RRM) information that captures the details of the channel interference environment (e.g., information identifying each source of dominant interference, whether it be a WiFi, station (STA), and/or base station, for example; information identifying an average strength and/or spatial characteristics of each interfering signal; etc.). The short-term CSI may include, for example, a CQI, a rank indicator (RI), and/or a pre-coding matrix indicator. In some cases, the CSI may be sent from a UE 215-*c* to a base station 205-*c*, via the PCC uplink 905, in a second subframe following the start of downlink transmissions in a current transmission interval in the unlicensed spectrum.

In some embodiments, the feedback information may include HARQ feedback information, such as HARQ feedback information for the downlink 910. In one example of HARQ transmission, HARQ may ignore transmission intervals where downlink transmissions were gated OFF. In another example of HARQ transmission, HARQ may be used for transmission intervals where downlink transmissions are gated ON, and a simple automated repeat request (ARQ) may be used for transmission intervals where downlink transmissions are gated OFF. Both examples may retain almost full HARQ functionality in the context of a single deployment with no WiFi interference. However, in the presence of WiFi interference or multiple deployments (e.g., deployments for an unlicensed spectrum by different operators), the second example may be forced to predominantly use ARQ, in which case CSI may become the main tool for link adaptation. Asynchronous HARQ may be transmitted in a manner that is unaffected by gating of the unlicensed spectrum.

When a downlink transmission is not acknowledged (NAK'd), a best effort HARQ retransmission may be made via the downlink 910. However, after a timeout period, the NAK'd packet may be recovered through radio link control (RLC) retransmissions via the downlink 910 or a PCC downlink.

The base station 205-*c* may in some cases use both the long-term CSI and the short-term CSI to select a modulation and coding scheme (MCS) for the downlink 910 in the unlicensed spectrum. The HARQ may then be used to fine-tune the served spectral efficient of the downlink 910 in real-time.

Figure 10:
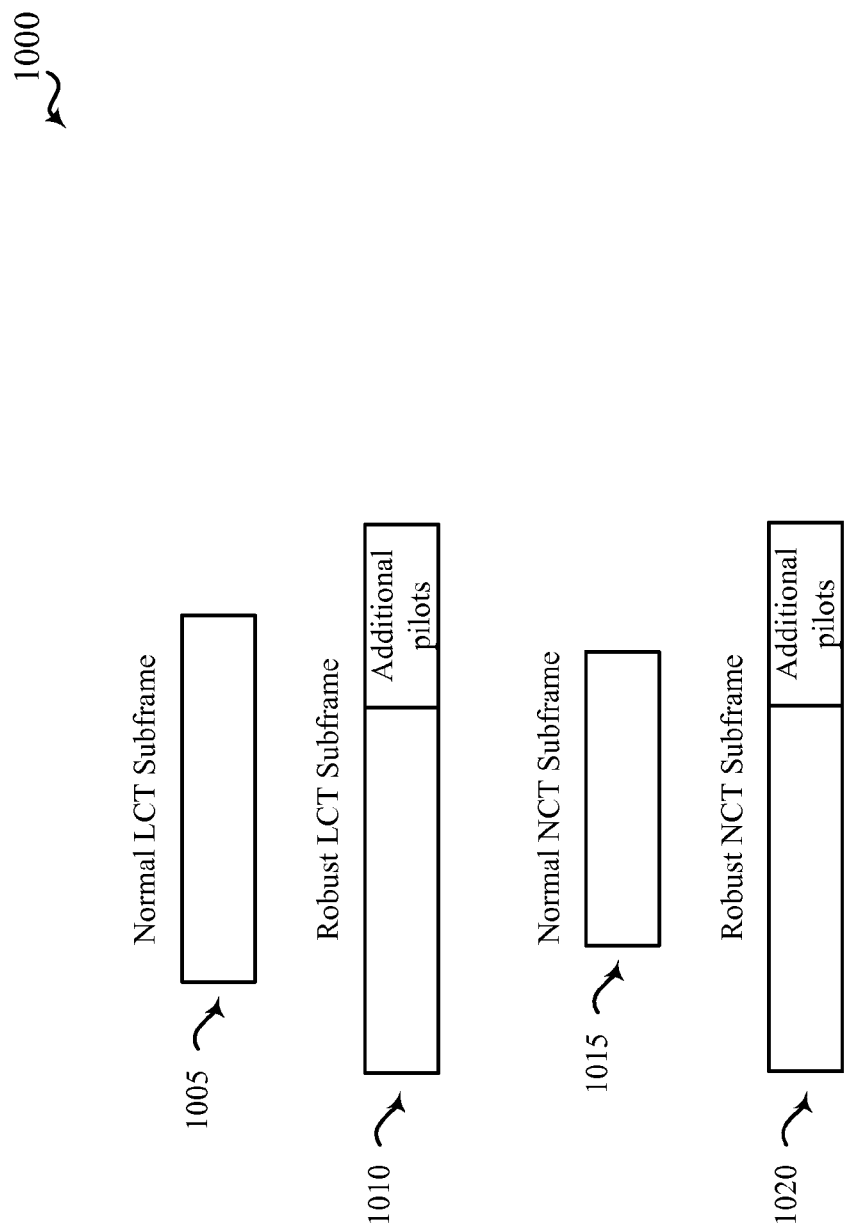
FIG. 10 shows a diagram that illustrates examples of normal and robust subframes in an unlicensed spectrum according to various embodiments.

FIG. 10 shows a diagram 1000 illustrating examples of normal and robust subframes in an unlicensed spectrum according to various embodiments. The normal and robust subframes may be transmitted by base stations that support LTE/LTE-A communications in an unlicensed spectrum. Examples of such base stations may be the base stations 205, 205-*a*, and/or 205-*b* of FIGS. 2, 3A, and/or 3B. The normal and robust subframes may be used by UEs that support LTE/LTE-A communications in an unlicensed spectrum.

Examples of such UEs may be the UEs 215, 215-a, and/or 215-b of FIGS. 2, 3A, and/or 3B.

A normal legacy carrier type (LCT) subframe 1005 is shown. Normal LCT subframes 1005 may be used for LCT waveforms and may carry time-division multiplexed (TDM) PDCCH and CRS. Also shown is a normal new carrier type (NCT) subframe 1015. Normal NCT subframes 1015 may be used for NCT waveforms but may not include TDM PDCCH and CRS. Instead, a UE may use channel state information-reference signals (CSI-RS) for feedback and UE-RS for demodulation. In addition to the normal LCT and NCT subframes, FIG. 10 shows a robust LCT subframe 1010 and a robust NCT subframe 1020. Robust subframes may differ from the normal ones in that they may include additional pilots (e.g., common pilots, enhanced CRS (eCRS)), which may be used to facilitate time-frequency tracking and channel estimation at the UE after a long gated-OFF period of LTE DL transmissions.

For gated LCT waveforms, SYNC subframes (e.g., subframes carrying PSS, SSS, (possibly) PBCH, in addition to other LTE subchannels) may be transmitted in a subframe index=0 (mod 5). The robust LCT subframes 1010 may be transmitted for the first X subframes after a gated-OFF period that is greater than Y subframes. The parameters X and Y may vary based on the structure of the subframes and usage rules, for example. Normal LCT subframes 1005 may be transmitted in all other gated-ON periods.

For gated NCT waveforms, SYNC subframes may be transmitted in a subframe index=0 (mod 5). The robust NCT subframes 1020 may be transmitted for the first X subframes after a gated-OFF period that is greater than Y subframes. The parameters X and Y may vary based on the structure of the subframes and usage rules, for example. Normal NCT subframes 1015 may be transmitted in all other gated-ON periods.

Figure 11:
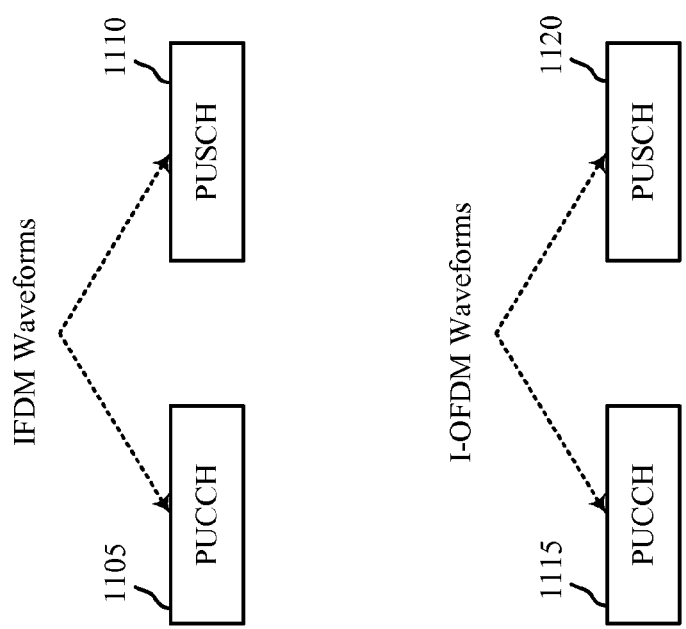
FIG. 11 shows a diagram that illustrates examples of Physical Uplink Control Channel (PUCCH) signals and Physical Uplink Shared Channel (PUSCH) signals for an unlicensed spectrum according to various embodiments.

FIG. 11 shows a diagram 1100 illustrating examples of Physical Uplink Control Channel (PUCCH) signals and Physical Uplink Shared Channel (PUSCH) signals for an unlicensed spectrum according to various embodiments. The PUCCH and PUSCH signals may be handled by base stations that support LTE/LTE-A communications in an unlicensed spectrum. Examples of such base stations may be the base stations 205, 205-a, and/or 205-b of FIGS. 2, 3A, and/or 3B. The PUCCH and PUSCH signals may be handled by UEs that support LTE/LTE-A communications in an unlicensed spectrum. Examples of such UEs may be the UEs 215, 215-a, and/or 215-b of FIGS. 2, 3A, and/or 3B.

PUCCH and PUSCH signals are typically based on localized frequency division multiplexing (LFDM) waveforms that occupy a set of subcarriers where a different modulation symbol is sent for each subcarrier or some precoding is done before sending the frequency domain waveform. When using these waveforms, small amounts of data available to be sent result in a small portion of the spectrum being occupied. Because of limitations in transmit power spectral density (TX-PSD), when occupying a small part of the bandwidth a small amount of power is transmitted. To get away from the limitation on TX-PSD, there may be a need to occupy most of the entire waveform. But if most of the waveform is occupied and does not leave any subcarriers unused, it may not be possible to multiplex different users for a given amount of bandwidth. One approach to address this issue is to have each transmitter interleave its signals so they occupy every 1-out-of-every-Nth subcarrier (e.g., 1-out-of-10, 1-out-of-12), thereby leaving many subcarriers in the middle unoccupied. This approach may increase the nominal bandwidth occupancy to enable sending the waveform with a higher power (but still with low enough PSD to meet regulations). Interleaved frequency division multiplexing (IFDM) and interleaved orthogonal frequency division multiplexing (I-OFDM) signals may be used that occupy 1-out-of-Nth subcarrier in order to send signals confined to those subcarriers. In FIG. 11, IFDM waveforms are shown to generate PUCCH signals 1105 and PUSCH signals 1110 for transmission in an unlicensed spectrum. Similarly, I-OFDM waveforms are shown to generate PUCCH signals 1115 and PUSCH signals 1120 for transmission in an unlicensed spectrum.

Figure 12:
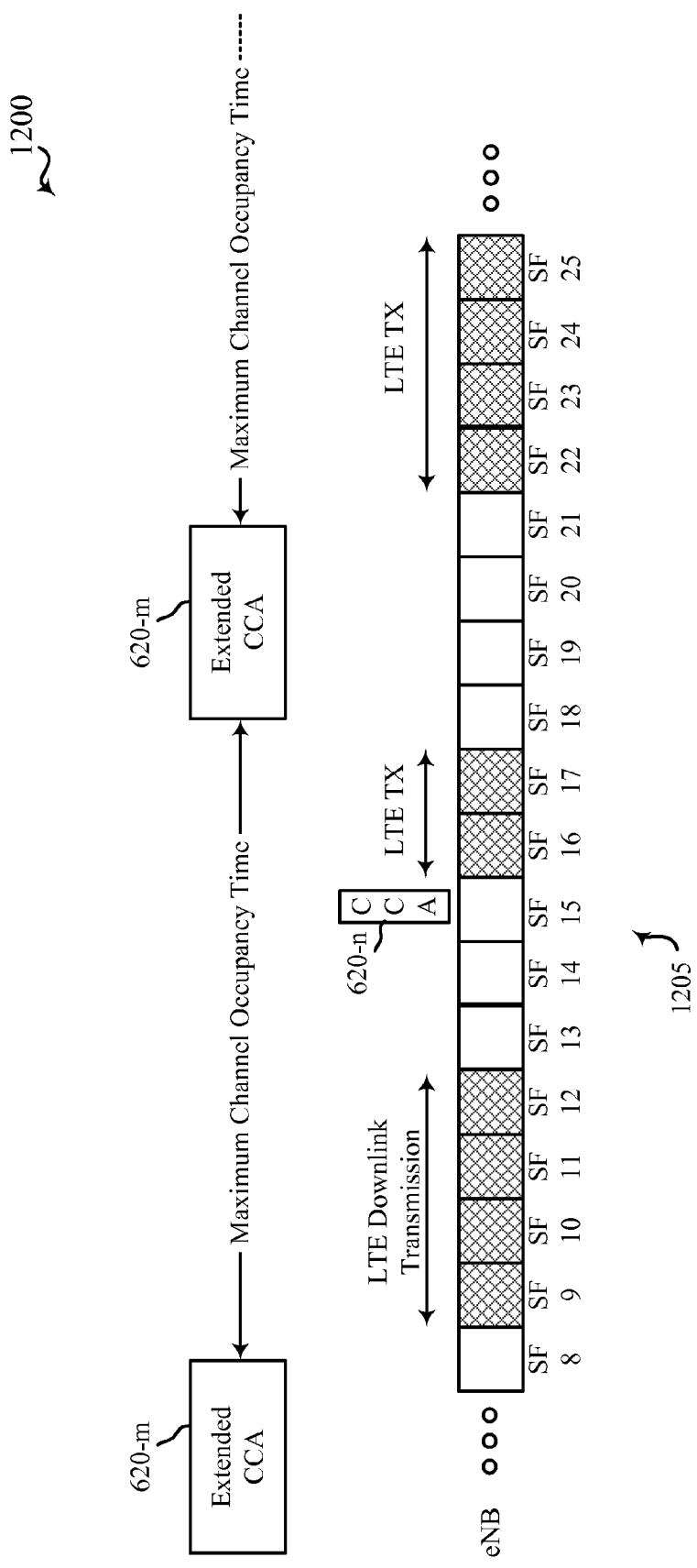
FIG. 12 shows a diagram that illustrates an example of load-based gating in an unlicensed spectrum according to various embodiments.

FIG. 12 shows a diagram 1200 illustrating an example of load-based gating in an unlicensed spectrum according to various embodiments. The load-based gating may be performed by base stations that support LTE/LTE-A communications in an unlicensed spectrum. Examples of such base stations may be the base stations 205, 205-a, and/or 205-b of FIGS. 2, 3A, and/or 3B.

The listen-before-talk (LBT) techniques described above may be used in frame-based equipment (FBE). However, other LBT techniques are also available that are based on load-based equipment (LBE). The LBT-FBE techniques rely in part on gating that preserves the 10 milliseconds radio frame structure of LTE. The use of shorter gating structures (1 milliseconds, 2 milliseconds), while allowing for periodic gating, may tend not to preserve the LTE frame structure. Using LBT-LBE may provide the potential benefit of retaining the subframe structure of LTE PHY channels without the need for symbol puncturing at the beginning or end of a gating period. However, time-reuse among different nodes may no longer be assured on the same deployment because each base station uses its own random back-off time for an extended CCA. Therefore, for LBT-LBE, the CCA may be similar to the CCA for LBT-FBE, but an extended CCA (which is not used in LBT-FBE), may be based on randomly selecting an integer N (e.g., $1 \leq N \leq q$), and wait for N CCA durations where the channel is clear.

Transmission at different subframes (SFs) in a subframe sequence of an unlicensed spectrum channel may be based on results from an extended CCA and from a CCA. An extended CCA may be based on a parameter $4 \leq q \leq 32$, whose value is advertised by a vendor. When the channel has had a long break a CCA may need to be performed. If a CCA finds a clear channel, then it may be possible to start transmitting right away. If not, an extended CCA may be performed before transmission. Once transmission begins, it may continue for at most $(13/32) \times q$ ms (referred to as the maximum channel occupancy time), before another extended CCA may need to be performed. Upon a successful reception (from another node), ACK/NACK transmission may begin immediately (without a CCA), provided that the last successful CCA/extended CCA was performed less than a maximum channel occupancy time before.

Returning to the example of FIG. 12, the CCA time may be set to 25 microseconds (μs) and q=24, so that the maximum channel occupancy time is approximately 9.75 milliseconds. The minimum idle time for an extended CCA is approximately between 25 microseconds (μs) and 0.6 milliseconds. CUPS may be used to fill the gap as described above. In this example, an extended CCA 620-m is performed at subframe (SF) 8 in a sequence 1205. The maximum channel occupancy time is such that a next extended CCA 620-m need not be performed until SF 18. LTE downlink transmissions may take place during SFs 9-12 as a result of the channel being free after the first extended CCA 620-m. Since there is a transmission gap after SF 12, a CCA 620-n may be performed at SF 15 for additional transmissions within the maximum channel occupancy time. As a result of the CCA 620-*n*, LTE transmissions may take place at SFs 16 and 17. As noted above, a second extended CCA 620-*m* may occur after the maximum channel occupancy time, which in this example leads to additional LTE transmissions in SFs 22-25.

Figure 13:
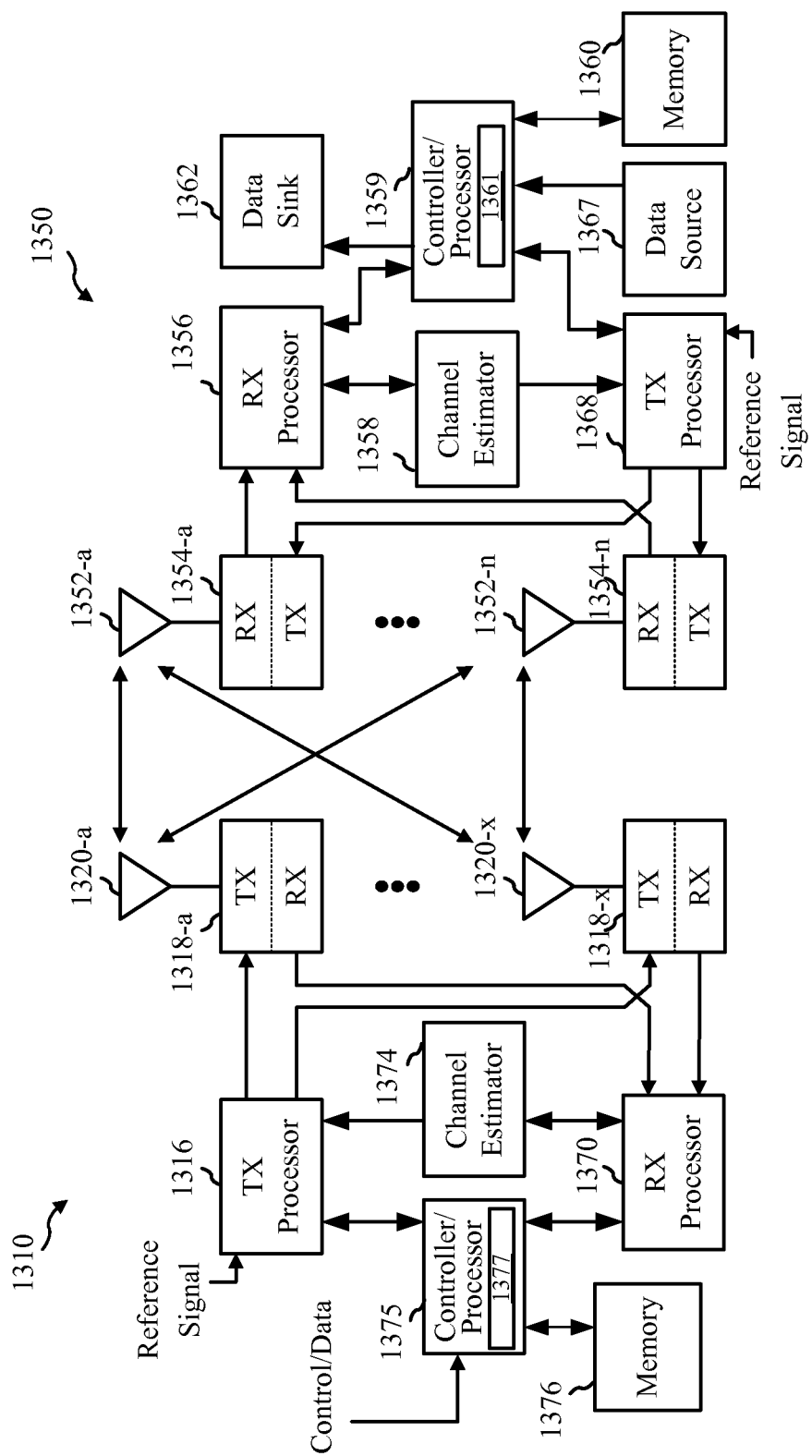
FIG. 13 shows a block diagram that illustrates an example of a multiple-input multiple-output (MIMO) communications system according to various embodiments.

Referring now to FIG. 13, a block diagram illustrates a multiple-input multiple-output (MIMO) communication system 1300 including a base station (e.g., eNB) 1310 and a UE 1350. The eNB 1310 and the UE 1350 may support LTE-based communications using a licensed and/or unlicensed spectrum. The base station 1310 may be an example of one or more aspects of the base stations or devices 105, 205, 205-*a*, 205-*b*, 205-*c*, 2105, 2305, 2355, and/or 2405 described with reference to FIGS. 2, 3A, 3B, 9, 21A, 21B, 23A, 23B, and/or 24, while the UE 1350 may be an example of one or more aspects of the UEs or devices 215, 215-*a*, 215-*b*, 215-*c*, 2115, 2305, 2355, and/or 2515 described herein with reference to FIGS. 2, 3A, 3B, 9, 21A, 21B, 23A, 23B, and/or 25. The system 1300 may illustrate aspects of the wireless communications system 200 of FIG. 2, and/or portions of the wireless communications systems described with reference to FIGS. 2, 3A, 3B, 9, 21A, and/or 21B.

In the downlink (DL), upper layer packets from the core network are provided to a controller/processor 1340. The controller/processor 1375 may implement the functionality of the L2 layer. In the DL, the controller/processor 1375 may provide header compression, ciphering, packet segmentation and reordering, multiplexing between logical and transport channels, and radio resource allocations to the UE 1350 based on various priority metrics. The controller/processor 1375 may also be responsible for HARQ operations, retransmission of lost packets, and signaling to the UE 1350.

The transmit (TX) processor 1316 may implement various signal processing functions for a L1 layer (i.e., physical layer). The signal processing functions include coding and interleaving to facilitate forward error correction (FEC) at the UE 1350 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams, if applicable. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 1374 may be used to determine the coding and modulation scheme, as well as for spatial processing. The channel estimate may be derived from a reference signal and/or channel condition feedback transmitted by the UE 1350. Each spatial stream may then be provided to a different antenna 1320 via a separate transmitter 1318TX. Each transmitter 1318TX may modulate an RF carrier with a respective spatial stream for transmission.

At the UE 1350, each receiver 1354RX receives a signal through its respective antenna 1352. Each receiver 1354RX recovers information modulated onto an RF carrier and provides the information to the receive (RX) processor 1356. The RX processor 1356 may implement various signal processing functions of the L1 layer. The RX processor 1356 may perform spatial processing on the information to recover any spatial streams destined for the UE 1350. If multiple spatial streams are destined for the UE 1350, they may be combined by the RX processor 1356 into a single OFDM symbol stream. The RX processor 1356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 1310. These soft decisions may be based on channel estimates computed by the channel estimator 1358. The soft decisions are then decoded and deinterleaved to recover the data and control signals that were originally transmitted by the base station 1310 on the physical channel. The data and control signals are then provided to the controller/processor 1359.

The controller/processor 1359 may implement a L2 layer. The controller/processor can be associated with a memory 1360 that stores program codes and data. The memory 1360 may be referred to as a computer-readable medium. In the uplink (UL), the controller/processor 1359 provides demultiplexing between transport and logical channels, packet reassembly, deciphering, header decompression, control signal processing to recover upper layer packets from the core network. The upper layer packets are then provided to a data sink 1362, which represents all the protocol layers above the L2 layer. Various control signals may also be provided to the data sink 1362 for L3 processing. The controller/processor 1359 is also responsible for error detection using an acknowledgement (ACK) and/or negative acknowledgement (NACK) protocol to support HARQ operations.

In the UL, a data source 1367 is used to provide upper layer packets to the controller/processor 1359. The data source 1367 represents all protocol layers above the L2 layer. Similar to the functionality described in connection with the DL transmission by the base station 1310, the controller/processor 1359 may implement the L2 layer for the user plane and the control plane by providing header compression, ciphering, packet segmentation and reordering, and multiplexing between logical and transport channels based on radio resource allocations by the base station 1310. The controller/processor 1359 may also be responsible for HARQ operations, retransmission of lost packets, and signaling to the base station 1310.

Channel estimates derived by a channel estimator 1358 from a reference signal or feedback transmitted by the base station 1310 may be used by the TX processor 1368 to select the appropriate coding and modulation schemes, and to facilitate spatial processing. The spatial streams generated by the TX processor 1368 may be provided to different antenna 1352 via separate transmitters 1354TX. Each transmitter 1354TX may modulate an RF carrier with a respective spatial stream for transmission.

The UL transmission is processed at the base station 1310 in a manner similar to that described in connection with the receiver function at the UE 1350. Each receiver 1318RX receives a signal through its respective antenna 1320. Each receiver 1318RX recovers information modulated onto an RF carrier and provides the information to a RX processor 1370. The RX processor 1370 may implement the L1 layer.

The controller/processor 1375 may implement the L2 layer. The controller/processor 1375 can be associated with a memory 1376 that stores program codes and data. The memory 1376 may be referred to as a computer-readable medium. In the UL, the control/processor 1375 provides demultiplexing between transport and logical channels, packet reassembly, deciphering, header decompression, control signal processing to recover upper layer packets from the UE 1350. Upper layer packets from the controller/processor 1375 may be provided to the core network. The controller/ processor 1375 may also be responsible for error detection using an ACK and/or NACK protocol to support HARQ operations.

In an aspect, enhanced multimedia broadcast multicast services (eMBMS) in LTE/LTE-A communications using an unlicensed spectrum are considered. Typically, all base stations in an eMBMS area transmit in a synchronized manner such that each base station transmits the same waveform at the same time. However, when unlicensed spectrum is utilized for eMBMS, each base station has to contend for use of the unlicensed spectrum. Each base station generally will see different local WiFi activity. The nonsynchronous nature of the local WiFi activity may cause the base stations to be off at different times. As a result, the eMBMS transmissions may not occur in a synchronized fashion unless certain issues are addressed. Various aspects facilitate multimedia broadcast single frequency network (MBSFN) transmission in an unlicensed spectrum from base stations of a given eMBMS deployment. Each base station may perform a clear channel assessment (CCA) independently and contribute to the MBSFN transmission whenever the performed CCA indicates a clear channel. As an advantage, a base station does not depend on CSI feedback or ARQ. However, an issue exists with respect to the CCA creating large coverage holes that last one or more listen-before-talk (LBT) frames. Thus, strong outer codes may be needed to fill-in for packets lost due to the LBT operation.

In an aspect, to resolve the issue of the CCA creating large coverage holes that last one or more LBT frames, a broadcast multicast service center (BM-SC) may apply application forward error correction (FEC) by taking into account a percentage of a gated period. Here, the BM-SC is aware that a particular service is transmitted over an unlicensed spectrum and of a typical load of a base station (eNB or access point (AP)) in a service area. Such information may be delivered to the BM-SC via operations administration and maintenance (OAM).

Moreover, adding a base station to BM-SC feedback may be useful for the BM-SC to determine appropriate FEC parameters. A base station may report the base station's gated period to the BM-SC based on the base station's history. The base station reports may be sent to the BM-SC via a multicell/multicast coordination entity (MCE). The MCE may consolidate the reports prior to forwarding to the BM-SC. The BM-SC may apply FEC based on a base station report. As an implementation choice, the BM-SC may also adjust the FEC rate based on a UE's reception report.

Based on quality of service (QoS) information received from the BM-SC, a base station may decide if an eMBMS service should be sent over an unlicensed spectrum or a licensed spectrum. For example, high latency tolerate services may be sent over the unlicensed spectrum.

Another issue involving eMBMS in LTE/LTE-A communications in an unlicensed spectrum is that the CCA may result in received SNR variation because different base stations may have a different gated period and/or gate off at a different time. In an aspect, to resolve this issue, the MCE may determine the MCS by taking into account a percentage of the base station gated period as well as when the base station gates off. Here, the MCE is aware that a particular service is transmitted using over an unlicensed spectrum and of a typical load of the base station (eNB or AP) in a service area (e.g., multicast broadcast single frequency network (MBSFN) area). Such information may be delivered to the MCE via operations administration and maintenance (OAM) procedures. In an aspect, based on the information, the MCE can estimate the gated period that the base station will experience, and thereafter determine a sustainable MCS.

In another aspect, the base station may inform (e.g., provide feedback to) the MCE of a percentage of an on-duration. The base station may report the base station's gated period to the MCE based on the base station's history. The MCE may then determine the MCS and MBSFN subframes based on reports from base stations in a given MBSFN area.

A further issue involving eMBMS in LTE/LTE-A communications in an unlicensed spectrum relates to MBSFN subframe configuration. A gated LTE waveform transmission in an unlicensed spectrum may require robust LTE subframes transmitted for the first X subframes after a gated-off period of greater than Y subframes. Different base stations may have different gated-off periods and may require robust LTE subframes at a different radio frame. The robust LTE subframes allow the UE to quickly acquire the base station when the base station activates (e.g., turns on) after gating off for a period of time. The robust LTE subframes have a different subframe structure compared to regular unicast subframes or regular MBSFN subframes. The robust LTE subframes may need to be taken into account for MBSFN subframe configuration because at a certain radio frame, one or more base stations may need the robust LTE subframes as the one or more base stations turn on after gating off for a period of time, while other base stations do not need the robust LTE subframes because the other base stations do not gate off or do not gate off for a long enough period of time.

To resolve this issue, the MCE may configure MBSFN subframes by not using the first X subframes for all radio frames. MBSFN time usage in terms of radio frame percentage may be capped according to Usage Time= (0.90−X/10)*100%, wherein X is the number of first robust LTE subframes required by a potential maximum gate off period among base stations within an MBSFN area. Alternatively, the MCE may configure the robust LTE subframes for MBSFN and align a cyclic prefix (CP) length of robust LTE subframes with MBSFN subframes when the robust LTE subframes are configured for MBSFN. A similar concept applies to SYNC subframes. In an example, LTE/LTE-A communications in an unlicensed spectrum may be applied to a small cell deployment scenario and an MBSFN transmission may use a unicast CP length as well as other unicast numerology. When the robust LTE subframes are configured for MBSFN subframes, the robust LTE subframes may be specially handled to ensure proper MBSFN operation as explained below.

Figure 14:
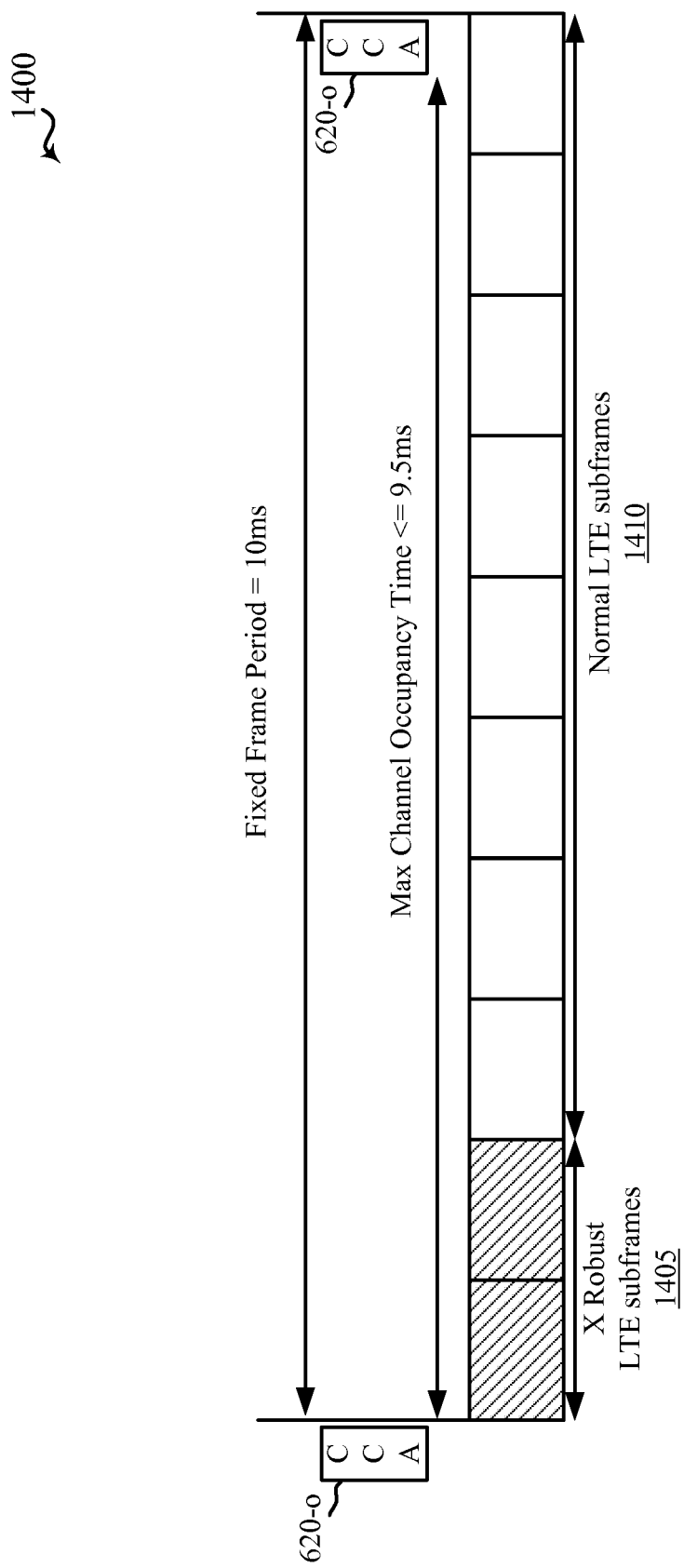
FIG. 14 shows a diagram that illustrates an LTE subframe structure in an unlicensed spectrum.

FIG. 14 shows a diagram 1400 illustrating a subframe structure for LTE/LTE-A in an unlicensed spectrum. In FIG. 14, the presence of robust LTE subframes 1405 in a frame may depend on an off duration of a base station. The remaining subframes in the frame may be normal LTE subframes 1410.

Figure 15:
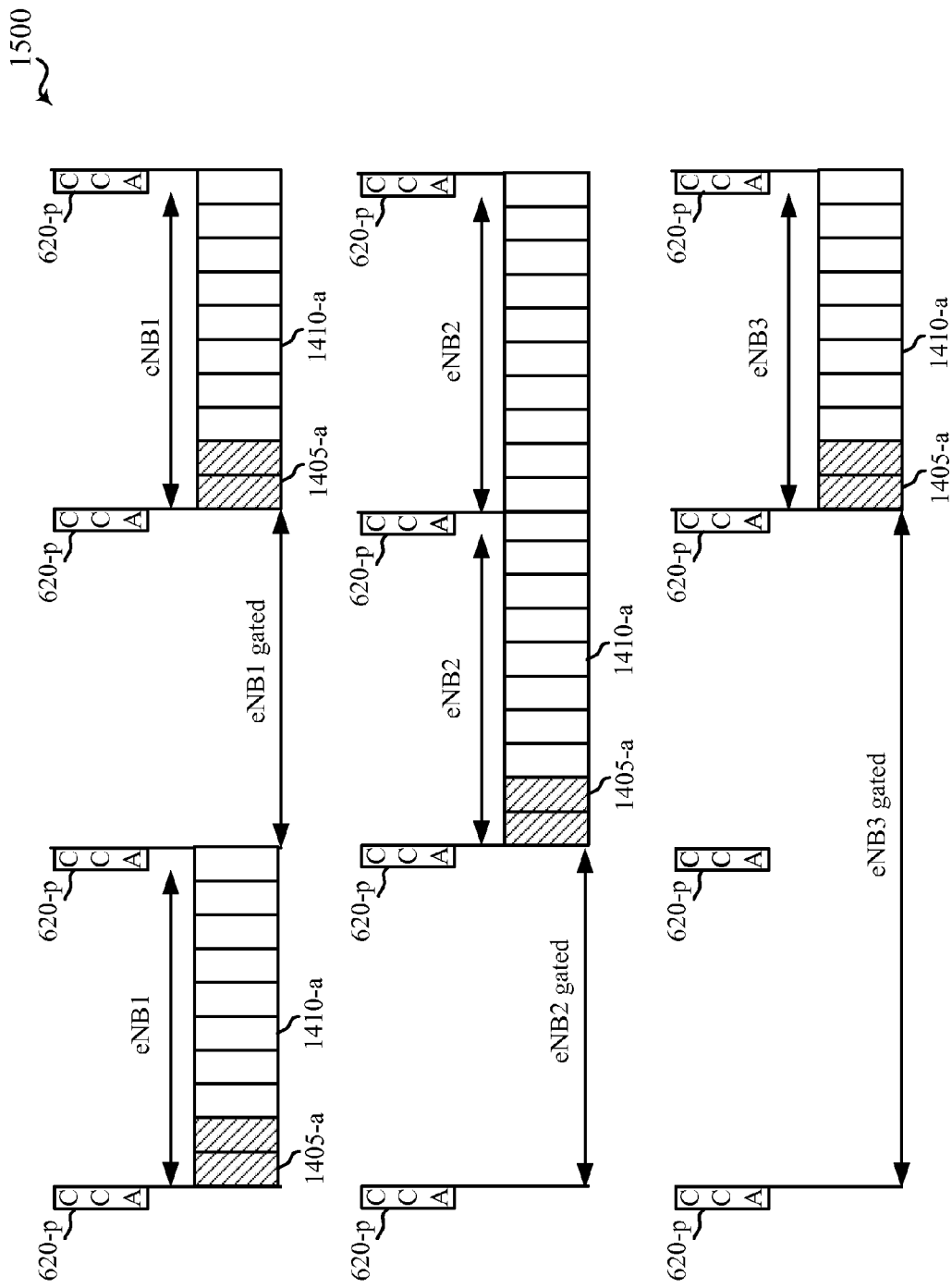
FIGS. 15 and 16 illustrate examples of LTE subframe structures of a plurality of base stations in an unlicensed spectrum.

FIG. 15 shows a diagram 1500 illustrating subframe structures of a plurality of base stations for LTE/LTE-A in an unlicensed spectrum. In FIG. 15, different base stations may have different robust LTE subframes 1410-*a* because the different base stations may gate off at different times with different gating off periods.

Figure 16:
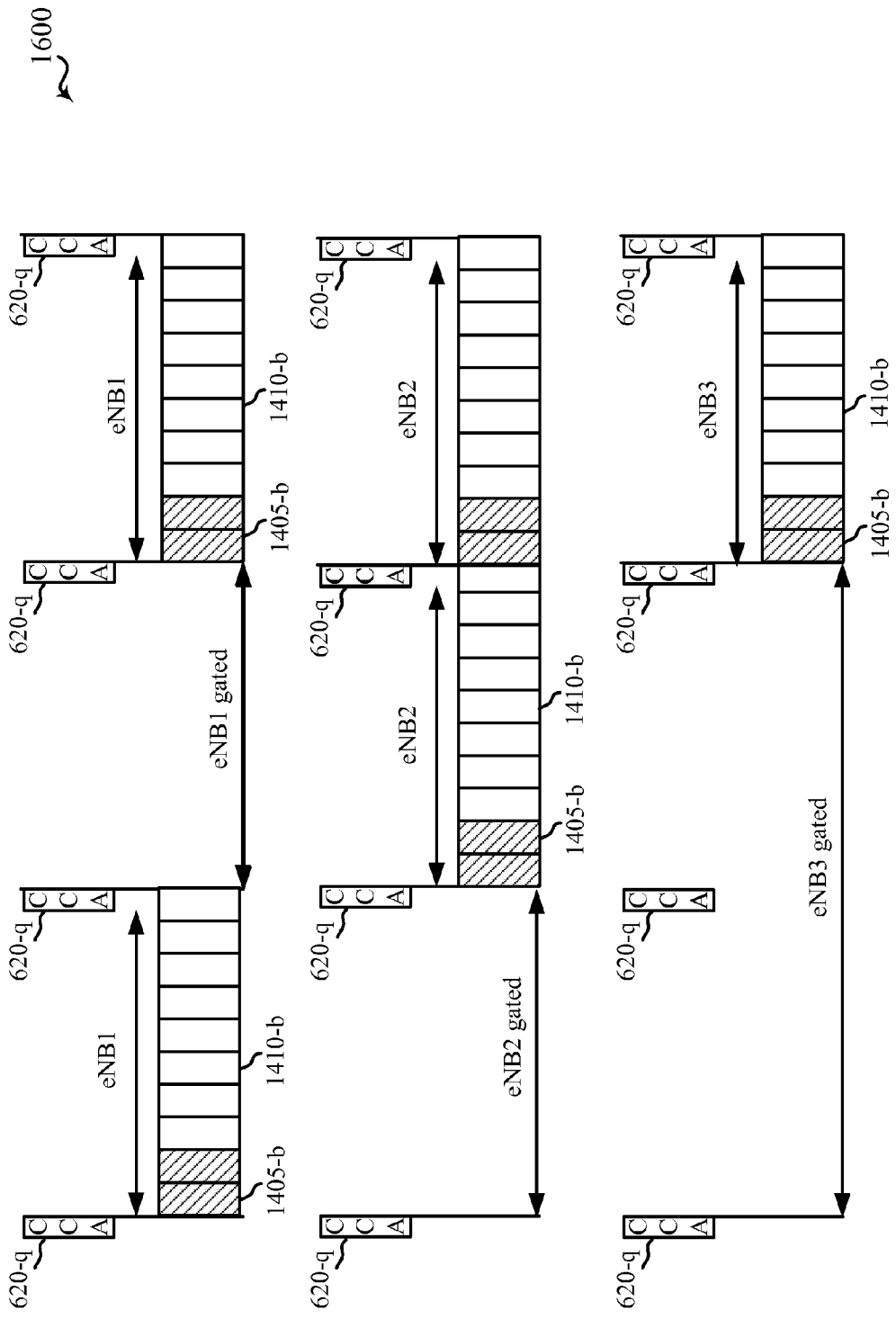

FIG. 16 shows a diagram 1600 illustrating subframe structures of a plurality of base stations for LTE/LTE-A in an unlicensed spectrum. In FIG. 16, to enable MBSFN operation, each radio frame of each base station may have X robust LTE subframes 1405-*b*, where X is a positive integer, configured if robust LTE subframes are allocated for MBSFN transmission on a respective radio frame even if a particular base station may not gate off during that period of time. Some base stations may turn on after gating off for a period of time and may require robust LTE subframes for a UE to acquire the base station when the base station turns on. To maintain MBSFN operation, all base stations may configure robust LTE subframes every radio frame when the first X or a subset of the first X subframes are configured for MBSFN regardless of whether the base stations were gated off or not. The remaining (i.e., non-robust) subframes in each radio frame may be normal LTE subframes 1410-b. A base station may use the remaining resource elements (REs) that are not used by MBSFN for unicast transmission in the first X subframes without a robust subframe structure if robust subframes are not needed. In other words, the base station assumes the first X subframes on every radio frame with a robust subframe structure for MBSFN transmission, and when the base station does not need a robust subframe structure, it can use the remaining REs with normal subframe structure for unicast transmission.

Yet another issue involving eMBMS for LTE/LTE-A in an unlicensed spectrum relates to synchronization of base station MTCH scheduling. Currently, the MCE handles MCCH scheduling while the base station handles MTCH scheduling.

The MCE is in charge of data on the control plane while the base station is in charge of data on the user plane. The MCCH indicates corresponding MCS and MBSFN subframes for each PMCH. Within each PMCH, the base station may schedule up to 29 MTCHs. The base station may allocate MBSFN subframes for each MTCH based on the amount of data delivered from a SYNC protocol for each service.

Different base stations may have different gated periods and/or gate off at different times. If a base station simply schedules and transmits MTCH based on the amount of data delivered from the SYNC protocol, different base stations may transmit different data due to a different gating pattern, thereby losing MBSFN gain.

Figure 17:
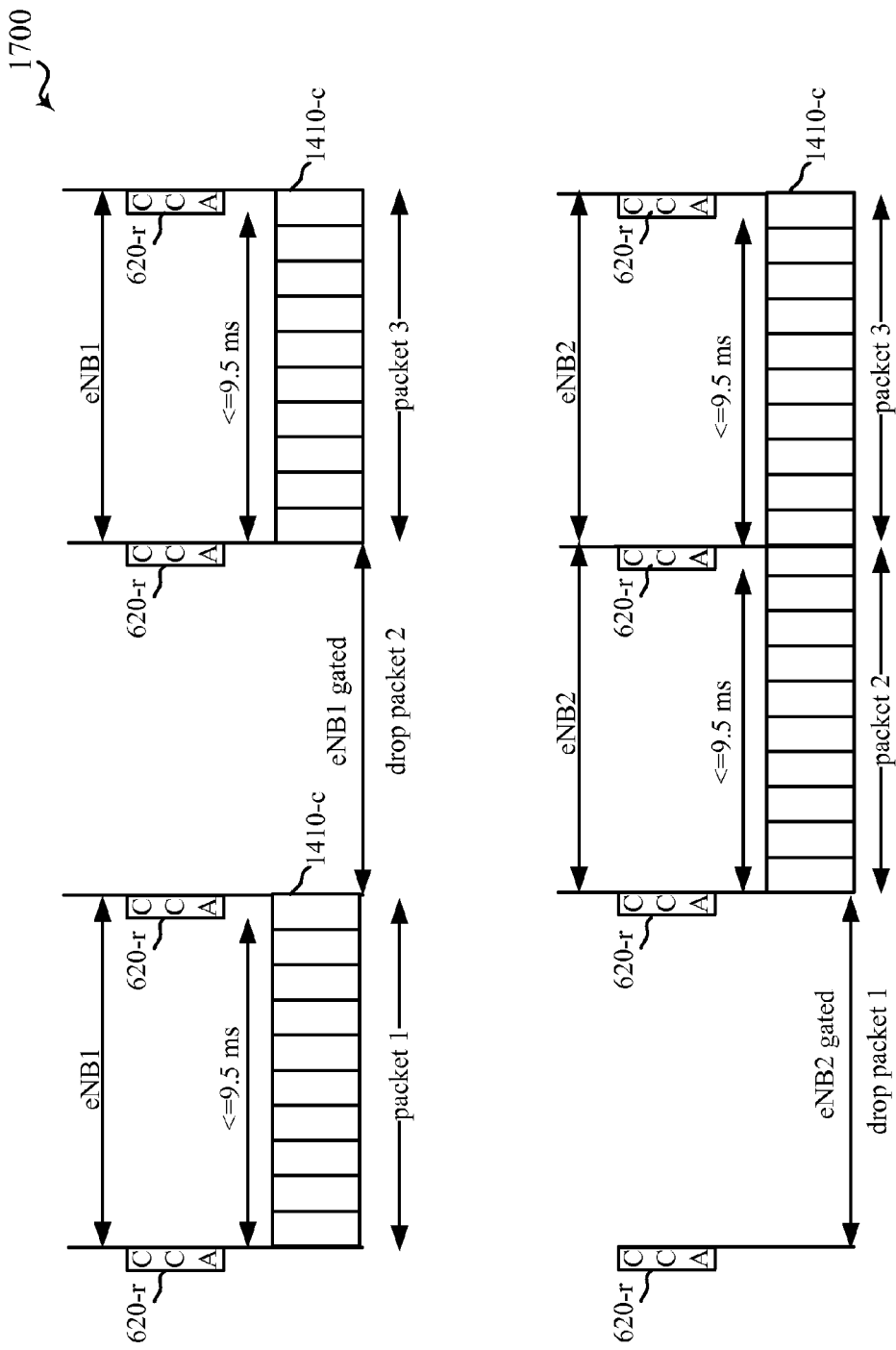
FIG. 17 illustrates an example of base station transmission of eMBMS in an unlicensed spectrum.

FIG. 17 shows a diagram 1700 illustrating base station transmission of eMBMS for LTE/LTE-A in an unlicensed spectrum. Referring to FIG. 17, to resolve the issue discussed above, the base station may schedule and transmit MTCH as if no gated period exists. The base station may drop packets when the base station gates off the LTE MBSFN transmission. The amount of data dropped by the base station may be consistent with MTCH scheduling. The base station may continue transmitting normal LTE packets 1410-c subsequent to a dropped packet when the LTE transmission resumes. In this way, base stations that do not gate off in an MBSFN area may transmit the same content during an on-duration. The base stations that gate off may refrain from transmitting corresponding data, thereby preserving MBSFN operation.

Another issue involving eMBMS for LTE/LTE-A in an unlicensed spectrum relates to base station transmission power control for eMBMS subframes. An MBSFN transmission may cause interference to base stations (eNBs or APs) within the MBSFN area. To resolve this issue, a base station may set transmit power according to a CCA 620-r measurement obtained by the base station. Furthermore, a base station may lower PMCH transmission power as long as a UE is able to receive an MBSFN signal that is strong enough for the UE to decode the signal. The decision on PMCH transmission power may be based on: 1) periodic MBSFN signal measurements by the base station; and/or 2) periodic or threshold-based UE MBSFN measurements reported to the base station.

A further issue involving eMBMS in LTE/LTE-A communications in an unlicensed spectrum relates to reliability of a multicast control channel (MCCH) and MCH scheduling information (MSI). MCCH and MSI are used for MTCH decoding. The MCCH indicates the allocated MBSFN subframes and the MCS for each PMCH. The MSI indicates the allocated MBSFN subframes for MTCH (e.g., each service). Application layer forward error correction (FEC) may make content delivery more reliable but typically will not make UE reception of MCCH and MSI more reliable.

To resolve this issue, the base station may transmit MCCH and MSI on a primary component carrier (PCC), along with a system information block type 13 (SIB13) and a MCCH change notification. The PCC transmits a broadcast channel even if the PCC does not send any MBMS services. The SIB13 on PCC may indicate if the MCCH is sent from the PCC or in an unlicensed spectrum.

Alternatively, the transmission of MCCH and MSI may be repeated. For example, the MCCH may indicate a first multiple MBSFN subframes for MSI within an MCH scheduling period (MSP). The MCCH may be configured for repetition in an unlicensed spectrum or the MCCH's information may be sent in a SIB on the PCC.

In a further alternative, the base station may transmit the subframes delivering MCCH and MSI in an unlicensed spectrum regardless of the CCA result. Currently, a 5% duty cycle may be allowed by the LBT operation. For example, the base station may interfere with an AP's transmission up to 5% of the time. The MCCH may be transmitted once every 32/64/128/256 radio frames. The MSI can be configured to transmit once every 8/16/32/64/128/256/512/1024 radio frames. Considering a smallest MCCH transmission period, a duty cycle is 1/320. Considering a smallest MSP, a duty cycle is 1/80. Hence, an overall transmission interference of MCCH and MSI to AP can be made less than 5%.

In an aspect, enhancements for an operator-controlled access point (AP) are considered. If the operator has control of both the base station and the AP, and the base station is co-located with the AP, the base station may send SIB13 and MCCH information to APs within the MBSFN area. An AP may mute its transmission on all subframes allocated by SIB13 and MCCH to ensure reliable reception of SIB13 and all MBSFN subframes allocated for MCCH. MBSFN subframes allocated for MBSFN transmission in MCCH can be used for unicast transmission if not used by a MBMS. Alternatively, the base station may signal the corresponding subframe for SIB13 and MCCH/MSI transmission, and the AP may mute its transmission on only SIB13, MCCH subframes and MSI subframes.

If the operator has control of both the base station and the AP, but the base station is not co-located with the AP, the MCE can send SIB13 and MCCH information to APs within the MBSFN area. The AP may mute its transmission on all subframes allocated by SIB13 and MSI/MCCH, or the AP may mute its transmission only on MCCH subframes and MSI subframes. When the AP mutes a downlink transmission, the AP may mute potential uplink transmissions from a UE. The AP may disable a beacon transmission for the off-period. The UE may still send probes to other APs. In RTS/CTS signaling, the AP may set a silent period to UEs so that the UEs do not transmit signals during the silent period. The AP may also set a fake packet length in a preamble. Hence, UEs may assume a medium is occupied for the packet length and back-off from performing an uplink transmission. Further, a scheduled UE transmission may be introduced in the uplink so that the AP can mute the UE's uplink transmission accordingly.

Figure 18:
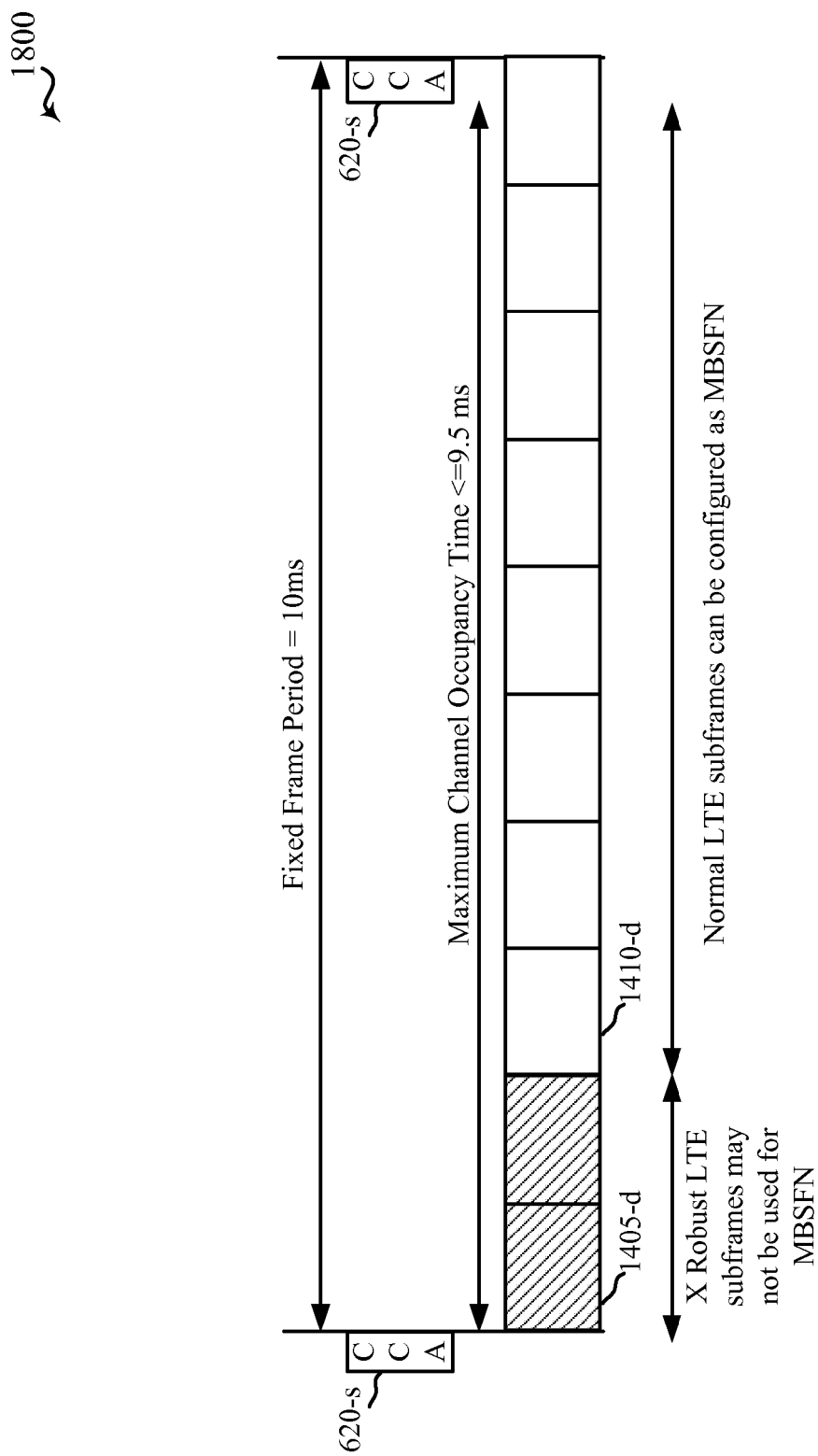
FIG. 18 illustrates an example of MBSFN configuration considering standalone mode in LTE/LTE-A communications in an unlicensed spectrum.

FIG. 18 shows a diagram 1800 illustrating an example of MBSFN configuration considering a standalone mode of operation for LTE/LTE-A in an unlicensed where a carrier for LTE/LTE-A in an unlicensed spectrum is not attached to any primary component carrier (PCC). Referring to FIG. 18, a UE may need to be aware of MBSFN configurations to obtain a CP type in different subframes when an MBSFN transmission and a unicast transmission have different CP lengths. Accordingly, a certain number of subframes 1405-*d* per radio frame may be excluded from MBSFN use. For example, a subset of the first X subframes in a radio frame may be excluded from MBSFN use, where X is a positive integer. These subframes may be used for system information, MBSFN configuration, etc. MBSFN time usage may be lower than 90%. The first X subframes may be used for robust LTE subframes 1405-*d* when the base station starts transmission after being gated off. Hence, the first X subframes 1405-*d* may be excluded from MBSFN use since aligning robust subframes for MBSFN may require unnecessary overhead. The remaining subframes may be normal LTE subframes 1410-*d*.

Figure 19:
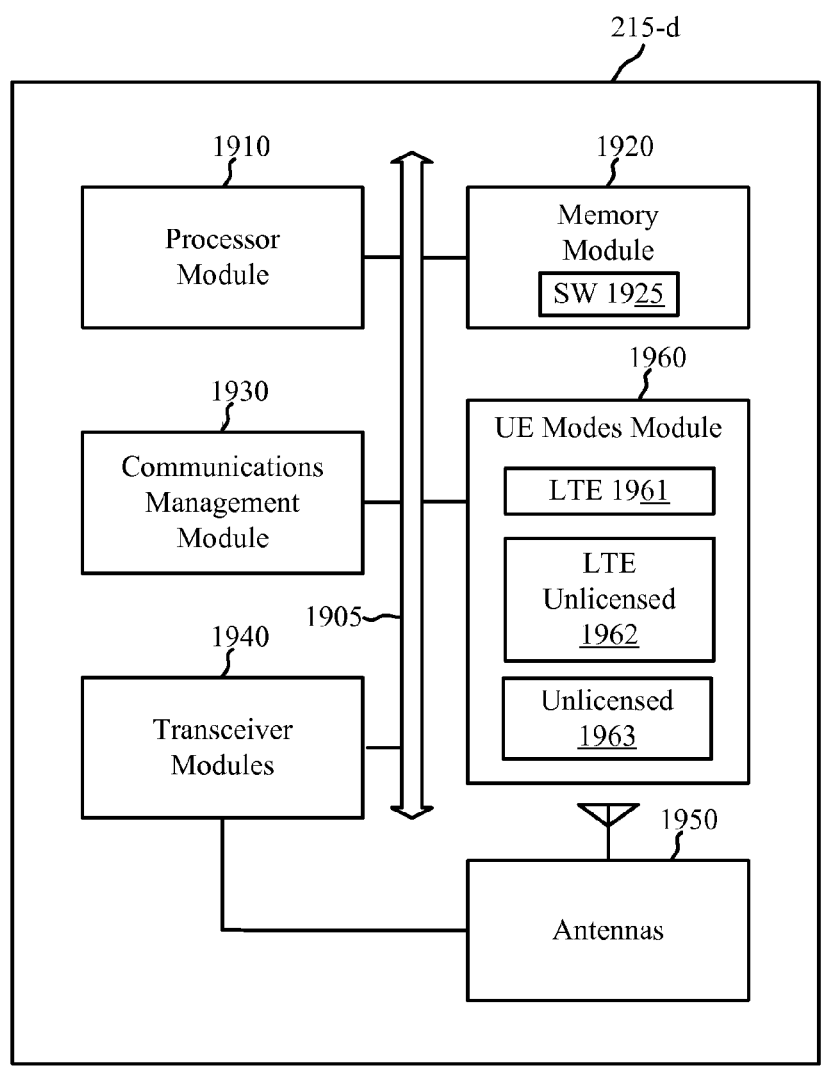
FIG. 19 shows a block diagram that illustrates an example of a UE architecture according to various embodiments.

FIG. 19 shows a block diagram 1900 illustrating the data flow between different modules/means/components in an exemplary UE 215-*d* configured for LTE/LTE-A in an unlicensed spectrum. The UE 215-*d* may have various other configurations and may be included or be part of a personal computer (e.g., laptop computer, netbook computer, tablet computer, etc.), a cellular telephone, a PDA, a digital video recorder (DVR), an internet appliance, a gaming console, an e-readers, etc. The UE 215-*d* may have an internal power supply (not shown), such as a small battery, to facilitate mobile operation. The station UE 215-*d* may be an example of the UEs 215, 215-*a*, 215-*b*, and/or 215-*c* of FIGS. 2, 3A, 3B, and/or 9. The UE 215-*d* may be configured to implement at least some of the features and functions described herein with respect to FIGS. 1-12, 14-18, and 26-36.

The UE 215-*d* may include a processor module 1910, a memory module 1920, a transceiver module 1940, antennas 1950, and an UE modes module 1960. Each of these components may be in communication with each other, directly or indirectly, over one or more buses 1905.

The memory module 1920 may include random access memory (RAM) and read-only memory (ROM). The memory module 1920 may store computer-readable, computer-executable software (SW) code 1925 containing instructions that are configured to, when executed, cause the processor module 1910 to perform various functions described herein for using LTE-based communications in an unlicensed channel. Alternatively, the software code 1925 may not be directly executable by the processor module 1910 but be configured to cause the computer (e.g., when compiled and executed) to perform functions described herein.

The processor module 1910 may include an intelligent hardware device, e.g., a central processing unit (CPU), a microcontroller, an application-specific integrated circuit (ASIC), etc. The processor module 1910 may process information received through the transceiver module 1940 and/or to be sent to the transceiver module 1940 for transmission through the antennas 1950. The processor module 1910 may handle, alone or in connection with the UE modes module 1960, various aspects of using LTE-based communications in an unlicensed channel.

The transceiver module 1940 may be configured to communicate bi-directionally with base stations (e.g., base stations 205). The transceiver module 1940 may be implemented as one or more transmitter modules and one or more separate receiver modules. The transceiver module 1940 may support communications in a licensed spectrum (e.g., LTE) and in an unlicensed spectrum. The transceiver module 1940 may include a modem configured to modulate the packets and provide the modulated packets to the antennas 1950 for transmission, and to demodulate packets received from the antennas 1950. While the UE 215-*d* may include a single antenna, there may be embodiments in which the UE 215-*d* may include multiple antennas 1950.

According to the architecture of FIG. 19, the UE 215-*d* may further include a communications management module 1930. The communications management module 1930 may manage communications with various access points. The communications management module 1930 may be a component of the UE 215-*d* in communication with some or all of the other components of the UE 215-*d* over the one or more buses 1905. Alternatively, functionality of the communications management module 1930 may be implemented as a component of the transceiver module 1940, as a computer program product, and/or as one or more controller elements of the processor module 1910.

The UE modes module 1960 may be configured to perform and/or control some or all of the functions or aspects described in FIGS. 1-12, 14-18, and 26-36 related to using LTE-based communications in an unlicensed channel. For example, the UE modes module 1960 may be configured to support a supplemental downlink mode, a carrier aggregation mode, and/or a standalone mode. The UE modes module 1960 may include an LTE module 1961 configured to handle LTE communications in a licensed spectrum, an LTE unlicensed module 1962 configured to handle LTE communications in an unlicensed spectrum, and an unlicensed module 1963 configured to handle communications other than LTE communications in an unlicensed spectrum. The UE modes module 1960, or portions of it, may be a processor. Moreover, some or all of the functionality of the UE modes module 1960 may be performed by the processor module 1910 and/or in connection with the processor module 1910.

The exemplary UE 215-*d* configured for LTE/LTE-A in an unlicensed spectrum may include additional modules that perform at least some of the features and functions described herein with respect to FIGS. 1-12, 14-18, and 26-36. As such, the features and functions described with respect to FIGS. 1-12, 14-18, and 26-36 may be performed by a module and the UE 215-*d* may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 20:
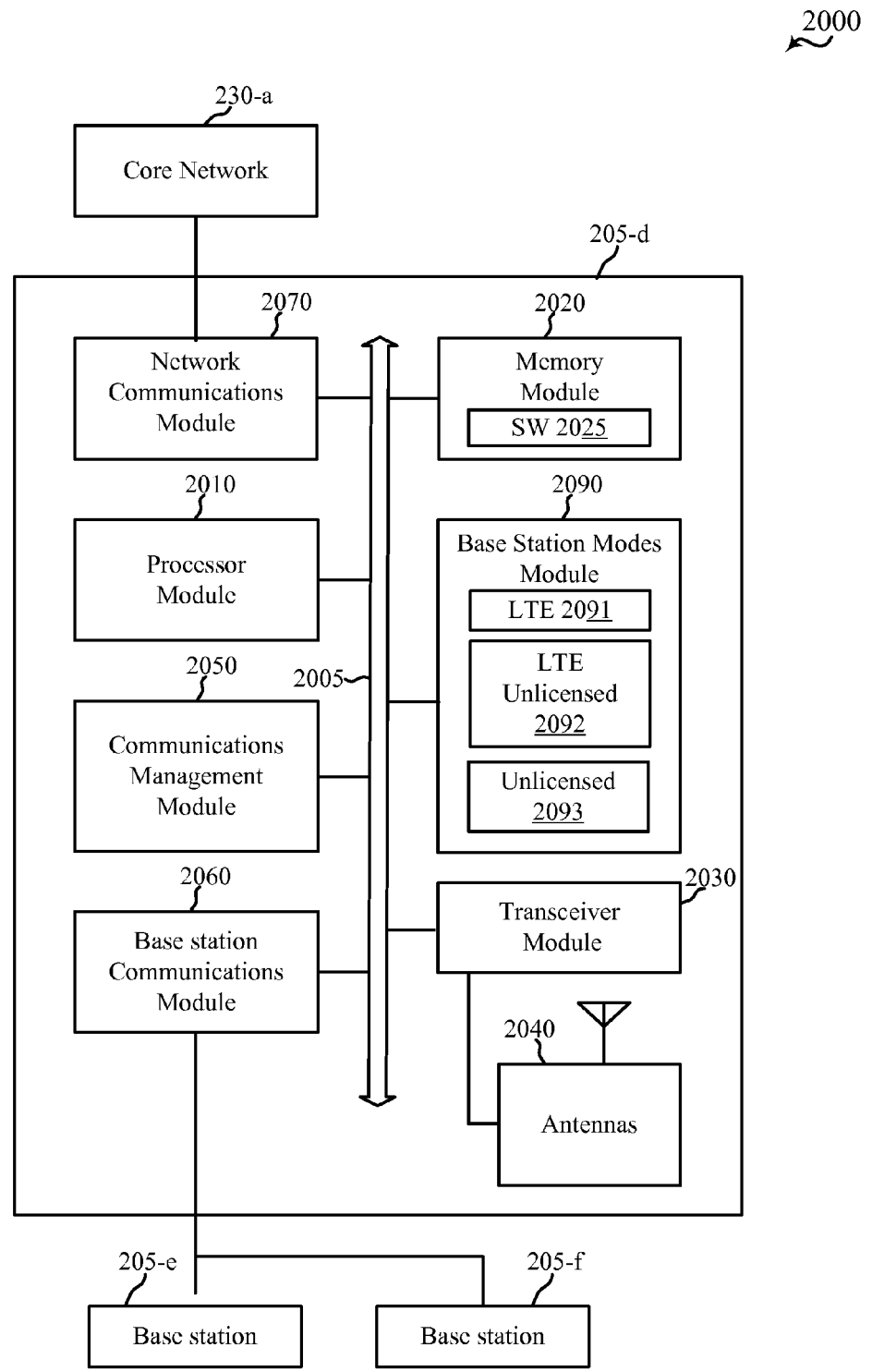
FIG. 20 shows a block diagram that illustrates an example of devices configured for LTE/LTE-A communications in an unlicensed spectrum.

FIG. 20 shows a block diagram 2000 illustrating the data flow between different modules/means/components in an exemplary apparatus 205-*d* (e.g., base station, eNB, MCE, BM-SC, or access point (AP)) configured for LTE/LTE-A in an unlicensed spectrum. In some embodiments, the apparatus 205-*d* may be an example of the base stations 205, 205-*a*, 205-*b*, and/or 205-*c* of FIGS. 2, 3A, 3B, and/or 9. The apparatus 205-*d* may be configured to implement at least some of the features and functions described herein with respect to FIGS. 1-12, 14-18, and 26-36. It is noted that although the description below may refer to modules of a base station or eNB, the diagram 2000 may also be used to illustrate modules of the MCE 128 or BM-SC 126 of FIG. 1, or an access point (AP). Hence, the MCE 128, BM-SC 126, or AP may be configured to implement at least some of the features and functions described herein with respect to FIGS. 1-12, 14-18, and 26-36. The apparatus 205-*d* may include a processor module 2010, a memory module 2020, a transceiver module 2030, antennas 2040, and a base station modes module 2090. The apparatus 205-*d* may also include one or both of a base station communications module 2060 and a network communications module 2070. Each of these components may be in communication with each other, directly or indirectly, over one or more buses 2005.

The memory module 2020 may include RAM and ROM. The memory module 2020 may also store computer-readable, computer-executable software (SW) code 2025 containing instructions that are configured to, when executed, cause the processor module 2010 to perform various functions described herein for using LTE-based communications in an unlicensed channel. Alternatively, the software code 2025 may not be directly executable by the processor module 2010 but be configured to cause the computer, e.g., when compiled and executed, to perform functions described herein.

The processor module 2010 may include an intelligent hardware device, e.g., a CPU, a microcontroller, an ASIC, etc. The processor module 2010 may process information received through the transceiver module 2030, the base station communications module 2060, and/or the network communications module 2070. The processor module 2010 may also process information to be sent to the transceiver module 2030 for transmission through the antennas 2040, to the base station communications module 2060, and/or to the network communications module 2070. The processor module 2010 may handle, alone or in connection with the base station modes module 2090, various aspects of using LTE-based communications in an unlicensed channel.

The transceiver module 2030 may include a modem configured to modulate the packets and provide the modulated packets to the antennas 2040 for transmission, and to demodulate packets received from the antennas 2040. The transceiver module 2030 may be implemented as one or more transmitter modules and one or more separate receiver modules. The transceiver module 2030 may support communications in a licensed spectrum (e.g., LTE) and in an unlicensed spectrum. The transceiver module 2030 may be configured to communicate bi-directionally, via the antennas 2040, with one or more UEs 215 as illustrated in FIGS. 2, 3A, 3B, and/or FIG. 9, for example. The apparatus 205-*d* may typically include multiple antennas 2040 (e.g., an antenna array). The apparatus 205-*d* may communicate with a core network 230-*a* through the network communications module 2070. The core network 230-*a* may be an example of the core network 230 of FIG. 2. The apparatus 205-*d* may communicate with other base stations, such as the base station 205-*e* and the base station 205-*f,* using the base station communications module 2060.

According to the architecture of FIG. 20, the apparatus 205-*d* may further include a communications management module 2050. The communications management module 2050 may manage communications with stations and/or other devices. The communications management module 2050 may be in communication with some or all of the other components of the apparatus 205-*d* via the bus or buses 2005. Alternatively, functionality of the communications management module 2050 may be implemented as a component of the transceiver module 2030, as a computer program product, and/or as one or more controller elements of the processor module 2010.

The base station modes module 2090 may be configured to perform and/or control some or all of the functions or aspects described in FIGS. 1-12, 14-18, and 26-36 related to using LTE-based communications in an unlicensed channel. For example, the base station modes module 2090 may be configured to support a supplemental downlink mode, a carrier aggregation mode, and/or a standalone mode. The base station modes module 2090 may include an LTE module 2091 configured to handle LTE/LTE-A communications in a licensed spectrum, an LTE unlicensed module 2092 configured to handle LTE/LTE-A communications in an unlicensed spectrum, and an unlicensed module 2093 configured to handle communications other than LTE/LTE-A communications in an unlicensed spectrum. The base station modes module 2090, or portions of it, may be a processor. Moreover, some or all of the functionality of the base station modes module 2090 may be performed by the processor module 2010 and/or in connection with the processor module 2010.

The apparatus (e.g., eNB or base station 205*d*, MCE 128, BM-SC 126, or AP) may include additional modules that perform at least some of the features and functions described herein with respect to FIGS. 1-12 and 14-18, and each of the steps of the algorithm in the flow charts of FIGS. 26-36. As such, the features and functions described above with respect to FIGS. 1-12 and 14-18, and each step in the flow charts of FIGS. 26-36 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus (e.g., eNB or base station 205*d*, MCE 128, BM-SC 126, or AP) includes means for means for determining a gated period of a base station transmitting a service, means for applying forward error correction (FEC) to at least one packet associated with the service based on the determined gated period, means for receiving a reception report from a user equipment (UE), the reception report indicating a status of receiving the service, means for adjusting the FEC based on the received reception report, means for generating quality of service (QoS) information based on the determined gated period and the applied FEC, means for sending the QoS information to the base station, the QoS information facilitating the base station to transmit the service in an unlicensed spectrum or transmit the service in a licensed spectrum, means for generating quality of service (QoS) information for the service, means for sending the QoS information to the base station, the QoS information and the gated period facilitating the base station to transmit the service in an unlicensed spectrum or transmit the service in a licensed spectrum, means for determining a modulation and coding scheme (MCS) for at least one packet associated with the service based on the determined gated period, means for determining subframes for transmitting the service based on the determined gated period, means for sending the report of the gated period to a broadcast multicast service center (BM-SC), the report facilitating the BM-SC to apply forward error correction (FEC) to at least one packet associated with the service based on the report, means for determining that a service is transmitted in an unlicensed spectrum, means for configuring at least one radio frame for transmitting the service in the unlicensed spectrum, means for scheduling to transmit a plurality of packets received for a traffic channel, means for transmitting at least one packet of the plurality of packets according to the scheduling, means for activating a gated period, means for refraining from transmitting a packet of the plurality of packets when the packet is scheduled to be transmitted during the gated period, wherein the packet scheduled to be transmitted during the gated period is dropped, means for deactivating the gated period, means for continuing to transmit packets subsequent to the dropped packet according to the scheduling when the gated period is deactivated, means for performing a clear channel assessment (CCA) to determine channel availability for transmitting a signal in an unlicensed spectrum, means for setting a transmission power for transmitting the signal according to the CCA, means for estimating a MBSFN signal of a UE in the unlicensed spectrum, means for adjusting a transmission power of a physical multicast channel (PMCH) according to the estimation, means for transmitting a service in an unlicensed spectrum, means for transmitting, in association with the service, a multicast control channel (MCCH), multicast channel scheduling information (MSI), system information block type 13 (SIB13), and a MCCH change notification in a licensed spectrum, means for periodically transmitting a multicast control channel (MCCH) and multicast channel scheduling information (MSI) with repetition in association with the service, means for receiving system information block type 13 (SIB13) and MCCH information from a base station, for a downlink transmission, means for muting all subframes allocated by SIB13 and MCCH or muting MCCH subframes and MSI subframes, means for disabling a potential uplink transmission from a user equipment (UE) for: all subframes allocated by SIB13 and MCCH, or MCCH subframes and MSI subframes, means for receiving system information block type 13 (SIB13) and multicast channel scheduling information (MSI) from a base station, for a downlink transmission, means for muting all subframes allocated by SIB13 and MSI, means for using, for the downlink transmission, subframes allocated for MCCH for a unicast transmission if not used for an MBMS transmission, means for disabling a potential uplink transmission from a user equipment (UE) for all subframes allocated by SIB13 and MSI, means for receiving system information block type 13 (SIB13) and MCCH information from an MBMS coordination entity (MCE), for a downlink transmission, means for muting all subframes allocated by SIB13 and MCCH or muting MCCH subframes and MSI subframes, means for disabling a potential uplink transmission from a user equipment (UE) for: all subframes allocated by SIB13 and MCCH, or MCCH subframes and MSI subframes, means for reserving a first set of subframes of the radio frame for transmitting information not associated with communicating the service in the unlicensed spectrum via a multicast broadcast single frequency network (MBSFN), and means for allocating a second set of subframes of the radio frame for transmitting information associated with communicating the service in the unlicensed spectrum via the MBSFN.

The aforementioned means may be one or more of the aforementioned modules of the apparatus 205-d and/or a processing system of the apparatus 205-d configured to perform the functions recited by the aforementioned means. The processing system may include the TX Processor 1316, the RX Processor 1370, and the controller/processor 1375 described above with reference to FIG. 13. As such, in one configuration, the aforementioned means may be the TX Processor 1316, the RX Processor 1370, and the controller/processor 1375 configured to perform the functions recited by the aforementioned means.

Figure 21A:
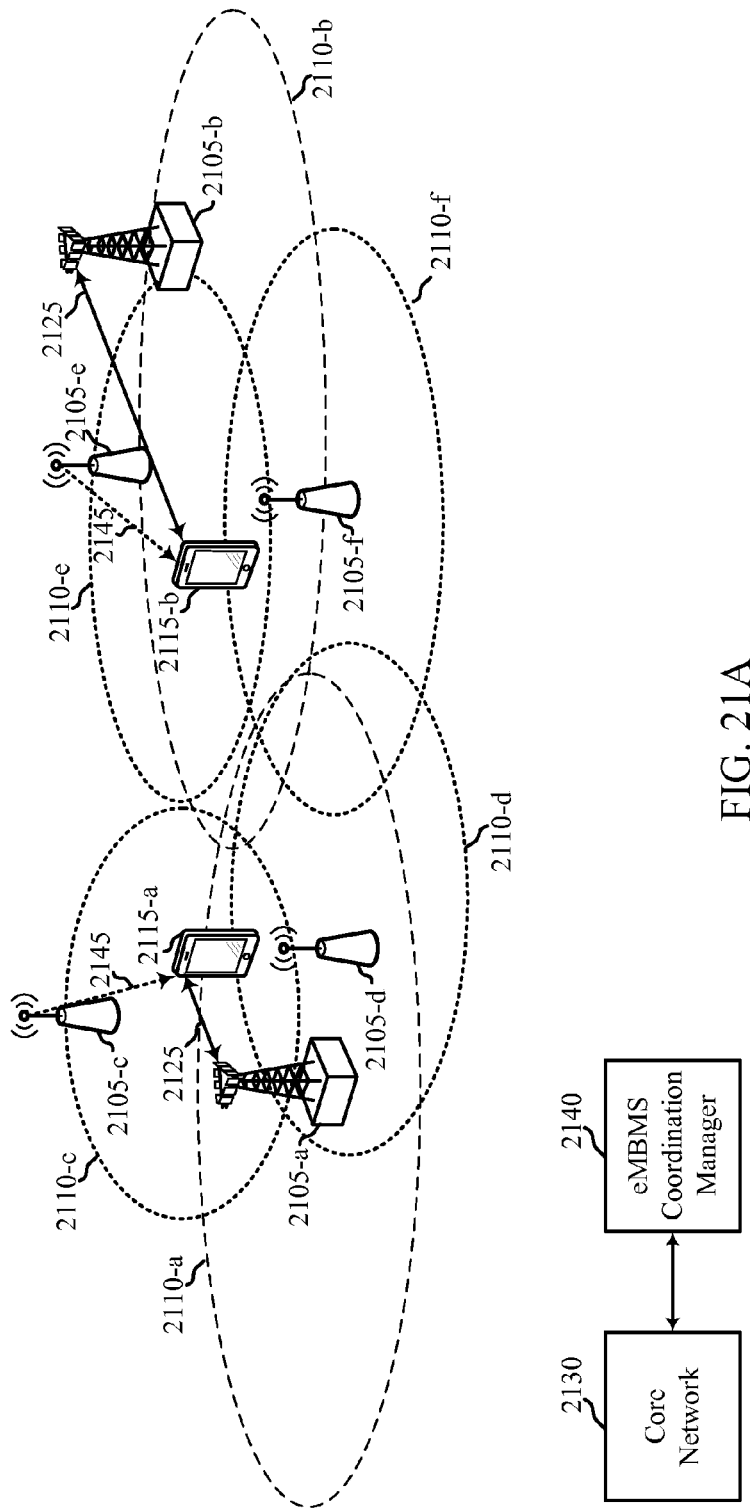
FIGS. 21A and 21B illustrate examples of a wireless communications system in which different nodes may transmit broadcast signals during different time periods, according to various embodiments.

With reference now to FIG. 21A, a diagram illustrating a wireless communications system 2100 is discussed in which a broadcast signal may be transmitted according to eMBMS during a first time period using a plurality of nodes 2105. Coordination may be established between the plurality of wireless nodes 2105 (e.g., access points or eNBs), which may include, for example, synchronization of transmission and listening intervals, such as described with reference to FIG. 6. Coordination may also include, for example, CCA coordination and/or synchronization of broadcast signal transmissions. In some cases, the coordination between the wireless nodes 2105 may be established at least in part based on transmissions received from an eMBMS coordination manager 2140 and core network 2130. The wireless communications system 2100 may be an example of portions of the wireless communications systems described with reference to FIGS. 2, 3A, 3B, and/or 9. Moreover, the wireless nodes 2105 may be examples of aspects of the access points 205, and/or base station 205-a, 205-b, 205-c described with reference to FIGS. 2, 3A, 3B, and/or 9.

In the example of FIG. 21A, a number of nodes 2105 may be located within a relatively close proximity to one another. Such a deployment may be in, for example, a relatively densely populated urban area, or within a particular establishment or venue, such as a sports stadium, for example. The plurality of nodes 2105 may include macro cell nodes 2105-a and 2105-b, which may have relatively large corresponding coverage areas 2110-a and 2110-b. The plurality of nodes 2105 may also include a number of small cell nodes 2105-c, 2105-d, 2105-e, and 2105-f that may each have a relatively small corresponding coverage area 2110-c, 2110-d, 2110-e, and 2110-f. According to some embodiments, macro cell nodes 2105-a and 2105-b may be base stations that operate using a licensed and/or unlicensed spectrum, and small cell nodes 2105-c through 2105-f may be base stations that operate using the unlicensed spectrum.

During a coordinated transmission period in the unlicensed spectrum, such as described with respect to FIG. 6, the wireless nodes 2105 may transmit signals that cause other devices or nodes (e.g., WiFi nodes) within the coverage areas 2110 of the wireless nodes 2105 to avoid communicating over the unlicensed spectrum. Because the wireless nodes 2105 operate in a coordinated manner with synchronized listening intervals, use of the unlicensed spectrum by other devices or nodes operating within the coverage areas 2110 may be reduced, thereby increasing the likelihood of each wireless node 2105-a through 2105-f performing a successful CCA during a listening interval. However, in many instances some number of the wireless nodes 2105-a through 2105-f may not successfully reserve the unlicensed spectrum as a result of a coordinated CCA, and will not transmit LTE/LTE-A signals over an unlicensed spectrum during a subsequent transmission interval.

As discussed above, in some situations a system, such as system 2100, may be operated as a SFN to provide multicast service over the unlicensed spectrum. In cases where one or more nodes 2105-a through 2105-f are not able to transmit during a particular transmission interval, this results in partial SFN operation of the system 2100. At different points in time, different sets of nodes 2105-a through 2105-f may transmit, leading to a time-varying SFN channel. In deployments having a sufficient number of nodes 2105 having overlapping coverage areas 2110, such partial SFN operation using unlicensed spectrum may provide a system that is robust to WiFi interference on individual nodes.

To provide one specific example, system 2100 of FIG. 21A illustrates transmission of a broadcast signal according to eMBMS during a first time period. In this example, nodes 2105-a and 2105-b may communicate with UEs 2115-a and 2115-b, respectively, using communications link 2125 which may be associated with a frequency in a licensed spectrum. Nodes 2105-c through 2105-f may operate using unlicensed spectrum to transmit content in a broadcast signal. In this example nodes 2105-d and 2105-f may not transmit during the first time period (e.g., due to unsuccessful CCAs associated with the first time period), and thus a subset of the nodes 2105, namely nodes 2105-c and 2105-e, may communicate with UEs 2115-a and 2115-b, respectively, using broadcast signal 2145 to deliver a first portion of the content of the broadcast signal during the first time period.

Figure 21B:
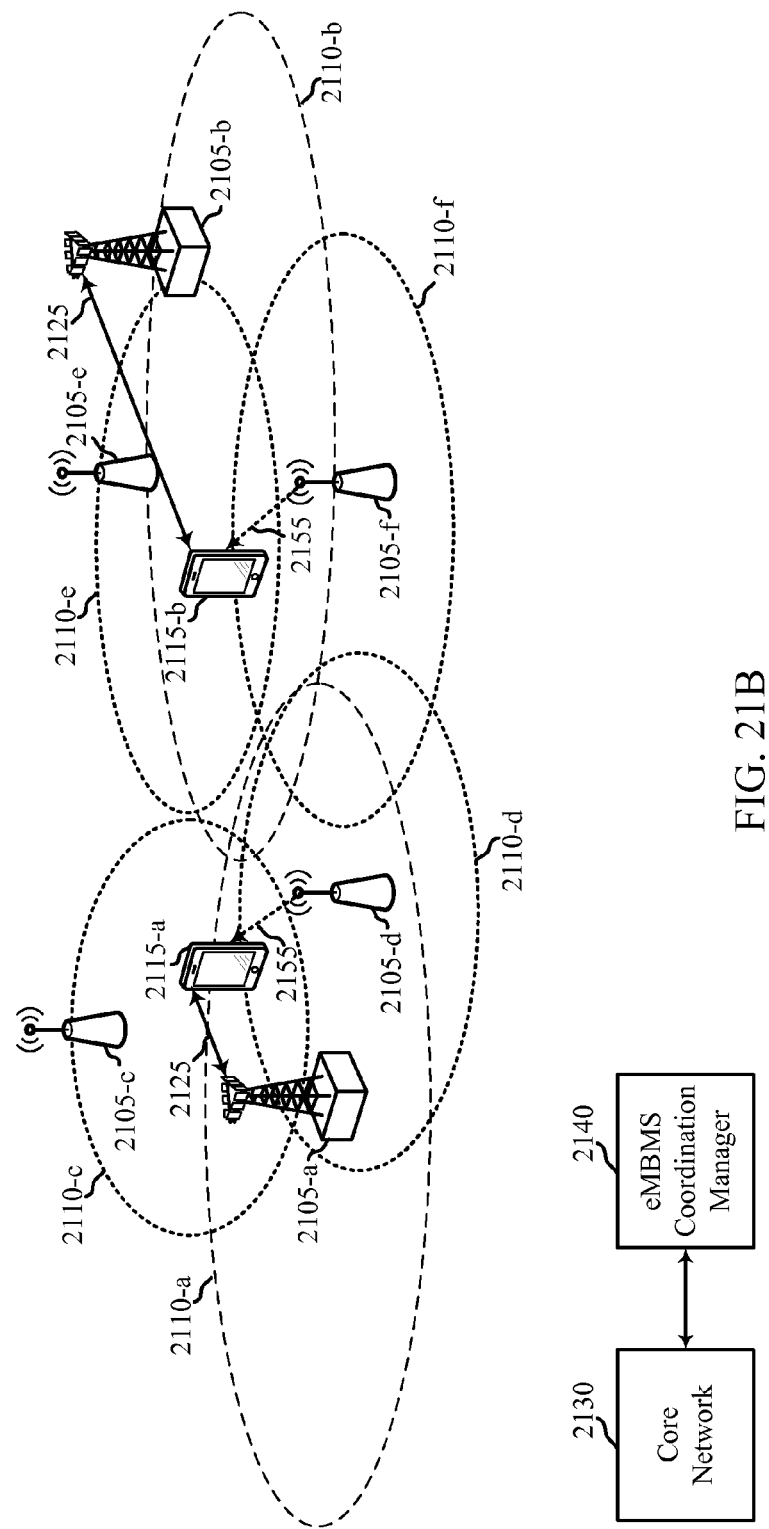

As discussed above, nodes 2105 may have coordinated transmission intervals synchronized between listening intervals. FIG. 21B illustrates system 2100 during a second time period, in which a different subset of nodes 2105 may transmit broadcast information using unlicensed spectrum. In this example, nodes 2105-c and 2105-e may not transmit during the second time period (e.g., due to unsuccessful CCAs associated with the second time period), and thus a different subset of the nodes 2105, namely nodes 2105-d and 2105-f, may communicate with UEs 2115-a and 2115-b, respectively, using broadcast signal 2145 to deliver a second portion of the content of the broadcast signal during the second time period. Of course, such a system 2100 may have many more nodes 2105 than illustrated in FIGS. 21A and 21B, and a UE 2115 may be within a coverage area 2110 of a number of different nodes 2105, and may receive such a broadcast signal 2145 from one or more nodes 2105. Thus, at given points in time a fraction of the nodes 2105 may transmit broadcast signal 2145, but the system may continue to provide sufficient coverage to provide reliable transmission of broadcast content.

According to some embodiments, information related to the broadcast signal 2145 may be transmitted to UEs 2115 according to different techniques. In some embodiments, system information may be provided in a system information block (SIB) to UEs 2115. Such a SIB may be included in a broadcast signal from a serving base station, such as nodes 2105-a and 2105-b, transmitted using a licensed spectrum. Such a SIB may be transported over, for example, a physical downlink shared channel (PDSCH), and may include an indication of a Multimedia Broadcast Multicast Services (MBMS) control channel (MCCH) location in time. The MCCH may include information related to available multicast content, and may trigger counting of UE 2115 requests to receive a particular multicast content. According to various embodiments, an eMBMS coordination manager 2140 may initiate a broadcast signal for particular multicast content when a certain number of UEs 2115 within a particular area request such content. Thus, if only one or two UEs 2115 request particular content, a unicast service may be provided to the specific UEs 2115, rather than consuming multicast resources for relatively few UEs 2115. Likewise, if a relatively large number of UEs 2115 request particular content, network efficiency may be enhanced by initiating a SFN multicast service to provide a broadcast signal over the unlicensed spectrum to deliver the content.

The MCCH may be transmitted on a physical multicast channel (PMCH) using a licensed spectrum, for example. In other examples, the MCCH may be transmitted on the PMCH using the unlicensed spectrum. Broadcast signal 2145 content may be transmitted on a MBMS Traffic Channel (MTCH), which, according to various embodiments, may be transmitted on the PMCH using the unlicensed spectrum.

Figure 22A:
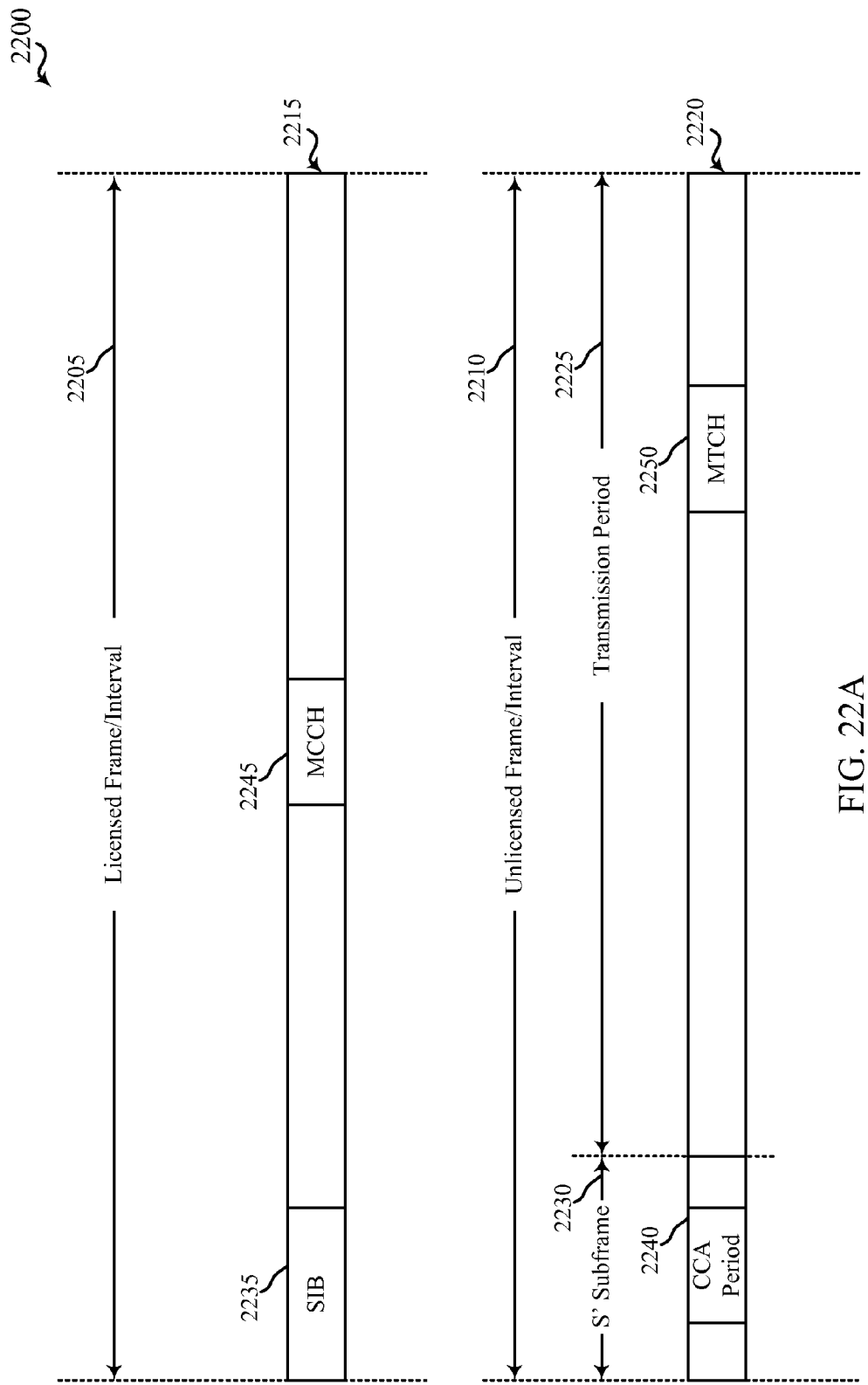
FIGS. 22A through 22C illustrate examples of different information transmitted using licensed and unlicensed spectrum for broadcast signal transmission according to various embodiments.
Figure 22B:
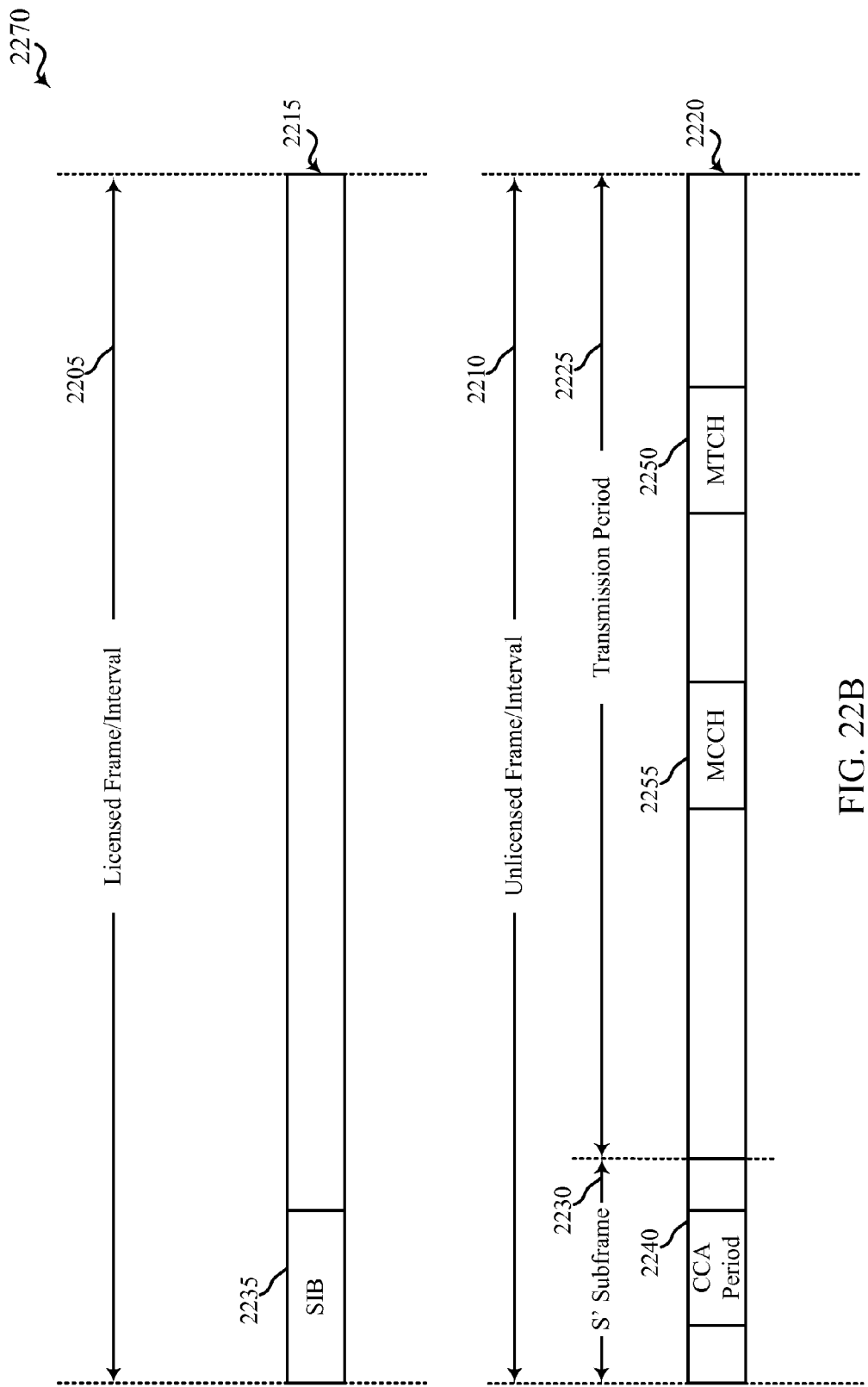
Figure 22C:
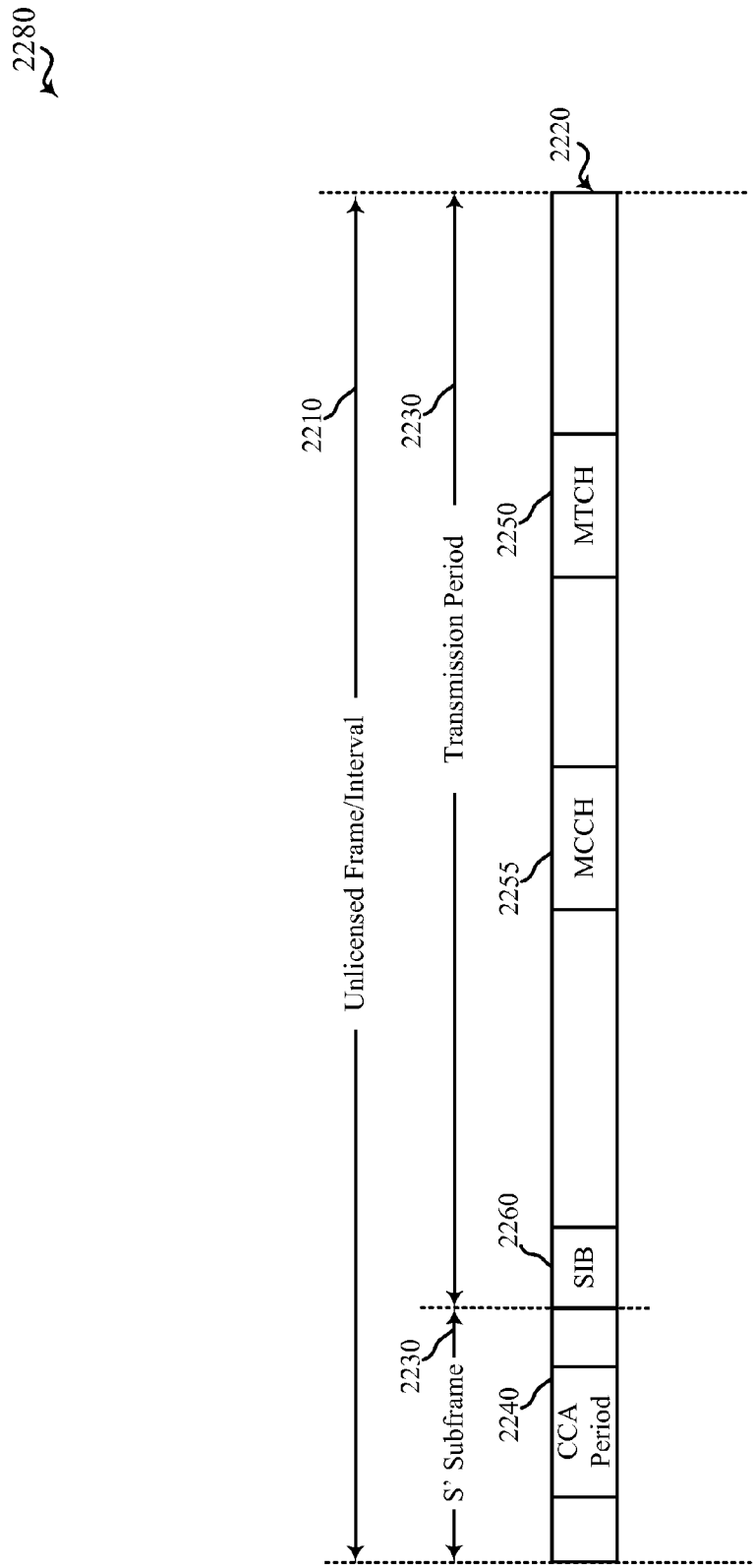

As discussed above, nodes may operate using the unlicensed spectrum according to SDL, CA, or SA operating modes. Different portions of information and control information may be transmitted in a licensed and/or unlicensed spectrum, according to various embodiments, based in part on the particular operating mode of the system. FIGS. 22A, 22B, and 22C illustrate examples 2200, 2270, and 2280 of licensed frames/intervals 2205 and unlicensed frames/intervals 2210. The licensed frames/intervals 2205 and unlicensed frames/intervals 2210 may be synchronized, and a may be used as a periodic gating interval by a base station that supports transmissions over an unlicensed spectrum. Examples of such a base station may be the access points 205, base station 205, 205-a, 205-b, 205-c, and/or wireless nodes 2105 described with reference to FIGS. 2, 3A, 3B, 9, 21A, and/or 21B. Likewise, licensed frames/intervals 2205 and unlicensed frames/intervals 2210 may be used by UEs that support transmissions over an unlicensed spectrum. Examples of such UEs may be the UEs 215, 215-a, 215-b, 215-c, 2115 and/or wireless nodes described with reference to FIGS. 2, 3A, 3B, 21A, and/or 21B. The licensed frames/intervals 2205 and unlicensed frames/intervals 2210 may also be used with the wireless communications system 200 or/and 2100, and portions of the wireless communications system 300, 300-a, and/or 900 described with reference to FIGS. 2, 3A, 3B, 9, 21A, and/or 21B.

In the example 2200 of FIG. 22A, a licensed transmission 2215 may include one or more LTE frames, and an unlicensed transmission 2220 may include one or more frames according to the particular operation mode of the system. For example, unlicensed transmission 2220 may include one or more SDL frames, which include nine downlink subframes transmitted during transmission period 2225, and a S' (special) subframe 2230 that may include a listening interval or CCA period 2240. Unlicensed transmission 2220 may include, for example, one or more time division duplex (TDD) frames that include a particular TDD uplink/downlink (UL/DL) configuration for associated subframes when operating according to a carrier aggregation or standalone mode. According to the example of FIG. 22A, at least a portion of SIB information 2235 may be transmitted using the licensed transmission 2215 in the licensed spectrum. Such SIB information 2235 may include, for example, a portion of MBMS control information (e.g., may include a portion of SIB-13 as defined in the LTE standards), which may indicate MCCH location in time on the licensed and/or unlicensed spectrum.

In the example 2200 of FIG. 22A, at least a portion of the MCCH 2245 is transmitted using licensed transmission 2215. For example, MCCH 2245 may be transmitted over the PMCH in the licensed spectrum. In some embodiments, a portion of the MCCH may be transmitted using unlicensed transmission 2220, such as illustrated in FIGS. 22B and 22C. In the example 2270 of FIG. 22B, a portion of MCCH 2255 may be transmitted over the PMCH in the unlicensed spectrum. As discussed above, the MCCH 2245 and/or 2255 may include information related to available MTCH services, and may initiate a counting procedure through which UEs that desire to receive one or more MTCH services may request the services through their associated serving base station. An eMBMS coordination manager, such as eMBMS coordination manager 240 and/or 2140 of FIG. 2, or FIG. 21A or 21B, may receive the requests and initiate a particular broadcast service based on a predetermined number of requests for the services required to initiate the MTMS service.

In some embodiments, the MCCH 2245 in the licensed spectrum (FIG. 5A) is used to initiate the counting procedure. In other embodiments, MCCH 2255 in the unlicensed spectrum (FIG. 22B or 22C) may be used to initiate the counting procedure. In some embodiments, MCCH 2255 in the unlicensed spectrum may be augmented using a new SIB transmitted in the licensed spectrum. Use of the licensed spectrum may provide a more robust reporting for purposes of the counting procedure, and may provide relatively reliable information related to UEs requesting the MTMS service. According to various embodiments that operate in supplemental downlink mode or carrier aggregation mode, UEs may report back responsive to the counting initiated by the MCCH 2245 or 2255 using licensed spectrum. In embodiments that operate in standalone mode, UEs may report back responsive to the counting initiated by MCCH 2255 using unlicensed spectrum.

In some embodiments, MTCH 2250 may be a broadcast transmission in the unlicensed spectrum that includes broadcast signal content. In each of the examples of FIGS. 22A, 22B, and 22C, the MTCH 2250 may be transmitted using unlicensed transmission 2220. According to embodiments that operate in standalone mode, such as illustrated in example 2280 of FIG. 22C, all transmissions may be transmitted using unlicensed spectrum.

Figure 23A:
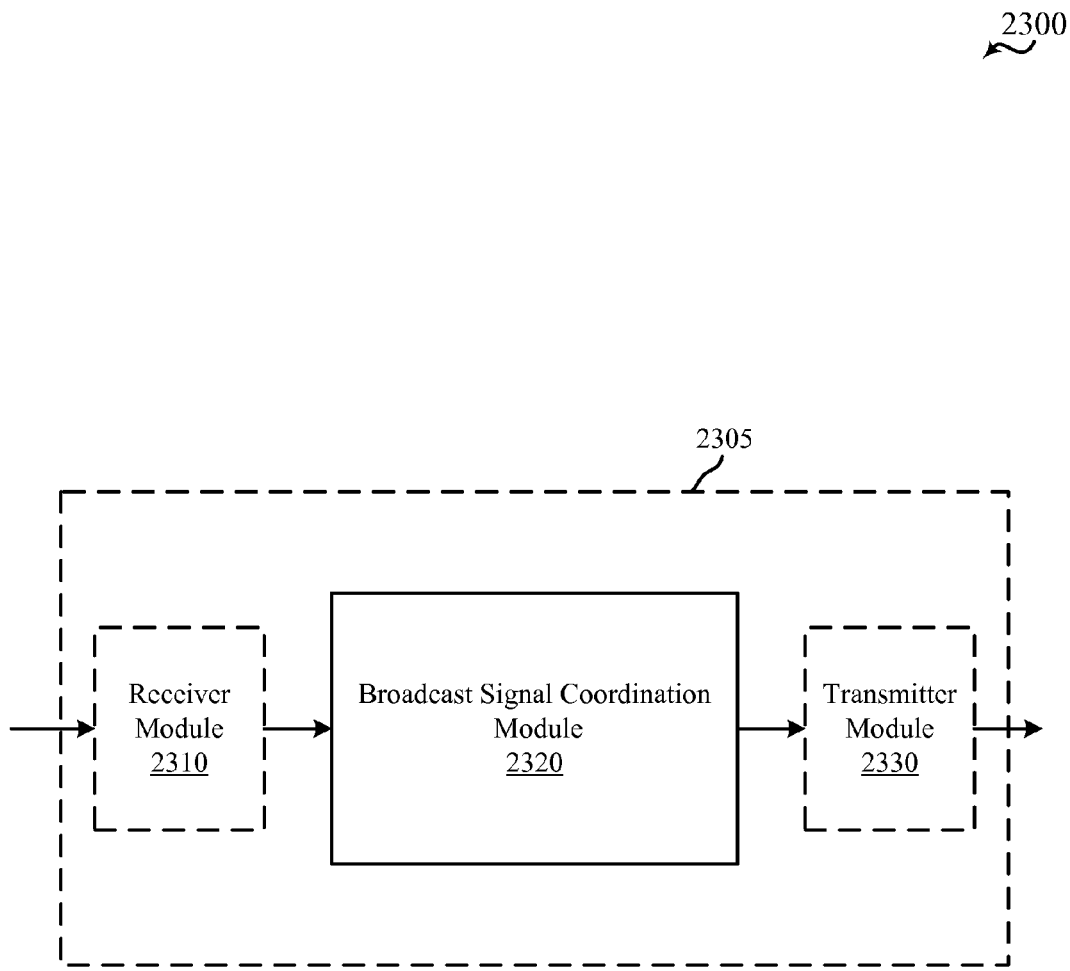
FIGS. 23A and 23B show block diagrams of examples of devices, such as base stations or UEs, for use in wireless communications according to various embodiments.

Referring now to FIG. 23A, a block diagram 2300 illustrates a device 2305 for use in wireless communications in accordance with various embodiments. In some embodiments, the device 2305 may be an example of one or more aspects of the base stations 205, 205-a, 205-b, 205-c, 2105 and/or UEs 215, 215-a, 215-b, 215-c, 2115 described with reference to FIGS. 2, 3A, 3B, 9, 21A, and/or 21B. The device 2305 may also be a processor. The device 2305 may include a receiver module 2310, a broadcast signal coordination module 2320, and/or a transmitter module 2330. Each of these components may be in communication with each other.

The components of the device 2305 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some embodiments, the receiver module 2310 may be or include a radio frequency (RF) receiver, such as an RF receiver operable to receive transmissions in a licensed spectrum (e.g., a licensed LTE spectrum) and/or an unlicensed spectrum (e.g., a spectrum traditionally used by WiFi, Bluetooth, or other unlicensed spectrum). The receiver module 2310 may be used to receive various types of data and/or control signals (i.e., transmissions) over one or more communication links of a wireless communications system including the licensed and unlicensed spectrums, such as one or more communication links of the wireless communications system 200, 300, 300-a, 900, and/or 2100 described with reference to FIGS. 2, 3A, 3B, 9, 21A, and/or 21B.

In some embodiments, the transmitter module 2330 may be or include an RF transmitter, such as an RF transmitter operable to transmit in the licensed spectrum and/or the unlicensed spectrum. The transmitter module 2330 may be used to transmit various types of data and/or control signals (i.e., transmissions) over one or more communication links of a wireless communications system, such as one or more communication links of the wireless communications system 200, 300, 300-a, 900, and/or 2100 described with reference to FIGS. 2, 3A, 3B, 9, 21A, and/or 21B.

In some embodiments, the broadcast signal coordination module 2320 may configure and/or receive broadcast signals over an unlicensed spectrum. The broadcast signals may be configured to be transmitted by different subsets of nodes during different time periods. When the broadcast signal coordination module 2320 determines that the unlicensed spectrum is to be used in broadcast signal transmission, a plurality of nodes in the network may be configured to transmit the broadcast content in a SFN service. Control information related to the broadcast signal may be communicated using licensed spectrum and/or unlicensed spectrum, such as described above. The nodes may be configured to synchronize transmission intervals between listening intervals. Receiving broadcast transmissions may include receiving a broadcast signal from different subsets of nodes during different time periods.

Figure 23B:
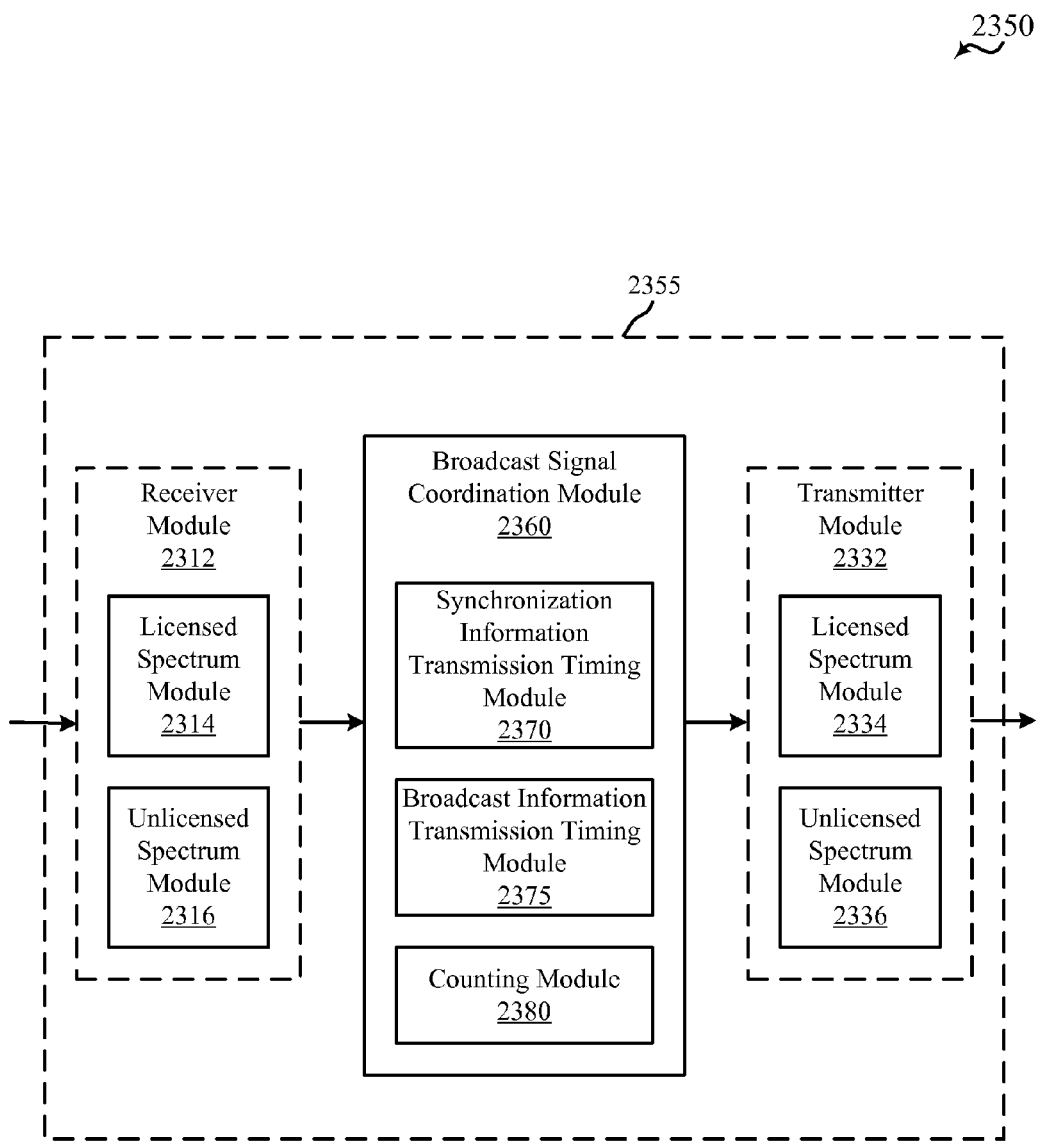

Referring now to FIG. 23B, a block diagram 2350 illustrates a device 2355 for use in wireless communications in accordance with various embodiments. In some embodiments, the device 2305 may be an example of one or more aspects of the base stations 205, 205-a, 205-b, 205-c, 2105, and/or UEs 215, 215-a, 215-b, 215-c, 2115 described with reference to FIGS. 2, 3A, 3B, 9, 21A and/or 21B. The device 2355 may also be a processor. The device 2355 may include a receiver module 2312, a broadcast signal coordination module 2360, and/or a transmitter module 2332. Each of these components may be in communication with each other.

The components of the device 2355 may, individually or collectively, be implemented with one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some embodiments, the receiver module 2312 may be an example of the receiver module 2310 of FIG. 23A. The receiver module 2312 may be or include a radio frequency (RF) receiver, such as an RF receiver operable to receive transmissions in a licensed spectrum (e.g., a licensed LTE spectrum) and/or an unlicensed spectrum (e.g., a spectrum traditionally used by WiFi, Bluetooth, or other unlicensed spectrum). The RF receiver may include separate receivers for the licensed spectrum and the unlicensed spectrum. The separate receivers may in some cases take the form of a licensed spectrum module 2314 and an unlicensed spectrum module 2316. The receiver module 2312, including the licensed spectrum module 2314 and the unlicensed spectrum module 2316, may be used to receive various types of data and/or control signals (i.e., transmissions) over one or more communication links of a wireless communications system including the licensed and unlicensed spectrums, such as one or more communication links of the wireless communications system 200, 300, 300-a. 900, and/or 2100 described with reference to FIGS. 2, 3A, 3B, 9, 21A, and/or 21B.

In some embodiments, the transmitter module 2332 may be an example of the transmitter module 2330 of FIG. 23A. The transmitter module 2332 may be or include an RF transmitter, such as an RF transmitter operable to transmit in the licensed spectrum and/or the unlicensed spectrum. The RF transmitter may include separate transmitters for the licensed spectrum and the unlicensed spectrum. The separate transmitters may in some cases take the form of a licensed spectrum module 2334 and an unlicensed spectrum module 2336. The transmitter module 2332 may be used to transmit various types of data and/or control signals (i.e., transmissions) over one or more communication links of a wireless communications system, such as one or more communication links of the wireless communications system 200, 300, 300-a, 900, and/or 2100 described with reference to FIGS. 2, 3A, 3B, 9, 21A, and/or 21B.

The broadcast signal coordination module 2360 may be an example of the broadcast signal coordination module 2320 described with reference to FIG. 23A and may include a synchronization information transmission timing module 2370, a broadcast information transmission timing module 2375, and/or a counting module 2380. Each of these components may be in communication with each other.

In some embodiments, synchronization information transmission timing module 2370 may synchronize transmission intervals and listening intervals, and coordinate performance of CCAs to determine availability of an unlicensed spectrum (e.g., a spectrum traditionally used by WiFi, Bluetooth, or other unlicensed spectrum) of each of a nodes. The timing of broadcast signals may be determined by broadcast information transmission timing module 2375. In some embodiments, the counting module 2380 may assist in establishing MTCH services that may be provided to UEs when a predetermined number of UEs within a particular area request reception of a particular MTCH service.

Figure 24:
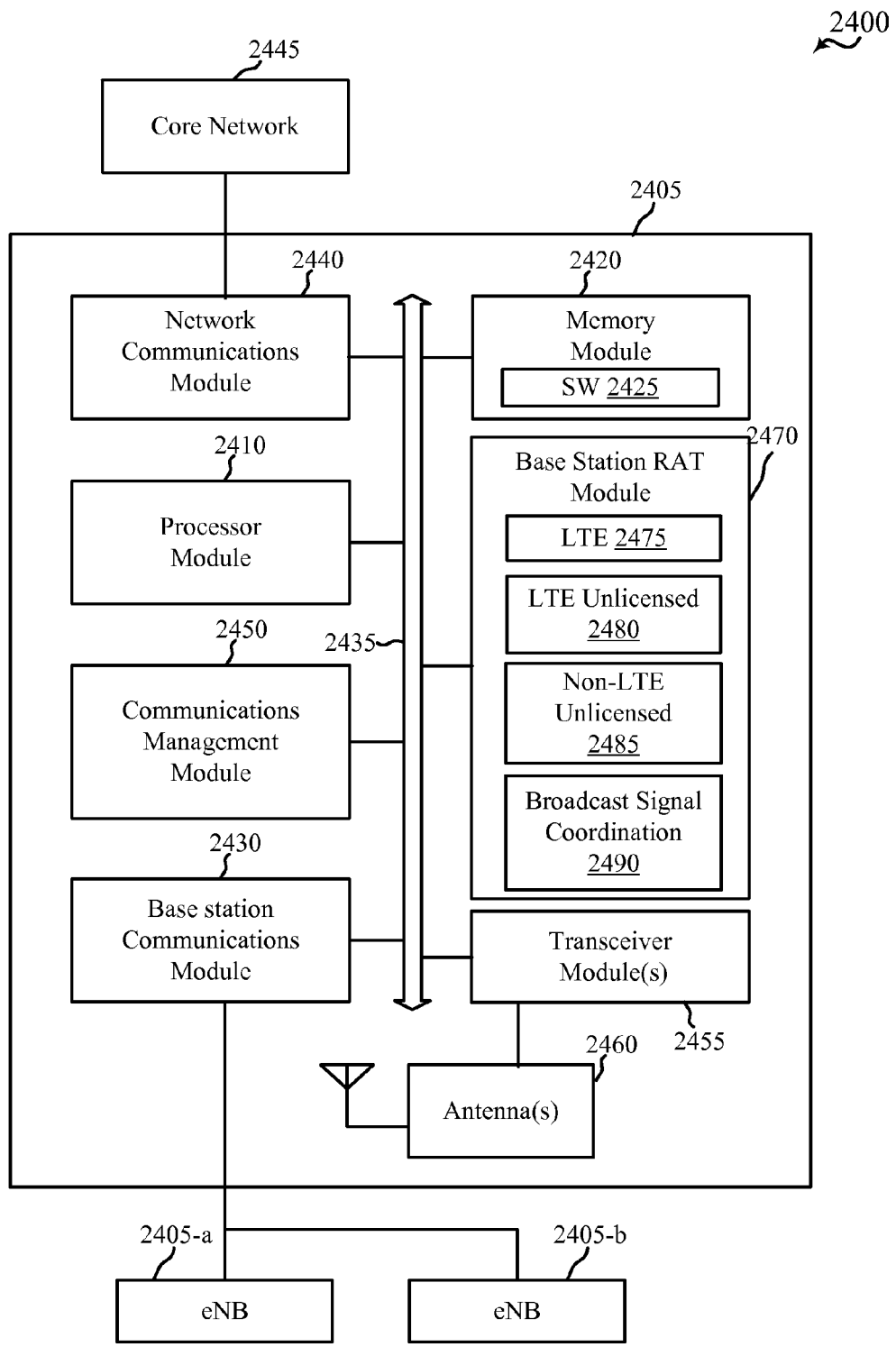
FIG. 24 shows a block diagram that illustrates an example of a base station architecture according to various embodiments.

Turning to FIG. 24, a block diagram 2400 is shown that illustrates a base station 2405 configured for LTE/LTE-A over an unlicensed spectrum. In some embodiments, the base station 2405 may be an example of one or more aspects of the base stations or devices 205, 205-a, 205-b, 205-c, 2105, 2305, and/or 2355 described with reference to FIGS. 2, 3A, 3B, 9, 21A, 21B, 23A, and/or 23B. The base station 2405 may be configured to implement at least some of the broadcast signal coordination and transmission features and functions described with respect to FIGS. 2, 3A, 3B, 21A, 21B, 22A, 22B, 22C, 23A, and/or 23B. The base station 2405 may include a processor module 2410, a memory module 2420, at least one transceiver module (represented by transceiver module(s) 2455), at least one antenna (represented by antenna(s) 2460), and/or a base station radio access technology (RAT) module 2470. The base station 2405 may also include one or both of a base station communications module 2430 and a network communications module 2440. Each of these components may be in communication with each other, directly or indirectly, over one or more buses 2435.

The memory module 2420 may include random access memory (RAM) and/or read-only memory (ROM). The memory module 2420 may store computer-readable, computer-executable software (SW) code 2425 containing instructions that are configured to, when executed, cause the processor module 2410 to perform various functions described herein for using LTE-based communications in a licensed and/or unlicensed spectrum, including the performance of broadcast signal transmission over an unlicensed spectrum. Alternatively, the software code 2425 may not be directly executable by the processor module 2410 but be configured to cause the base station 2405, e.g., when compiled and executed, to perform various of the functions described herein.

The processor module 2410 may include an intelligent hardware device, e.g., a central processing unit (CPU), a microcontroller, an ASIC, etc. The processor module 2410 may process information received through the transceiver module(s) 2455, the base station communications module 2430, and/or the network communications module 2440. The processor module 2410 may also process information to be sent to the transceiver module(s) 2455 for transmission through the antenna(s) 2460, to the base station communications module 2430 for transmission to one or more other base stations or eNBs 2405-a and 2405-b, and/or to the network communications module 2440 for transmission to a core network 2445, which may be an example of aspects of the core network 230 and/or 2130 described with reference to FIGS. 2, 21A, and/or 21B. The processor module 2410 may handle, alone or in connection with the base station RAT module 2470, various aspects of using LTE-based communications in a licensed and/or unlicensed spectrum, including the transmission of broadcast signals that may be synchronized across different subsets of nodes during different time periods.

The transceiver module(s) 2455 may include a modem configured to modulate the packets and provide the modulated packets to the antenna(s) 2460 for transmission, and to demodulate packets received from the antenna(s) 2460. The transceiver module(s) 2455 may be implemented as one or more transmitter modules and one or more separate receiver modules. The transceiver module(s) 2455 may support communications in at least one licensed spectrum (e.g., a licensed LTE spectrum) and in at least one unlicensed spectrum (e.g., a spectrum traditionally used by WiFi, Bluetooth, or other unlicensed spectrum). The transceiver module(s) 2455 may be configured to communicate bi-directionally, via the antenna(s) 2460, with one or more of the UEs or devices 215, 215-a, 215-b, 215-c, and/or 2115 described with reference to FIGS. 2, 3A, 3B, 9, 21A, and/or 21B, for example. The base station 2405 may typically include multiple antennas 2460 (e.g., an antenna array). The base station 2405 may communicate with the core network 2445 through the network communications module 2440. The base station 2405 may communicate with other base stations or eNBs, such as the base stations 2405-a and 2405-b, using the base station communications module 2430.

According to the architecture of FIG. 24, the base station 2405 may further include a communications management module 2450. The communications management module 2450 may manage communications with other base stations, eNBs, and/or devices. The communications management module 2450 may be in communication with some or all of the other components of the base station 2405 via the bus or buses 2435. Alternatively, functionality of the communications management module 2450 may be implemented as a component of the transceiver module(s) 2455, as a computer program product, and/or as one or more controller elements of the processor module 2410.

The base station RAT module 2470 may be configured to perform and/or control some or all of the base station functions or aspects described with reference to FIGS. 2, 3A, 3B, 9, 21A, 21B, 22A, 22B, 22C, 23A, and/or 23B related to using LTE-based communications in a licensed and/or unlicensed spectrum. For example, the base station RAT module 2470 may be configured to support a transmission of a broadcast signal using an unlicensed spectrum, as well as support related signaling of control information related to the broadcast signal in the unlicensed spectrum. The base station RAT module 2470 may include an LTE module 2475 configured to handle LTE communications, an LTE unlicensed module 2480 configured to handle LTE communications in an unlicensed spectrum, and a CCA for LTE communications, and/or a non-LTE unlicensed module 2485 configured to handle communications other than LTE in an unlicensed spectrum. The base station RAT module 2470 may also include a broadcast signal coordination module 2490 configured to perform, for example, any of the base station broadcast signal transmission and coordination functions described with reference to FIGS. 2, 3A, 3B, 9, 21A, 21B, 22A, 22B, 22C, 23A, and/or 23B. The broadcast signal coordination module 2490 may be an example of similar modules (e.g., module 2320 and/or module 2360) described with reference to FIGS. 23A and/or 23B. The base station RAT module 2470, or portions of it, may include a processor and/or some or all of the functionality of the base station RAT module 2470 may be performed by the processor module 2410 and/or in connection with the processor module 2410.

Figure 25:
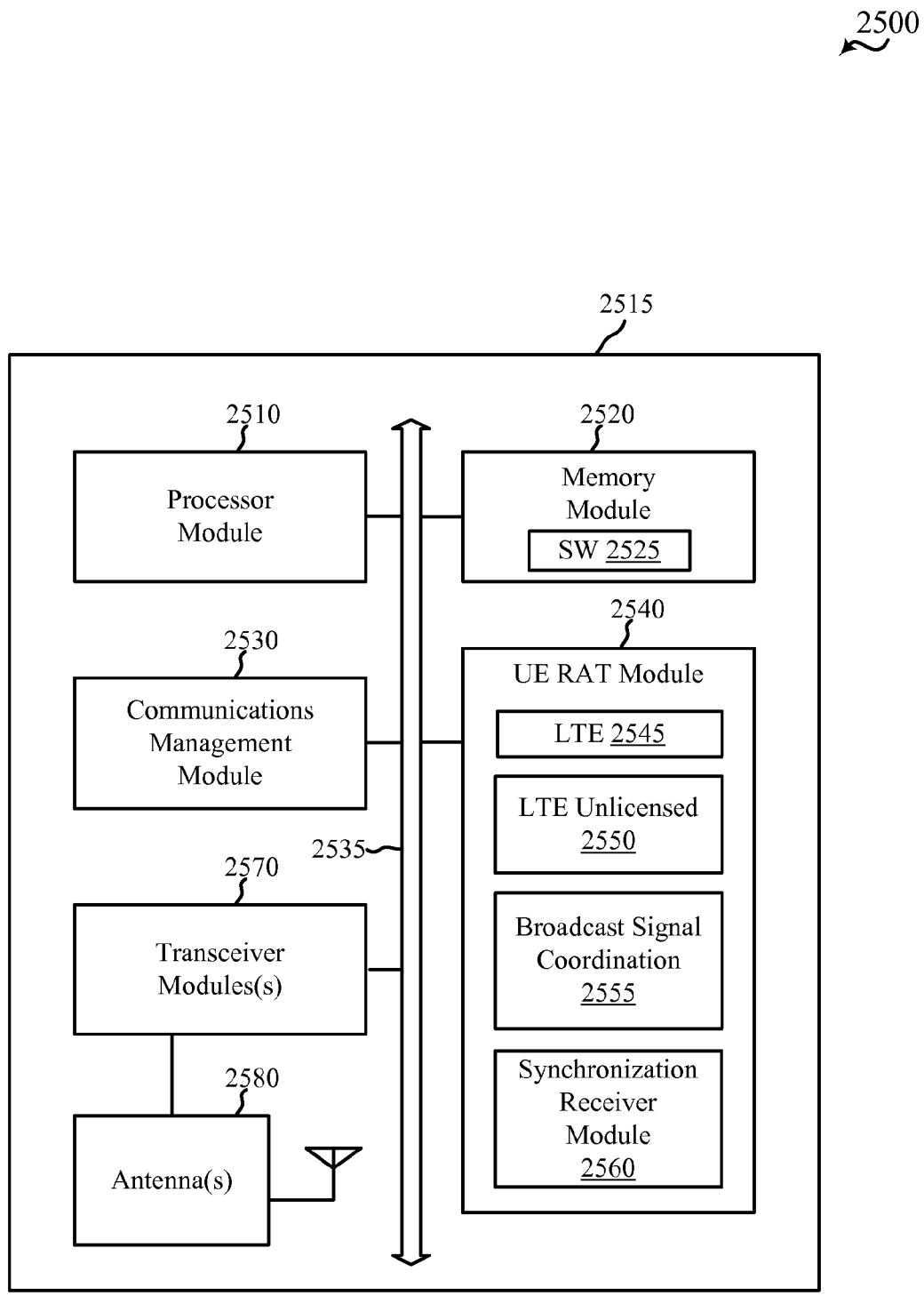
FIG. 25 shows a block diagram that illustrates an example of a UE architecture according to various embodiments.

Turning to FIG. 25, a block diagram 2500 is shown that illustrates a UE 2515 configured for LTE/LTE-A over an unlicensed spectrum. The UE 2515 may have various other configurations and may be included or be part of a personal computer (e.g., laptop computer, netbook computer, tablet computer, etc.), a cellular telephone, a PDA, a digital video recorder (DVR), an internet appliance, a gaming console, an e-readers, etc. The UE 2515 may have an internal power supply (not shown), such as a small battery, to facilitate mobile operation. In some embodiments, the UE 2515 may be an example of one or more of the UEs or devices 215, 215-a, 215-b, 215-c, and/or 2115 described with reference to FIGS. 2, 3A, 3B, 9, 21A, and/or 21B. The UE 2515 may be configured to communicate with one or more of the base stations or devices 205, 205-a, 205-b, 205-c, 2105, 2305, 2355, and/or 2405 described with reference to FIGS. 2, 3A, 3B, 9, 21A, 21B, 23A, 23B, and/or 24.

The UE 2515 may include a processor module 2510, a memory module 2520, at least one transceiver module (represented by transceiver module(s) 2570), at least one antenna (represented by antenna(s) 2580), and/or a UE RAT module 2540. Each of these components may be in communication with each other, directly or indirectly, over one or more buses 2535.

The memory module 2520 may include RAM and/or ROM. The memory module 2520 may store computer-readable, computer-executable software (SW) code 2525 containing instructions that are configured to, when executed, cause the processor module 2510 to perform various functions described herein for using LTE-based communications in a licensed and/or unlicensed spectrum. Alternatively, the software code 2525 may not be directly executable by the processor module 2510 but be configured to cause the UE 2515 (e.g., when compiled and executed) to perform various of the UE functions described herein.

The processor module 2510 may include an intelligent hardware device, e.g., a CPU, a microcontroller, an ASIC, etc. The processor module 2510 may process information received through the transceiver module(s) 2570 and/or information to be sent to the transceiver module(s) 2570 for transmission through the antenna(s) 2580. The processor module 2510 may handle, alone or in connection with the UE RAT module 2540, various aspects of using LTE-based communications in a licensed and/or unlicensed spectrum.

The transceiver module(s) 2570 may be configured to communicate bi-directionally with base stations. The transceiver module(s) 2570 may be implemented as one or more transmitter modules and one or more separate receiver modules. The transceiver module(s) 2570 may support communications in at least one licensed spectrum (e.g., a licensed LTE spectrum) and in at least one unlicensed spectrum (e.g., a spectrum traditionally used by WiFi, Bluetooth, or other unlicensed spectrum). The transceiver module(s) 2570 may include a modem configured to modulate the packets and provide the modulated packets to the antenna(s) 2580 for transmission, and to demodulate packets received from the antenna(s) 2580. While the UE 2515 may include a single antenna, there may be embodiments in which the UE 2515 may include multiple antennas 2580.

According to the architecture of FIG. 25, the UE 2515 may further include a communications management module 2530. The communications management module 2530 may manage communications with various base stations or eNBs. The communications management module 2530 may be a component of the UE 2515 in communication with some or all of the other components of the UE 2515 over the one or more buses 2535. Alternatively, functionality of the communications management module 2530 may be implemented as a component of the transceiver module(s) 2570, as a computer program product, and/or as one or more controller elements of the processor module 2510.

The UE RAT module 2540 may be configured to perform and/or control some or all of the UE functions or aspects described in FIGS. 2, 3A, 3B, 9, 21A, 21B, 22A, 22B, 22C, 23A, 23B, and/or 24 related to using LTE-based communications in a licensed and/or unlicensed spectrum. For example, the UE RAT module 2540 may be configured to support reception of broadcast signals and associated control information in a supplemental downlink mode, a carrier aggregation mode, and/or a standalone mode. The UE RAT module 2540 may be configured to receive broadcast signals from different subsets of nodes during different time periods in which broadcast signals are transmitted. The UE RAT module 2540 may include an LTE module 2545 configured to handle LTE communications, an LTE unlicensed module 2550 configured to handle LTE/LTE-A communications over an unlicensed spectrum, a broadcast signal coordination module 2555, and/or a synchronization receiver module 2560. The broadcast signal coordination module 2555 may be an example of similar modules (e.g., module 2320 and/or module 2360) described with reference to FIGS. 23A and/or 23B, and may coordinate the reception of broadcast signals transmitted from different subsets of nodes. The UE RAT module 2540, or portions of it, may include a processor and/or some or all of the functionality of the UE RAT module 2540 may be performed by the processor module 2510 and/or in connection with the processor module 2510.

Referring now back to FIG. 13, the system 1300 may also perform broadcast signal transmission and reception across different subsets of nodes during different time periods such as described with reference to FIGS. 6, 21A, 21B, 22A, 22B, 22C, 23A, and/or 23B. At the UE 1350, the processor 1359 may include a module or function 1361 that may perform various functions related to using LTE-based communications in a licensed and/or unlicensed spectrum. For example, the module or function 1361 may perform some or all of the functions of the broadcast signal coordination module 2320 or 2360 described with reference to FIG. 23A or 23B, and/or of the UE RAT module 2540 described with reference to FIG. 25.

At the base station 1310, the processor 1375 may include a module or function 1377 that may perform various aspects related to using LTE-based communications in a licensed and/or unlicensed spectrum. For example, the module or function 1377 may perform some or all of the functions of the broadcast signal coordination module 2320 or 2360 described with reference to FIG. 23A or 23B, or the base station RAT module 2470 described with reference to FIG. 24. In some embodiments, the module or function 1377 may be used to coordinate broadcast signal transmissions across a set of nodes in an SFN.

The components of the base station 1310 may, individually or collectively, be implemented with one or more ASICs adapted to perform some or all of the applicable functions in hardware. Each of the noted modules may be a means for performing one or more functions related to operation of the system 1300. Similarly, the components of the UE 1350 may, individually or collectively, be implemented with one or more ASICs adapted to perform some or all of the applicable functions in hardware. Each of the noted components may be a means for performing one or more functions related to operation of the system 1300.

Figure 26:
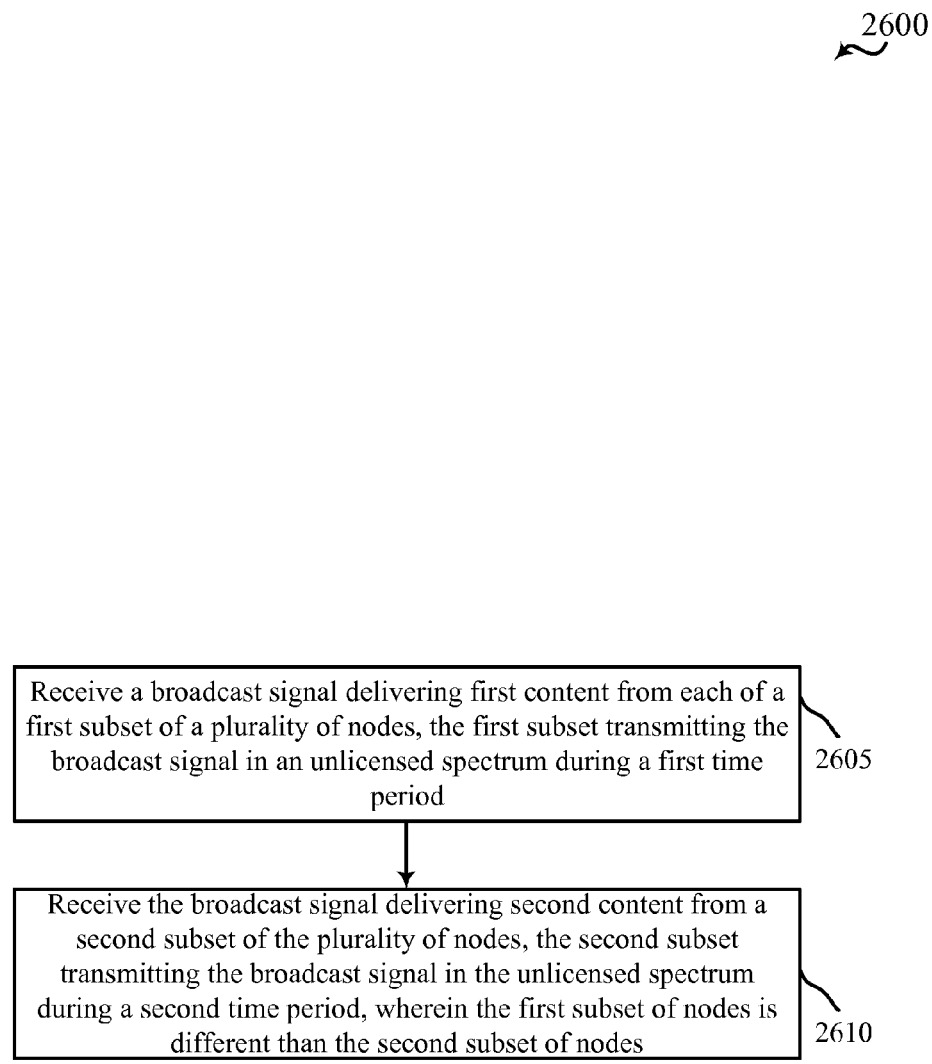
FIGS. 26 and 27 are flowcharts of examples of methods for broadcast transmission reception using unlicensed spectrum (e.g., at a UE) according to various embodiments.

FIG. 26 shows a flowchart illustrating an example of a method 2600 for wireless communications. The method 2600 may be performed by the UEs or devices 215, 215-*a*, 215-*b*, 215-*c*, 1350, 2115, 2305, 2355, and/or 2515 described with reference to FIGS. 2, 3A, 3B, 9, 13, 21A, 21B, 23A, 23B, and/or 25. In one embodiment, a UE may execute one or more sets of codes to control the functional elements of the UE to perform the functions described below.

At block 2605, a broadcast signal is received that delivers first content from each of a first subset of a plurality of nodes, the first subset transmitting the broadcast signal in an unlicensed spectrum during a first time period. The plurality of nodes may make up a single frequency network (SFN) that performs partial SFN operation during the first time period. The operation(s) at block 2605 may in some cases be performed using the broadcast signal coordination module 2320 and/or the receiver module 2310 described with reference to FIG. 23A, the broadcast information transmission timing module 2375, and/or receiver module 2312 described with reference to FIG. 23B, the broadcast signal coordination module 2555, the transceiver module 2570, and/or the antennas 2580 described with reference to FIG. 25, and/or the module or function 1361, the Rx processor 1356, the Rx demodulators 1354-*a* through 1354-*n*, and/or the antennas 1352-*a* through 1352-*n* described with reference to FIG. 13.

At block 2610, the UE may receive a broadcast signal delivering second content from a second subset of the plurality of nodes, the second subset transmitting the broadcast signal in the unlicensed spectrum during a second time period, wherein the first subset of nodes is different than the second subset of nodes. The operation(s) at block 2610 may in some cases be performed using the broadcast signal coordination module 2320 and/or the receiver module 2310 described with reference to FIG. 23A, the broadcast information transmission timing module 2375, and/or receiver module 2312 described with reference to FIG. 23B, the broadcast signal coordination module 2555, the transceiver module 2570, and/or the antennas 2580 described with reference to FIG. 25, and/or the module or function 1361, the Rx processor 1356, the Rx demodulators 1354-*a* through 1354-*n*, and/or the antennas 1352-*a* through 1352-*n* described with reference to FIG. 13. The transmissions over an unlicensed spectrum by the nodes may be coordinated to provide synchronized transmission and listening intervals.

Thus, the method 2600 may provide for wireless communications in which broadcast signals may be received on different subsets of a plurality of nodes at different times, thereby a time varying SFN channel in an unlicensed spectrum. It should be noted that the method 2600 is just one implementation and that the operations of the method 2600 may be rearranged or otherwise modified such that other implementations are possible.

Figure 27:
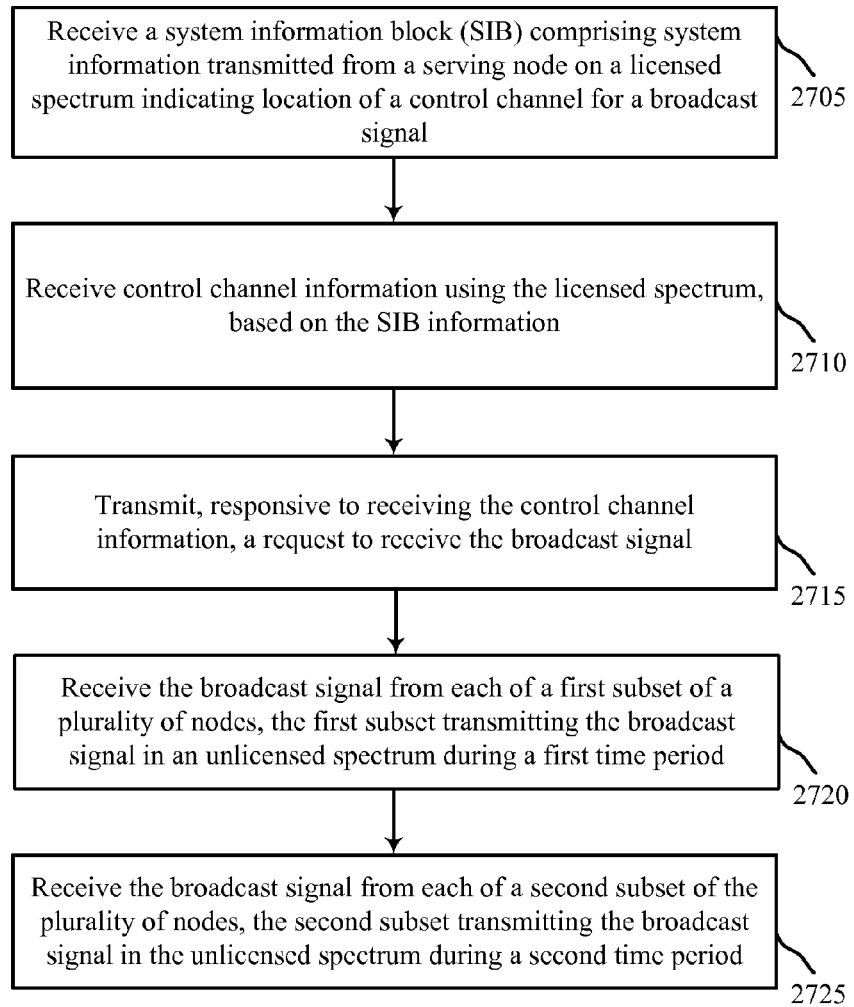

FIG. 27 shows a flowchart illustrating an example of a method 2700 for wireless communications. The method 2700 may be performed by the UEs or devices 215, 215-*a*, 215-*b*, 215-*c*, 1350, 2115, 2305, 2355, and/or 2515 described in FIGS. 2, 3A, 3B, 13, 21A, 21B, 23A, 23B, and/or 25. In one embodiment, a UE may execute one or more sets of codes to control the functional elements of the UE to perform the functions described below.

At block 2705, a system information block (SIB) is received comprising system information transmitted from a serving node in a licensed spectrum indicating location of a control channel for a broadcast signal. The SIB information may include an indication of a MCCH location in time, for example. In some embodiments, the MCCH may be transmitted on a physical multicast channel (PMCH) using a licensed spectrum or using the unlicensed spectrum. The operation(s) at block 2705 may in some cases be performed using the broadcast signal coordination module 2320 and/or the receiver module 2310 described with reference to FIG. 23A, the broadcast information transmission timing module 2375, and/or receiver module 2312 described with reference to FIG. 23B, the broadcast signal coordination module 2555, the transceiver module 2570, and/or the antennas 2580 described with reference to FIG. 25, and/or the module or function 1361, the Rx processor 1356, the Rx demodulators 1354-*a* through 1354-*n*, and/or the antennas 1352-*a* through 1352-*n* described with reference to FIG. 13.

At block 2710, control channel information is received using the licensed spectrum, based on the SIB information. The operation(s) at block 2710 may in some cases be performed using the broadcast signal coordination module 2320 and/or the receiver module 2310 described with reference to FIG. 23A, the broadcast information transmission timing module 2375, and/or receiver module 2312 described with reference to FIG. 23B, the broadcast signal coordination module 2555, the transceiver module 2570, and/or the antennas 2580 described with reference to FIG. 25, and/or the module or function 1361, the Rx processor 1356, the Rx demodulators 1354-*a* through 1354-*n*, and/or the antennas 1352-*a* through 1352-*n* described with reference to FIG. 13.

At block 2715, the UE may transmit, responsive to receiving the control channel information, a request to receive the broadcast signal. The request may be transmitted on a licensed spectrum to a base station, according to some embodiments. In other embodiments, the request may be transmitted on the unlicensed spectrum to the base station. The operation(s) at block 2715 may in some cases be performed using the broadcast signal coordination module 2320 and/or the transmitter module 2330 described with reference to FIG. 23A, the broadcast information transmission timing module 2375, and/or transmitter module 2332 described with reference to FIG. 23B, the broadcast signal coordination module 2555, the transceiver module 2570, and/or the antennas 2580 described with reference to FIG. 25, and/or the module or function 1361, the Tx processor 1368, the Tx modulators 1354-*a* through 1354-*n*, and/or the antennas 1352-*a* through 1352-*n* described with reference to FIG. 13.

At block 2720, the UE may receive the broadcast signal from each of a first subset of a plurality of nodes, the first subset transmitting the broadcast signal in an unlicensed spectrum during a first time period. The operation(s) at block 2720 may in some cases be performed using the broadcast signal coordination module 2320 and/or the receiver module 2310 described with reference to FIG. 23A, the broadcast information transmission timing module 2375, and/or receiver module 2312 described with reference to FIG. 23B, the broadcast signal coordination module 2555, the transceiver module 2570, and/or the antennas 2580 described with reference to FIG. 25, and/or the module or function 1361, the Rx processor 1356, the Rx demodulators 1354-*a* through 1354-*n*, and/or the antennas 1352-*a* through 1352-*n* described with reference to FIG. 13.

At block 2725, the UE may receive the broadcast signal from each of a second subset of the plurality of nodes, the second subset transmitting the broadcast signal in the unlicensed spectrum during a second time period. The operation(s) at block 2725 may in some cases be performed using the broadcast signal coordination module 2320 and/or the receiver module 2310 described with reference to FIG.

23A, the broadcast information transmission timing module 2375, and/or receiver module 2312 described with reference to FIG. 23B, the broadcast signal coordination module 2555, the transceiver module 2570, and/or the antennas 2580 described with reference to FIG. 25, and/or the module or function 1361, the Rx processor 1356, the Rx demodulators 1354-*a* through 1354-*n*, and/or the antennas 1352-*a* through 1352-*n* described with reference to FIG. 13.

Thus, the method 2700 may provide for wireless communications in which broadcast signals may be received on different subsets of a plurality of nodes at different times, thereby a time varying SFN channel in an unlicensed spectrum. It should be noted that the method 2700 is just one implementation and that the operations of the method 2700 may be rearranged or otherwise modified such that other implementations are possible.

Figure 28:
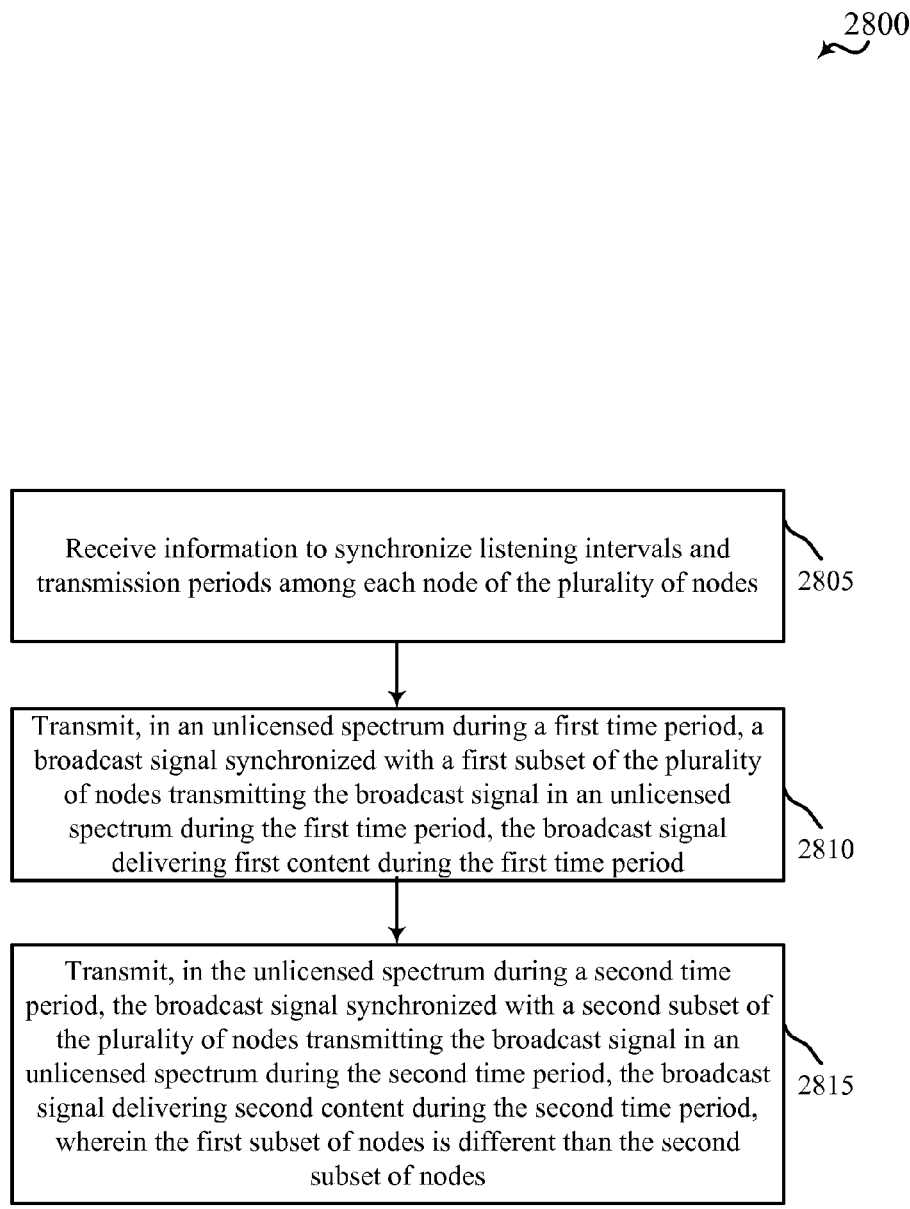
FIGS. 28 and 29 are flowcharts of examples of methods for transmission of broadcast signals using unlicensed spectrum (e.g., at a base station) according to various embodiments.

FIG. 28 shows a flowchart illustrating an example of a method 2800 for wireless communications. The method 2800 may be performed by the base stations or devices 205, 205-*a*, 205-*b*, 205-*c*, 1310, 2105, 2305, 2355, and/or 2405 described in FIGS. 2, 3A, 3B, 9, 13, 21A, 21B, 23A, 23B, and/or 24. In one embodiment, a base station may execute one or more sets of codes to control the functional elements of the base station to perform the functions described below.

At block 2805, information may be received to synchronize listening intervals and transmission periods among each node of the plurality of nodes. The communications signals may be received from an eMBMS coordination manager, from a core network, and/or from other base stations, according to various embodiments. The operation(s) at block 2805 may in some cases be performed using the broadcast signal coordination module 2320 and/or 2360 described with reference to FIGS. 23A and/or 23B, the base station RAT module 2470 described with reference to FIG. 24, and/or the module or function 1377 described with reference to FIG. 13.

At block 2810, the base station may transmit, in an unlicensed spectrum during a first time period, a broadcast signal synchronized with a first subset of the plurality of nodes transmitting the broadcast signal in an unlicensed spectrum during the first time period, the broadcast signal delivering first content during the first time period. The operation(s) at block 2810 in some cases be performed using the broadcast signal coordination module 2320 and/or the transmitter module 2330 described with reference to FIG. 23A, the broadcast information transmission timing module 2375, and/or transmitter module 2332 described with reference to FIG. 23B, the broadcast signal coordination module 2490, the transceiver module 2455, and/or the antennas 2460 described with reference to FIG. 24, and/or the module or function 1377, the Tx processor 1316, the Rx demodulators 1318-*a* through 1318-*x*, and/or the antennas 1320-*a* through 1320-*x* described with reference to FIG. 13.

At block 2815, the base station may transmit, in the unlicensed spectrum during a second time period, the broadcast signal synchronized with a second subset of the plurality of nodes transmitting the broadcast signal in an unlicensed spectrum during the second time period, the broadcast signal delivering second content during the second time period, wherein the first subset of nodes is different than the second subset of nodes. The operation(s) at block 2815 in some cases be performed using the broadcast signal coordination module 2320 and/or the transmitter module 2330 described with reference to FIG. 23A, the broadcast information transmission timing module 2375, and/or transmitter module 2332 described with reference to FIG. 23B, the broadcast signal coordination module 2490, the transceiver module 2455, and/or the antennas 2460 described with reference to FIG. 24, and/or the module or function 1377, the Tx processor 1316, the Rx demodulators 1318-*a* through 1318-*x*, and/or the antennas 1320-*a* through 1320-*x* described with reference to FIG. 13.

Thus, the method 2800 may provide for wireless communications in which broadcast signals may be transmitted on different subsets of a plurality of nodes at different times, thereby a time varying SFN channel in an unlicensed spectrum. It should be noted that the method 2800 is just one implementation and that the operations of the method 2800 may be rearranged or otherwise modified such that other implementations are possible.

Figure 29:
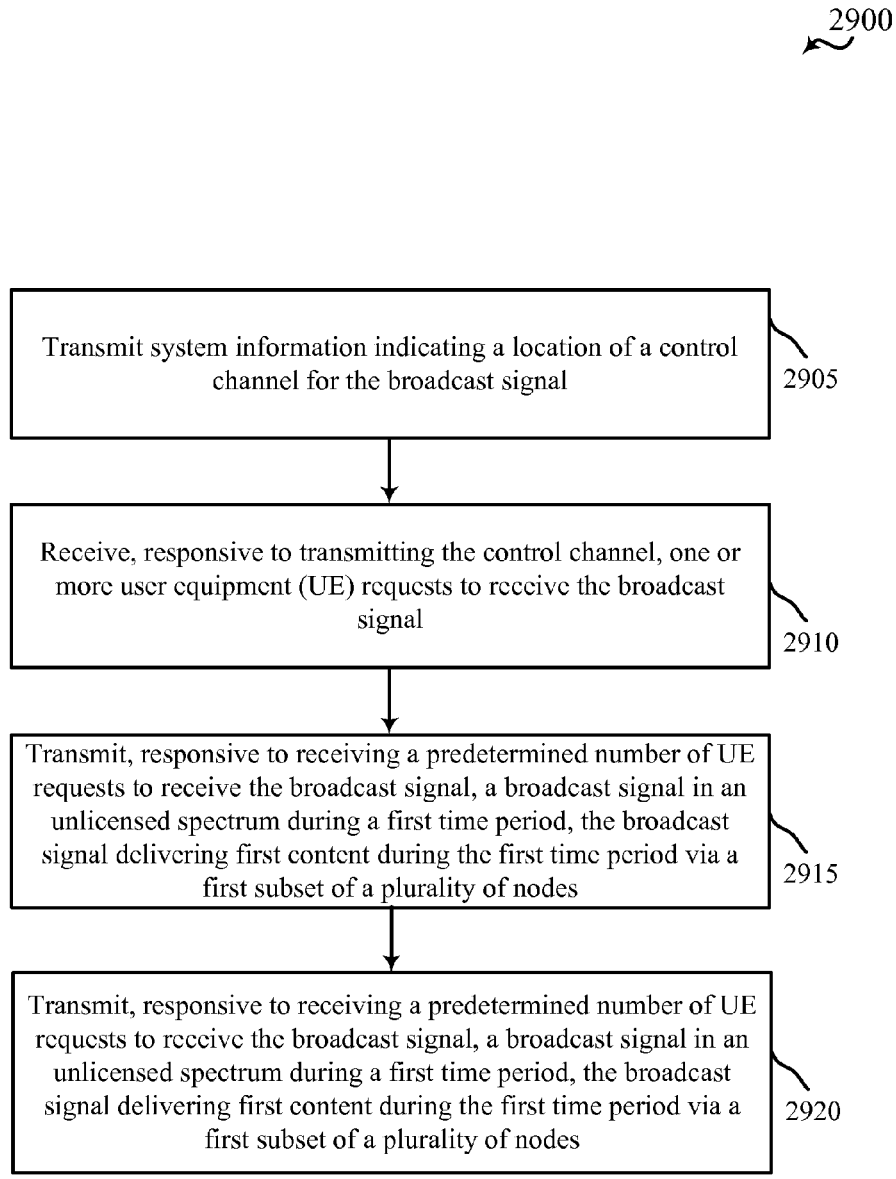

FIG. 29 shows a flowchart illustrating an example of a method 2900 for wireless communications. The method 2900 may be performed by the base stations or devices 205, 205-*a*, 205-*b*, 205-*c*, 1310, 2105, 2305, 2355, and/or 2405 described in FIGS. 2, 3A, 3B, 9, 13, 21A, 21B, 23A, 23B, and/or 24. In one embodiment, a base station may execute one or more sets of codes to control the functional elements of the base station to perform the functions described below.

At block 2905, system information may be transmitted that indicates a location of a control channel for the broadcast signal. The operation(s) at block 2905 in some cases be performed using the broadcast signal coordination module 2320 and/or the transmitter module 2330 described with reference to FIG. 23A, the broadcast information transmission timing module 2375, and/or transmitter module 2332 described with reference to FIG. 23B, the broadcast signal coordination module 2490, the transceiver module 2455, and/or the antennas 2460 described with reference to FIG. 24, and/or the module or function 1377, the Tx processor 1316, the Tx modulators 1318-*a* through 1318-*x*, and/or the antennas 1320-*a* through 1320-*x* described with reference to FIG. 13.

At block 2910, the base station may receive, responsive to transmitting the control channel, one or more user equipment (UE) requests to receive the broadcast signal. The operation(s) at block 2910 in some cases be performed using the broadcast signal coordination module 2320 and/or the receiver module 2310 described with reference to FIG. 23A, the counting module 2380, and/or receiver module 2312 described with reference to FIG. 23B, the broadcast signal coordination module 2490, the transceiver module 2455, and/or the antennas 2460 described with reference to FIG. 24, and/or the module or function 1377, the Rx processor 1370, the Rx demodulators 1318-*a* through 1318-*x*, and/or the antennas 1320-*a* through 1320-*x* described with reference to FIG. 13.

At block 2915, the base station may transmit, responsive to receiving a predetermined number of UE requests to receive the broadcast signal, a broadcast signal in an unlicensed spectrum during a first time period, the broadcast signal delivering first content during the first time period via a first subset of a plurality of nodes. The operation(s) at block 2915 in some cases be performed using the broadcast signal coordination module 2320 and/or the transmitter module 2330 described with reference to FIG. 23A, the broadcast information transmission timing module 2375, and/or transmitter module 2332 described with reference to FIG. 23B, the broadcast signal coordination module 2490, the transceiver module 2455, and/or the antennas 2460 described with reference to FIG. 24, and/or the module or function 1377, the Tx processor 1316, the Tx modulators 1318-*a* through 1318-*x*, and/or the antennas 1320-*a* through 1320-*x* described with reference to FIG. 13.

At block 2920, the base station may Transmit, responsive to receiving a predetermined number of UE requests to receive the broadcast signal, a broadcast signal in an unlicensed spectrum during a first time period, the broadcast signal delivering first content during the first time period via a first subset of a plurality of nodes. The operation(s) at block 2920 in some cases be performed using the broadcast signal coordination module 2320 and/or the transmitter module 2330 described with reference to FIG. 23A, the broadcast information transmission timing module 2375, and/or transmitter module 2332 described with reference to FIG. 23B, the broadcast signal coordination module 2490, the transceiver module 2455, and/or the antennas 2460 described with reference to FIG. 24, and/or the module or function 1377, the Tx processor 1316, the Tx modulators 1318-*a* through 1318-*x*, and/or the antennas 1320-*a* through 1320-*x* described with reference to FIG. 13.

Thus, the method 2900 may provide for wireless communications in which broadcast signals may be transmitted, responsive to receiving UE requests to receive the broadcast signal, on different subsets of a plurality of nodes at different times, thereby a time varying SFN channel in an unlicensed spectrum. It should be noted that the method 2900 is just one implementation and that the operations of the method 2900 may be rearranged or otherwise modified such that other implementations are possible.

Figure 30:
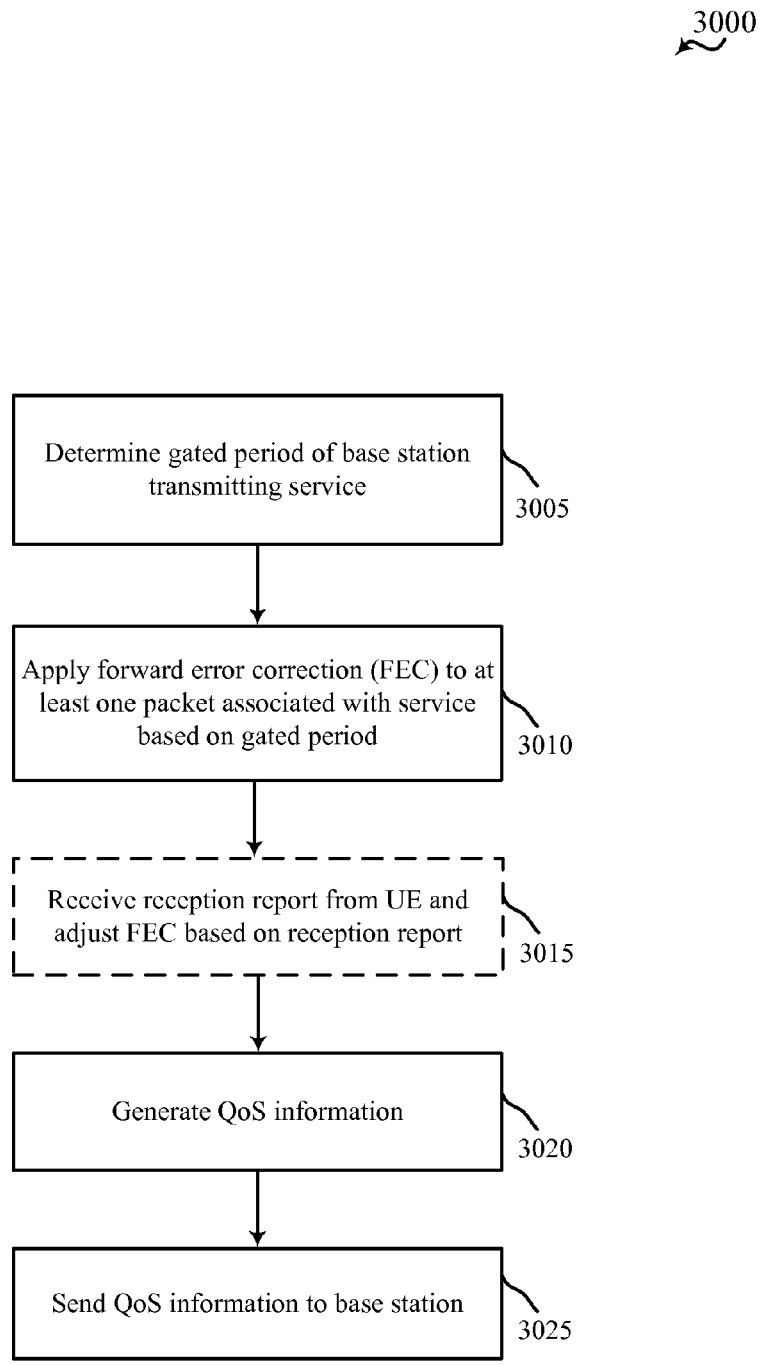
FIGS. 30-32 are flowcharts of examples of methods for wireless communications in an unlicensed spectrum (e.g., at a Evolved Packet Core (EPC)) according to various embodiments.

FIG. 30 shows a flowchart illustrating an example of a method 3000 for wireless communications. The method 3000 may be performed by a BM-SC (e.g., BM-SC 126 of FIG. 1). At block 3005, the BM-SC determines a gated period of a base station transmitting a service.

In an aspect, the BM-SC determines the gated period by determining that the service is transmitted by the base station in an unlicensed spectrum, determining a load of the base station in a service area, and estimating the gated period based on the service being transmitted in the unlicensed spectrum and the base station load in the service area. Additionally or alternatively, the BM-SC determines the gated period by receiving a report of the base station gated period from an MBMS coordination entity (MCE) and/or receiving a report of the base station gated period from a base station.

At block 3010, the BM-SC applies forward error correction (FEC) to at least one packet associated with the service based on the determined gated period. In LTE/LTE-A communications in an unlicensed spectrum, SNR variation can occur when the base station is gated off from time to time. Therefore, FEC is applied to enable recovery of the at least one packet.

At block 3015, the BM-SC may optionally receive a reception report from a user equipment (UE). The reception report may indicate a status of receiving the service. Thereafter, the BM-SC may adjust the FEC based on the received reception report.

At block 3020, the BM-SC generates quality of service (QoS) information based on the determined gated period and the applied FEC for each service. The gated period can be determined via base station feedback or operations administration and maintenance (OAM) procedures. Thereafter, at block 3025, the BM-SC sends the QoS information to the base station, wherein the QoS information facilitates the base station in determining to transmit the service in an unlicensed spectrum or to transmit the service in a licensed spectrum. For example, for a delay sensitive service based on a corresponding QoS, the base station may schedule the service in a licensed spectrum. Meanwhile, the base station may schedule a service which is delay tolerant in an unlicensed spectrum where packet reception errors can be reduced by application layer FEC.

Alternatively, at block 3020, the BM-SC may generate QoS information for the service. Accordingly, at block 3025, the BM-SC sends the QoS information to the base station, wherein the QoS information and the gated period facilitates the base station to transmit the service in an unlicensed spectrum or transmit the service in a licensed spectrum.

Figure 31:
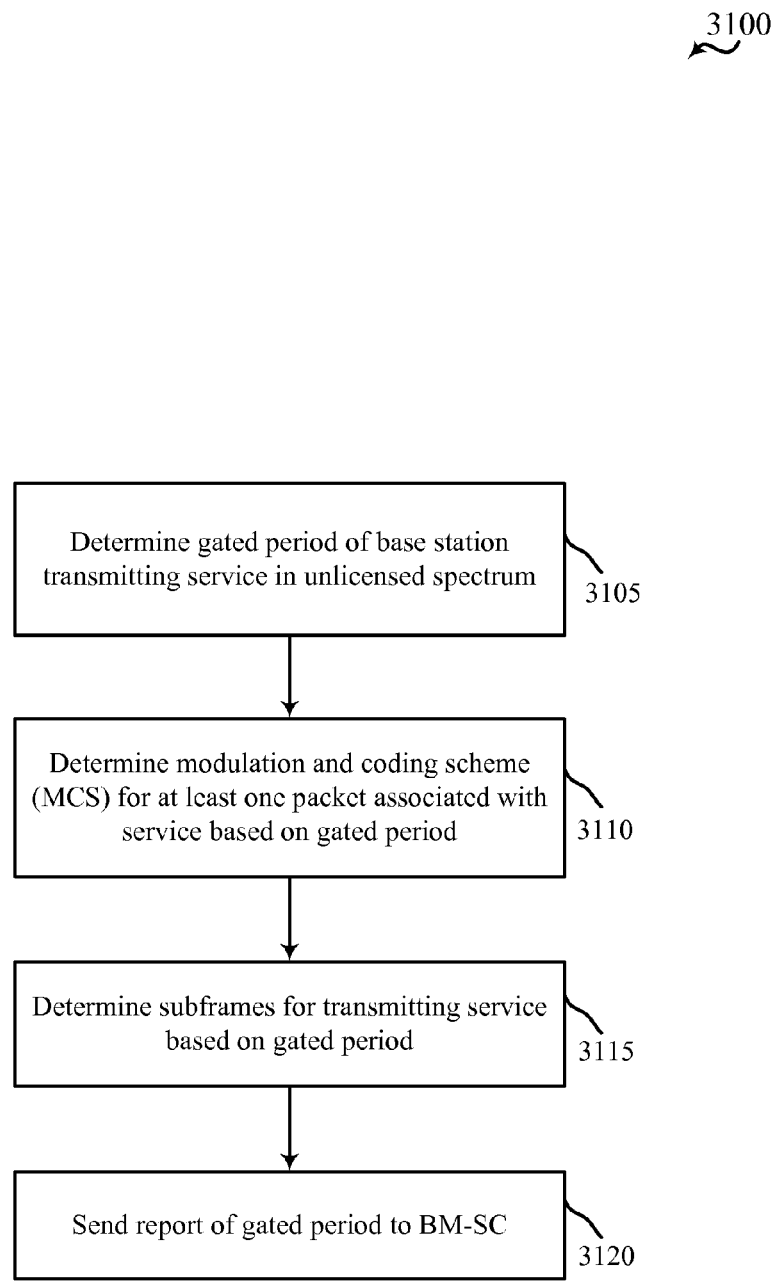

FIG. 31 shows a flowchart illustrating an example of a method 3100 for wireless communications. The method 3100 may be performed by an MCE (e.g., MCE 128 of FIG. 1). At block 3105, the MCE determines a gated period of a base station transmitting a service in an unlicensed spectrum. The MCE may determine the gated period by determining a load of the base station in a service area, and estimating the gated period based on the service being transmitted in the unlicensed spectrum and the base station load and/or AP load in the service area via OAM. Alternatively, the MCE may determine the gated period by receiving a report of the gated period from the base station.

At block 3110, the MCE determines a modulation and coding scheme (MCS) for at least one packet associated with the service based on the determined gated period. At block 3115, the MCE determines subframes for transmitting the service based on the determined gated period. At block 3120, the MCE may send the report of the gated period to a broadcast multicast service center (BM-SC). The report facilitates the BM-SC to apply forward error correction (FEC) to at least one packet associated with the service based on the report.

Figure 32:
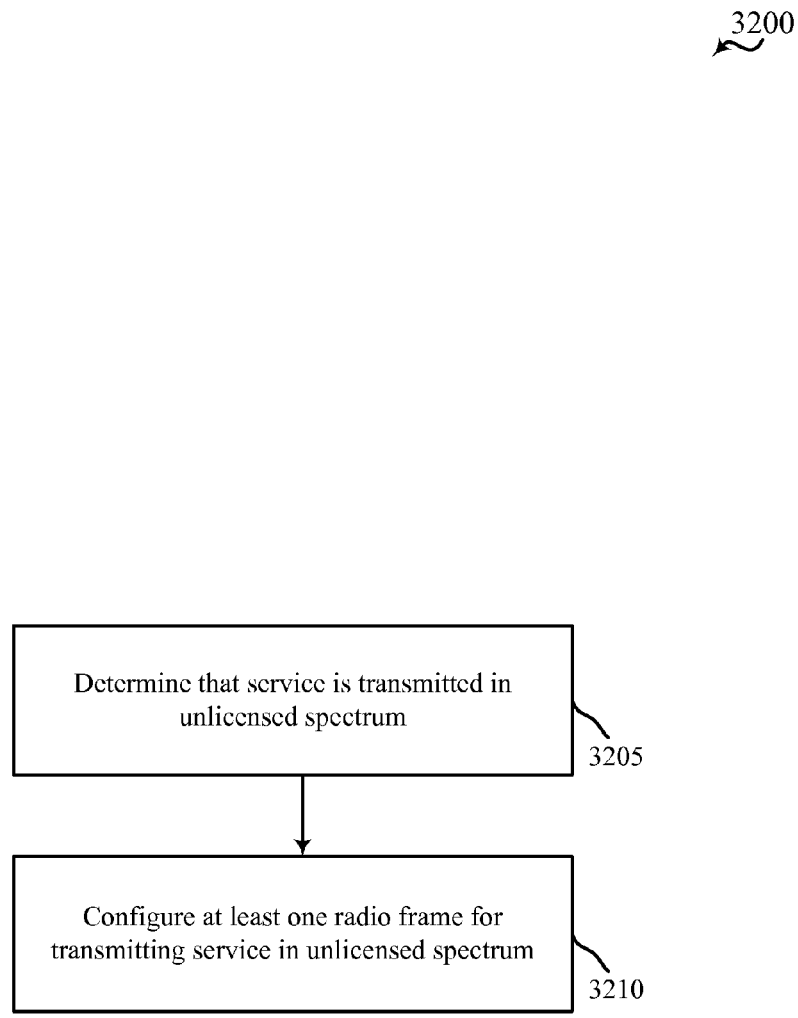

FIG. 32 shows a flowchart illustrating an example of a method 3200 for wireless communications. The method 3200 may be performed by an MCE (e.g., MCE 128 of FIG. 1). At block 3205, the MCE determines that a service is transmitted in an unlicensed spectrum based on the QoS of the service. At block 3210, the MCE configures at least one radio frame for transmitting the service in the unlicensed spectrum.

In an aspect, the MCE configures the at least one radio frame by refraining from transmitting the service in the unlicensed spectrum via a multicast broadcast single frequency network (MBSFN) at a first X subframes of each of the at least one radio frame, wherein X is an integer, and 0≤X<10. Thereafter, the MCE allocates subframes or a subset of subframes that are not the first X subframes of each of the at least one radio frame for transmitting the service in the unlicensed spectrum via the MBSFN. Hence, the first X subframes are excluded for any potential MBSFN subframe configuration.

In another aspect, the MCE configures the at least one radio frame by allocating a first X subframes or a subset of the first X subframes of each of the at least one radio frame for transmitting the service in the unlicensed spectrum via a multicast broadcast single frequency network (MBSFN), wherein X is an integer, and 0≤X<10. Thereafter, the MCE can allocate subframes or a subset of subframes that are not the first X subframes of each of the at least one radio frame for transmitting the service in the unlicensed spectrum. The MCE also aligns a cyclic prefix length of the first X subframes or the subset of the first X subframes with the subframes or the subset of subframes that are not the first X subframes when the first X subframes or the subset of the first X subframes are configured for MBSFN transmission and the subframes or the subset of subframes that are not the first X subframes are configured for MBSFN transmission.

In an aspect, when one of the first X subframes of each of the at least one radio frame is allocated for transmitting the service via the MBSFN, all base stations within an MBSFN area configure a subframe structure where a first X subframes of each of at least one radio frame is allocated for transmitting a service via the MBSFN.

In another aspect, configuring the at least one radio frame includes configuring the first X subframes of each of the at least one radio frame for signal transmission, wherein the first X subframes of each of the at least one radio frame use a different subframe structure from the subframes that are not the first X subframes of each of the at least one radio frame. The different subframe structure may facilitate fast user equipment (UE) acquisition of a base station when the base station resumes transmission after a base station gated period. When the first X subframes are allowed for MBSFN subframe transmission on a radio frame, all base stations may assume that the first X subframes of the radio frame are robust LTE subframes to enable proper MBSFN operation.

Figure 33:
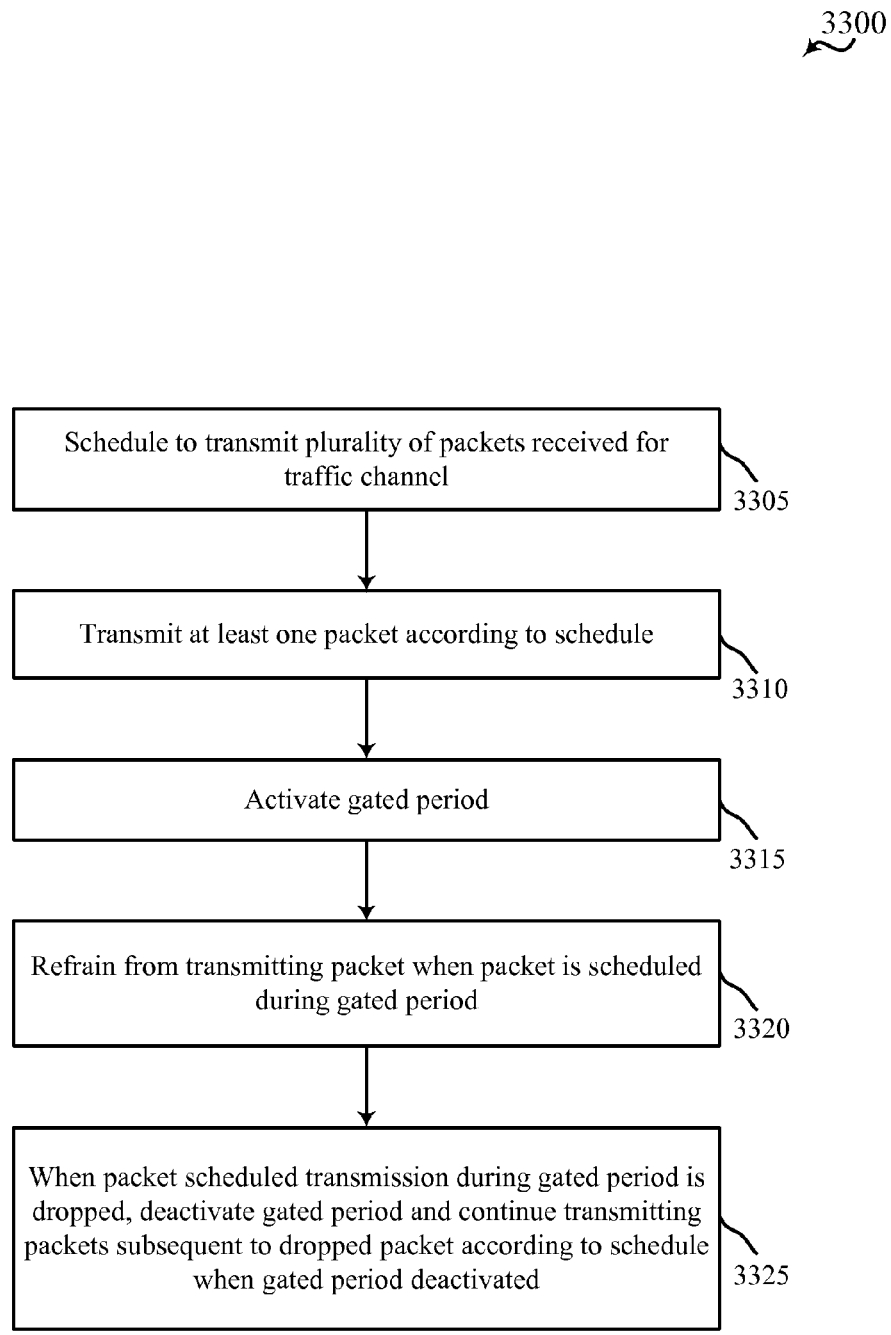
FIGS. 33-37 are flowcharts of examples of methods for wireless communications in an unlicensed spectrum (e.g., at a base station) according to various embodiments.

FIG. 33 shows a flowchart illustrating an example of a method 3300 for wireless communications. The method 3300 may be performed by a base station (e.g., eNB or access point (AP)). At block 3305, the base station schedules the transmission of a plurality of packets received for a traffic channel. At block 3310, the base station transmits at least one packet of the plurality of packets according to a clear channel assessment (CCA) operation and the scheduling information.

At block 3315, the base station activates a gated period based on the outcome of the CCA operation indicating that a medium is occupied. At block 3320, the base station refrains from transmitting a packet of the plurality of packets when the packet is scheduled to be transmitted during the gated period. At block 3325, the packet scheduled to be transmitted during the gated period is dropped. The base station deactivates the gated period when the CCA operation indicates that medium is unoccupied allowing base station transmission and the base station continues to transmit packets subsequent to the dropped packet according to the scheduling when the gated period is deactivated.

Figure 34:
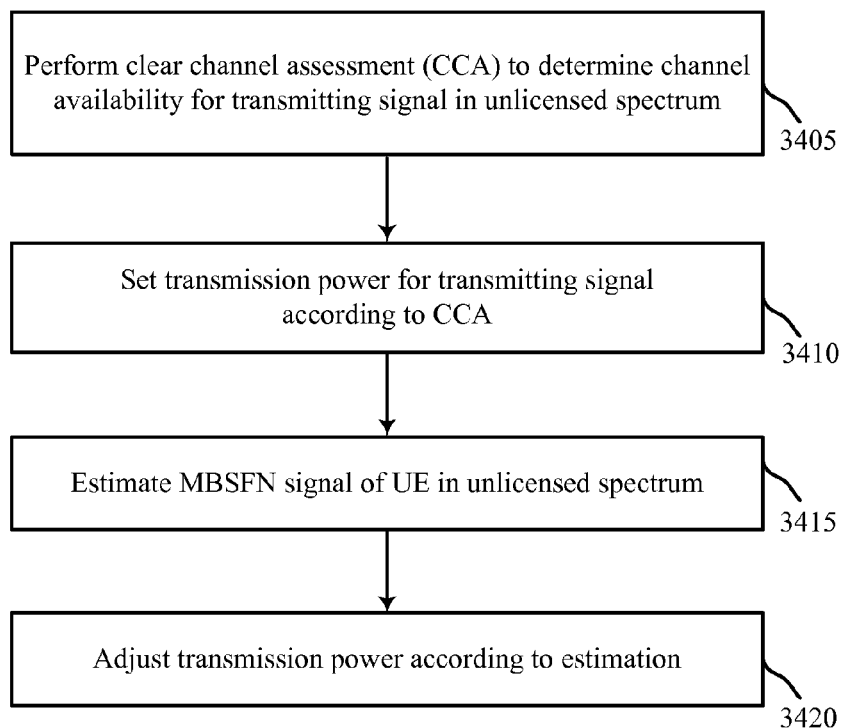

FIG. 34 shows a flowchart illustrating an example of a method 3400 for wireless communications. The method 3000 may be performed by a base station (e.g., eNB or AP). At block 3405, the base station performs a clear channel assessment (CCA) to determine channel availability for transmitting a signal in an unlicensed spectrum. At block 3410, the base station sets a transmission power for transmitting the signal according to the CCA.

At block 3415, the base station determines whether an MBSFN signal received by a UE is sufficient for the UE to decode in the unlicensed spectrum. Such decision can be based on the base station's MBSFN signal measurement or based on feedback from the UE. At block 3420, the base station adjusts a transmission power of a physical multicast channel (PMCH) according to the determination.

Figure 35:
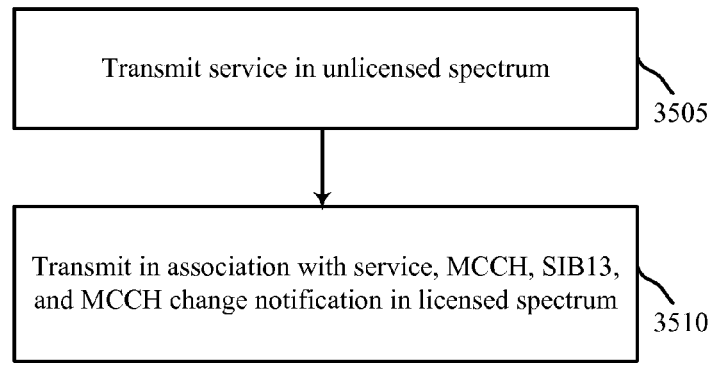

FIG. 35 shows a flowchart illustrating an example of a method 3500 for wireless communications. The method 3500 may be performed by a base station (e.g., eNB or AP). At block 3505, the base station transmits a service in an unlicensed spectrum. At block 3510, the base station transmits, in association with the service, a multicast control channel (MCCH), multicast channel scheduling information (MSI), system information block type 13 (SIB13), and a MCCH change notification in a licensed spectrum. The MCCH, MSI, SIB13, and MCCH change notification may be transmitted via a primary component carrier (PCC). The SIB13 may indicate whether the MCCH is sent from the PCC or the unlicensed spectrum.

Figure 36:
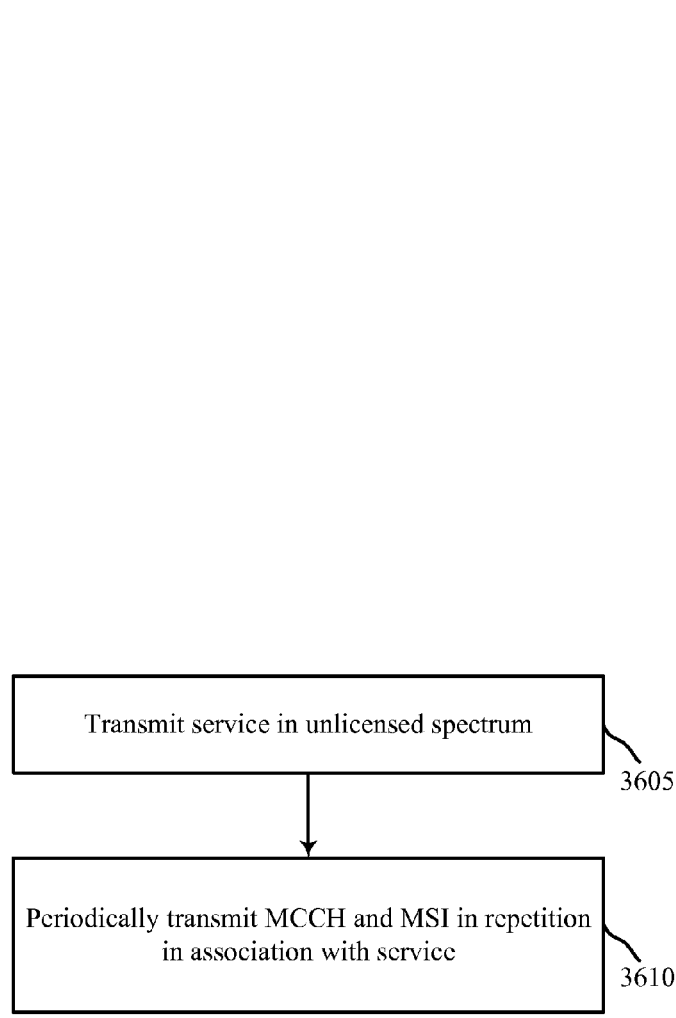

FIG. 36 shows a flowchart illustrating an example of a method 3600 for wireless communications. The method 3600 may be performed by a base station (e.g., eNB or AP). At block 3605, the base station transmits a service in an unlicensed spectrum. At block 3610, the base station periodically transmits a multicast control channel (MCCH) and multicast channel scheduling information (MSI) with repetition in association with the service. The MCCH and MSI may be periodically transmitted in the unlicensed spectrum.

Figure 37:
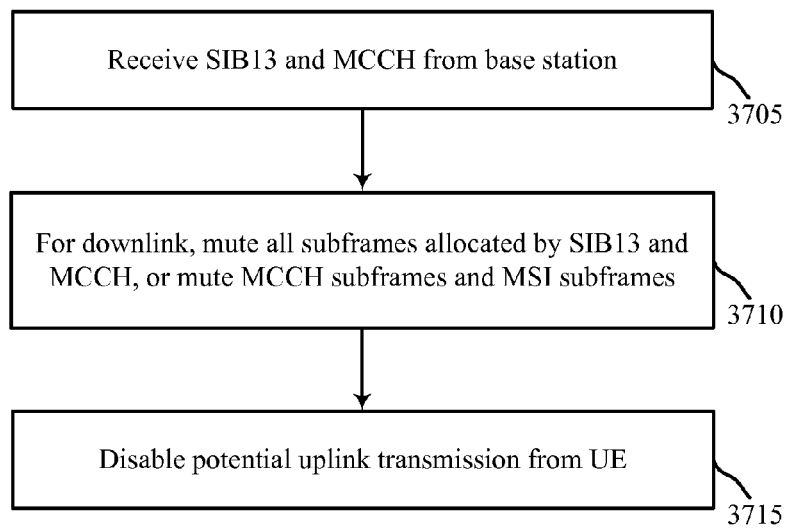

FIG. 37 shows a flowchart illustrating an example of a method 3700 for wireless communications. The method 3700 may be performed by a base station (e.g., AP). At block 3705, the AP receives system information block type 13 (SIB13) and MCCH information from a base station. Such backhaul communication between the base station and the AP may be possible for an operator-controlled AP and/or a base station co-located with an AP.

At block 3710, for a downlink transmission, the AP mutes its transmission on all subframes allocated by SIB13 and MCCH or mutes its transmission on MCCH subframes and MSI subframes. At block 3715, the AP disables a potential uplink transmission from a UE for all subframes allocated by SIB13 and MCCH, or MCCH subframes and MSI subframes.

Figure 38:
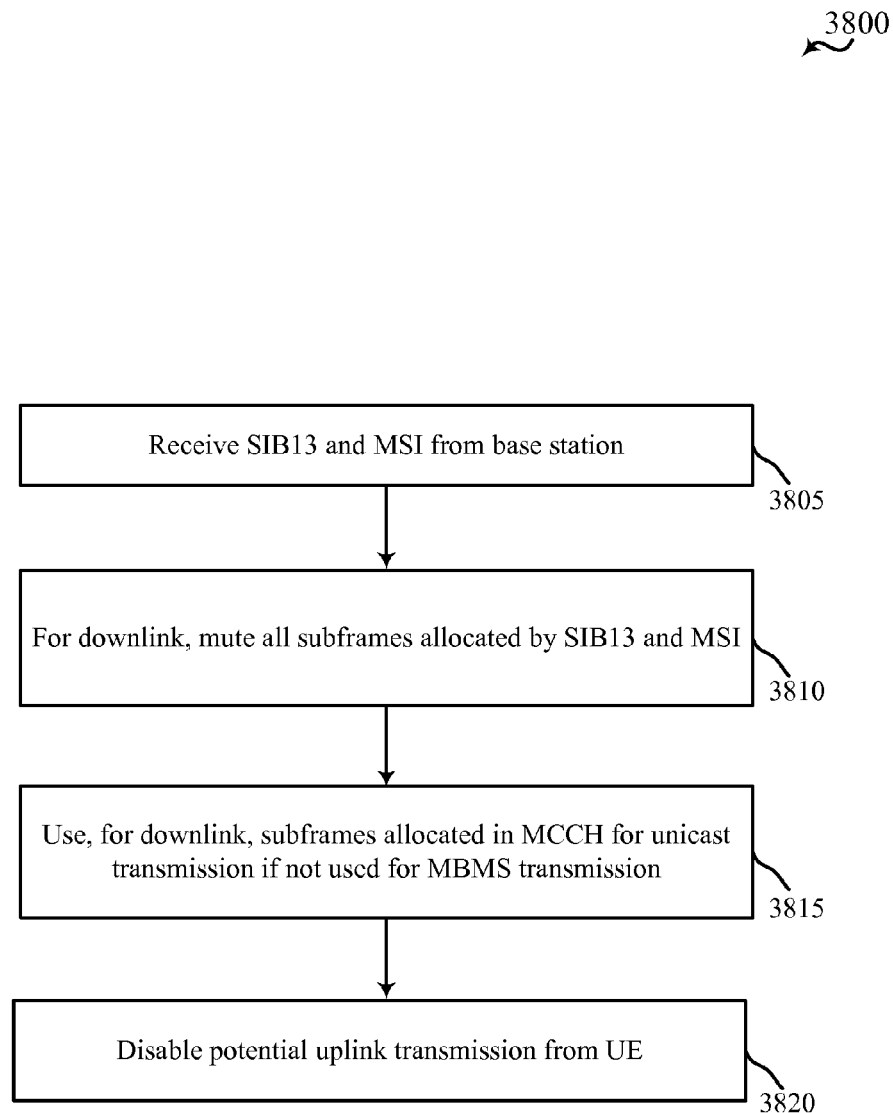
FIGS. 38 and 39 are flowcharts of examples of methods for wireless communications in an unlicensed spectrum (e.g., at an access point (AP)) according to various embodiments.

FIG. 38 shows a flowchart illustrating an example of a method 3800 for wireless communications. The method 3800 may be performed by an AP. At block 3805, the AP receives system information block type 13 (SIB13) and multicast channel scheduling information (MSI) from a base station.

At block 3810, for a downlink transmission, the AP mutes all subframes allocated by SIB13 and MSI. At block 3815, the AP uses, for the downlink transmission, subframes allocated for MCCH for a unicast transmission if not used for an MBMS transmission. Finally, at block 3820, the AP disables a potential uplink transmission from a UE for all subframes allocated by SIB13 and MSI.

Figure 39:
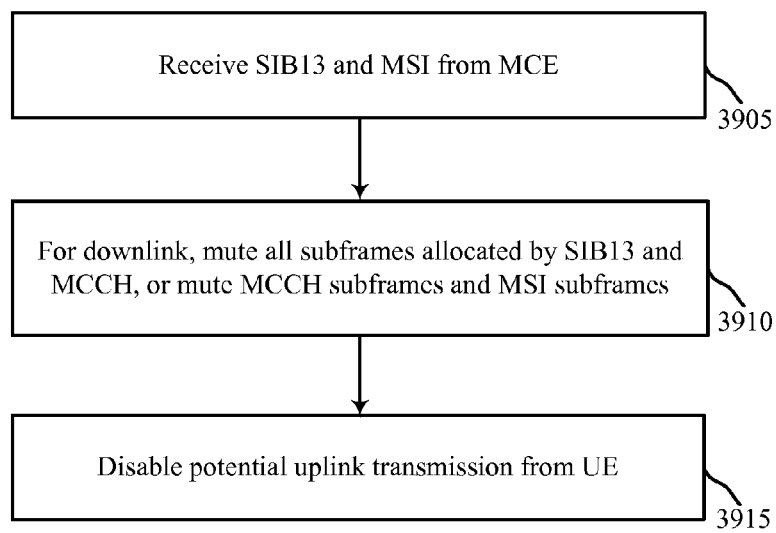

FIG. 39 shows a flowchart illustrating an example of a method 3900 for wireless communications. The method 3900 may be performed by a base station (e.g., AP). At block 3905, the AP receives system information block type 13 (SIB13) and MCCH information from an MBMS coordination entity (MCE).

At block 3910, for a downlink transmission, the AP mutes its transmission on subframes allocated by SIB13 and MCCH or mutes MCCH subframes and MSI subframes. The AP knows which subframes to mute according to AP implementation or specification. The more subframes the AP mutes, the stronger the coordination needed between a base station and the AP. At block 3915, the AP disables a potential uplink transmission from a UE for all subframes allocated by SIB13 and MCCH, or MCCH subframes and MSI subframes. For example, the AP may set a silent period to UEs in RTS/CTS signaling such that a UE does not transmit. The AP may also set a fake packet length in a message preamble such that a UE may assume that a medium is occupied, and therefore, refrain from transmitting on the uplink. Furthermore, the AP can schedule an uplink transmission to avoid subframes where the AP requires the UEs to be mute.

FIG. 40 shows a flowchart illustrating an example of a method 4000 for configuring a radio frame for communicating a service in an unlicensed spectrum. The method 4000 may be performed by a base station (e.g., eNB). At block 4005, the base station reserves a first set of subframes of the radio frame for transmitting information not associated with communicating the service in the unlicensed spectrum via a multicast broadcast single frequency network (MBSFN).

At block 4010, the base station allocates a second set of subframes of the radio frame for transmitting information associated with communicating the service in the unlicensed spectrum via the MBSFN. The first set of subframes may include a first X subframes of the radio frame, wherein X is an integer, and $0 \leq X < 10$. The second set of subframes may include subframes of the radio frame that are not the first X subframes. In an aspect, X=0 when an MBSFN transmission and a unicast transmission use a same cyclic prefix (CP) length, subcarrier spacing, and subframe structure.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration. A processor may in some cases be in electronic communication with a memory, where the memory stores instructions that are executable by the processor.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" or "one or more of" indicates a disjunctive list such that, for example, a list of "at least one of A, B, or C" means A or B or C or AB or AC or BC or ABC (i.e., A and B and C).

A computer program product or computer-readable medium both include a computer-readable storage medium and communication medium, including any mediums that facilitates transfer of a computer program from one place to another. A storage medium may be any medium that can be accessed by a general purpose or special purpose computer. By way of example, and not limitation, computer-readable medium can comprise RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for wireless communications, comprising:
receiving broadcast signals delivering first content from a first subset of a plurality of nodes, the first subset of nodes transmitting the broadcast signals as a supplemental downlink carrier in an unlicensed spectrum during a first time period;
receiving the broadcast signals delivering second content from a second subset of the plurality of nodes, the second subset of nodes transmitting the broadcast signals as the supplemental downlink carrier in the unlicensed spectrum during a second time period, wherein the first subset of nodes is different from the second subset of nodes;
receiving, from a serving node on a licensed spectrum, system information indicating a location of a control channel for the broadcast signals; and
receiving, from one or more nodes of the plurality of nodes, the control channel on the licensed spectrum.

2. The method of claim 1, wherein the plurality of nodes comprise a single frequency network (SFN) that performs partial SFN operation during the first and second time periods.

3. The method of claim 1, wherein the first and second time periods comprise transmission periods that are synchronized between listening intervals for each node of the plurality of nodes.

4. The method of claim 1, wherein receiving the system information comprises receiving a system information block (SIB) comprising the system information transmitted from the serving node on the licensed spectrum.

5. The method of claim 1, wherein the system information comprises an indication of a Multimedia Broadcast Multicast Services (MBMS) control channel (MCCH) location in time.

6. The method of claim 5, wherein the MCCH is transmitted on a physical multicast channel (PMCH) using the licensed spectrum.

7. The method of claim 5, wherein the MCCH is transmitted on the PMCH using the unlicensed spectrum.

8. The method of claim 7, wherein receiving the system information comprises receiving a system information block (SIB) indicating a portion of the MCCH that is to be transmitted on the licensed spectrum.

9. The method of claim 1, further comprising:
transmitting, responsive to receiving the control channel, a request to receive the broadcast signals.

10. The method of claim 1, further comprising:
transmitting, using the unlicensed spectrum and responsive to the receiving system information, a request to receive the broadcast signals to the serving node.

11. An apparatus for wireless communications, comprising:
a processor; and
memory coupled to the processor, wherein the processor is configured to:
receive broadcast signals delivering first content from a first subset of a plurality of nodes, the first subset of nodes transmitting the broadcast signals as a supplemental downlink carrier in an unlicensed spectrum during a first time period,
receive the broadcast signals delivering second content from a second subset of the plurality of nodes, the second subset of nodes transmitting the broadcast signals as a supplemental downlink carrier in the unlicensed spectrum during a second time period, wherein the first subset of nodes is different from the second subset of nodes;
receive, from a serving node on a licensed spectrum, system information indicating a location of a control channel for the broadcast signals; and
receive, from one or more nodes of the plurality of nodes, the control channel on the licensed system.

12. The apparatus of claim 11, wherein the system information comprises a system information block (SIB) comprising the system information transmitted from the serving node on the licensed spectrum.

13. The apparatus of claim 11, wherein the system information comprises an indication of a Multimedia Broadcast Multicast Services (MBMS) control channel (MCCH) location in time.

14. The apparatus of claim 11, wherein the processor is further configured to transmit, responsive to receiving the control channel, a request to receive the broadcast signals.

15. The apparatus of claim 11, wherein the processor is further configured to transmit, using the unlicensed spectrum and responsive to the receiving system information, a request to receive the broadcast signals to the serving node.

16. An apparatus for wireless communications, comprising:
means for receiving broadcast signals delivering first content from a first subset of a plurality of nodes, the first subset of nodes transmitting the broadcast signals as a supplemental downlink carrier in an unlicensed spectrum during a first time period;
means for receiving the broadcast signals delivering second content from a second subset of the plurality of nodes, the second subset of nodes transmitting the broadcast signals as a supplemental downlink carrier in the unlicensed spectrum during a second time period, wherein the first subset of nodes is different from the second subset of nodes;
means for receiving, from a serving node on a licensed spectrum, system information indicating a location of a control channel for the broadcast signals; and
means for receiving, from one or more nodes of the plurality of nodes, the control channel on the licensed system.

17. The apparatus of claim 16, wherein the system information comprises a system information block (SIB) comprising the system information transmitted from the serving node on the licensed spectrum.

18. The apparatus of claim 16, wherein the system information comprises an indication of a Multimedia Broadcast Multicast Services (MBMS) control channel (MCCH) location in time.

19. The apparatus of claim 16, further comprising means for transmitting, responsive to receiving the control channel, a request to receive the broadcast signals.

20. A non-transitory computer-readable medium for storing instructions executable by a processor, comprising:
instructions to receive broadcast signals delivering first content from a first subset of a plurality of nodes, the first subset of nodes transmitting the broadcast signals as a supplemental downlink carrier in an unlicensed spectrum during a first time period;
instructions to receive the broadcast signals delivering second content from a second subset of the plurality of nodes, the second subset of nodes transmitting the broadcast signals as a supplemental downlink carrier in the unlicensed spectrum during a second time period, wherein the first subset of nodes is different than the second subset of nodes;
instructions to receive, from a serving node on a licensed spectrum, system information indicating a location of a control channel for the broadcast signals; and
instructions to receive, from one or more nodes of the plurality of nodes, the control channel on the licensed system.

21. A method for wireless communications, comprising:
receiving broadcast signals delivering first content from a first subset of a plurality of nodes, the first subset of nodes transmitting the broadcast signal in an unlicensed spectrum during a first time period;
receiving the broadcast signals delivering second content from a second subset of the plurality of nodes, the second subset of nodes transmitting the broadcast signal in the unlicensed spectrum during a second time period, wherein the first subset of nodes is different from the second subset of nodes; and
receiving a system information block (SIB) comprising system information indicating a location of a control channel for the broadcast signals, the SIB being transmitted from a serving node on a licensed spectrum.

22. The method of claim 21, wherein the plurality of nodes comprise a single frequency network (SFN) that performs partial SFN operation during the first and second time periods.

23. The method of claim 21, wherein the broadcast signals are transmitted from the first subset of nodes and the second subset of nodes as a supplemental downlink carrier, the method further comprising:
receiving, from one or more nodes of the plurality of nodes, the control channel.

24. The method of claim 23, wherein the control channel is received on the licensed spectrum.

25. The method of claim 23, wherein the control channel is received on the unlicensed spectrum.

26. The method of claim 21, wherein the broadcast signals are transmitted from the first subset of nodes and the second subset of nodes in a carrier aggregation mode using the unlicensed spectrum.

27. The method of claim 21, wherein the broadcast signal are transmitted from the first subset of nodes and the second subset of nodes in a standalone (SA) mode using the unlicensed spectrum, the method further comprising:

receiving, from one or more nodes of the plurality of nodes on the unlicensed spectrum, the control channel.

28. A method for wireless communications, comprising:

receiving broadcast signals delivering first content from a first subset of a plurality of nodes, the first subset of nodes transmitting the broadcast signal in an unlicensed spectrum during a first time period;

receiving the broadcast signals delivering second content from a second subset of the plurality of nodes, the second subset of nodes transmitting the broadcast signal in the unlicensed spectrum during a second time period, wherein the first subset of nodes is different from the second subset of nodes; and receiving system information comprising an indication of a Multimedia Broadcast Multicast Services (MBMS) control channel (MCCH) location in time, the MCCH being transmitted on a physical multicast channel (PMCH) using one of (i) a licensed spectrum, or (ii) the unlicensed spectrum, wherein receiving the system information comprises receiving a system information block (SIB) indicating a portion of the information associated with the MCCH that is to be transmitted on the licensed spectrum.

29. The method of claim 28, wherein the plurality of nodes comprise a single frequency network (SFN) that performs partial SFN operation during the first and second time periods.

30. The method of claim 28, wherein the broadcast signals are transmitted from the first subset of nodes and the second subset of nodes as a supplemental downlink carrier, and the method further comprising:

receiving, from one or more nodes of the plurality of nodes, the control channel.

31. The method of claim 30, wherein the control channel is received on the licensed spectrum.

32. The method of claim 30, wherein the control channel is received on the unlicensed spectrum.

33. The method of claim 28, wherein the broadcast signals are transmitted from the first subset of nodes and the second subset of nodes in a carrier aggregation mode using the unlicensed spectrum.

34. The method of claim 28, wherein the broadcast signals are transmitted from the first subset of nodes and the second subset of nodes in a standalone (SA) mode using the unlicensed spectrum, the method further comprising:

receiving, from one or more nodes of the plurality of nodes on the unlicensed spectrum, the control channel.

* * * * *